US011033812B2

(12) United States Patent
Niwa et al.

(10) Patent No.: US 11,033,812 B2
(45) Date of Patent: Jun. 15, 2021

(54) INPUT APPARATUS, METHOD, AND GAME PROCESSING METHOD

(71) Applicant: NINTENDO CO., LTD., Kyoto (JP)

(72) Inventors: Masato Niwa, Kyoto (JP); Tomofumi Ikeda, Kyoto (JP); Yuki Taniguchi, Kyoto (JP); Yoshitaka Tamura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 19 days.

(21) Appl. No.: 16/656,991

(22) Filed: Oct. 18, 2019

(65) Prior Publication Data
US 2020/0398155 A1 Dec. 24, 2020

(30) Foreign Application Priority Data

Jun. 20, 2019 (JP) .............................. JP2019-114490

(51) Int. Cl.
A63F 13/245 (2014.01)
A63F 13/218 (2014.01)
(Continued)

(52) U.S. Cl.
CPC .......... *A63F 13/245* (2014.09); *A63F 13/218* (2014.09); *A63F 13/23* (2014.09); *A63F 13/211* (2014.09); *A63F 13/212* (2014.09); *A63F 13/285* (2014.09); *A63F 13/816* (2014.09); *A63F 2300/105* (2013.01); *A63F 2300/1025* (2013.01); *A63F 2300/1037* (2013.01);
(Continued)

(58) Field of Classification Search
CPC ....... A63F 13/24; A63F 13/218; A63F 13/245
See application file for complete search history.

(56) References Cited

U.S. PATENT DOCUMENTS 5,072,927 A 12/1991 Santos
5,342,273 A 8/1994 Plendl et al.
(Continued)

FOREIGN PATENT DOCUMENTS

CN 101143262 3/2008
CN 102243934 11/2011
(Continued)

OTHER PUBLICATIONS

Search Report dated May 11, 2020 in corresponding European Application No. 19204829.6, 4 pages.
(Continued)

*Primary Examiner* — Jay Trent Liddle
(74) *Attorney, Agent, or Firm* — Nixon & Vanderhye P.C.

(57) ABSTRACT

An example input apparatus includes an elastic member, a base portion and a strain gauge. The elastic member includes a first end portion and a second end portion, and at least a part of the elastic member is elastically deformable. The base portion holds the opposite end portions of the elastic member so that a ring is formed by the base portion and the elastic member. The strain gauge is provided on the base portion and detects a strain generated on the base portion due to deformation of the elastic member in response to an input from the user. Note that instead of the configuration where a ring is formed by the base portion and the elastic member, the input apparatus may be configured so that two elastic members are held by the base portion.

24 Claims, 30 Drawing Sheets

(51) Int. Cl.
*A63F 13/23* (2014.01)
*A63F 13/285* (2014.01)
*A63F 13/211* (2014.01)
*A63F 13/212* (2014.01)
*A63F 13/816* (2014.01)

(52) U.S. Cl.
CPC ............... *A63F 2300/1043* (2013.01); *A63F 2300/1056* (2013.01)

(56) References Cited

U.S. PATENT DOCUMENTS

| | | | |
|---|---|---|---|
| 7,335,134 B1 | 2/2008 | Lavelle | |
| 10,471,303 B2 | 11/2019 | Kuroda et al. | |
| 2001/0021665 A1 | 9/2001 | Gouji et al. | |
| 2006/0260395 A1 | 11/2006 | Feldman et al. | |
| 2007/0091084 A1 | 4/2007 | Ueshima et al. | |
| 2008/0009225 A1* | 1/2008 | Barthold | A63H 33/00 446/486 |
| 2008/0146336 A1 | 6/2008 | Feldman et al. | |
| 2010/0004061 A1 | 1/2010 | Merril et al. | |
| 2010/0009760 A1 | 1/2010 | Shimamura et al. | |
| 2010/0210420 A1 | 8/2010 | Chang et al. | |
| 2011/0074665 A1 | 3/2011 | Konishi | |
| 2012/0010056 A1 | 1/2012 | Chang | |
| 2012/0129653 A1 | 5/2012 | Shalev et al. | |
| 2013/0157817 A1* | 6/2013 | Green | A63B 23/1209 482/122 |
| 2014/0051518 A1 | 2/2014 | Russo | |
| 2014/0244722 A1 | 8/2014 | Hayashi | |
| 2015/0081057 A1 | 3/2015 | Hamada et al. | |
| 2016/0206957 A1 | 7/2016 | Goslin et al. | |
| 2016/0361641 A1 | 12/2016 | Koizumi et al. | |
| 2017/0156662 A1 | 6/2017 | Goodall | |
| 2017/0177083 A1 | 6/2017 | Alghooneh et al. | |
| 2017/0203153 A1 | 7/2017 | Sato | |
| 2017/0216670 A1* | 8/2017 | Kuroda | A63B 24/0062 |
| 2017/0239520 A1 | 8/2017 | Kodaira | |
| 2018/0099218 A1 | 4/2018 | Ikuta et al. | |
| 2018/0149444 A1* | 5/2018 | Pell | A63F 13/837 |
| 2018/0193732 A1 | 7/2018 | Kamata et al. | |
| 2018/0200575 A1 | 7/2018 | Nagaishi | |
| 2018/0278825 A1 | 9/2018 | Myoken | |
| 2019/0146582 A1 | 5/2019 | Higgins et al. | |
| 2019/0314721 A1 | 10/2019 | Nakayama et al. | |
| 2020/0116453 A1* | 4/2020 | Pell | F41B 5/1426 |

FOREIGN PATENT DOCUMENTS

| | | |
|---|---|---|
| CN | 105457316 | 4/2016 |
| CN | 106537295 A | 3/2017 |
| CN | 106896912 | 6/2017 |
| CN | 109770489 A | 5/2019 |
| JP | 2001-104636 | 4/2001 |
| JP | 2007-307284 | 11/2007 |
| JP | 2009-020656 | 1/2009 |
| JP | 2010-17405 | 1/2010 |
| JP | 2010-088724 | 4/2010 |
| JP | 2011-076440 | 4/2011 |
| JP | 2013-521975 | 6/2013 |
| JP | 2014-164657 | 9/2014 |
| JP | 2016/059943 | 4/2016 |
| JP | 2018-099430 | 6/2018 |
| JP | 2018-110680 | 7/2018 |
| KR | 10-0293879 | 9/2002 |
| WO | 2011/119052 | 9/2011 |
| WO | WO 2011/119052 | 9/2011 |
| WO | 2014/038049 | 3/2014 |
| WO | WO 2017/061488 A1 | 4/2017 |
| WO | 2018/131239 | 11/2019 |

OTHER PUBLICATIONS

Search Report dated Jun. 17, 2020 in corresponding European Application No. 19204826.2, 4 pages.
U.S. Appl. No. 16/656,968 to Tamura, et al., titled: "Apparatus and Method", filed Oct. 18, 2019 (150 pages).
Office Action dated Dec. 3, 2019 issued in Japanese Application No. JP 2019-114489 (4 pgs.).
U.S. Appl. No. 16/582,327, filed Sep. 25, 2019; Kuroda et al.
Office Action dated Oct. 15, 2020 in Chinese Application No. 202010254069.2, 5 pages.

\* cited by examiner

INPUT APPARATUS, METHOD, AND GAME PROCESSING METHOD

CROSS REFERENCE TO RELATED APPLICATION

The disclosure of Japanese Patent Application No. 2019-114490 filed on Jun. 20, 2019 is incorporated herein by reference.

FIELD

The present technology relates to an input apparatus.

BACKGROUND AND SUMMARY

There are conventional training tools with which a user trains by applying a force to the tool body.

With such a training tool, the strain applied to the tool body is detected by using a strain gauge, thereby detecting the load on the tool body. When a strain gauge is used, the strain gauge is preferably provided at an appropriate position so as not to damage the strain gauge, for example. Note that the appropriate position of a strain gauge may vary depending on the structure of the tool body, and it is preferred that the strain gauge is provided at an appropriate position in accordance with the structure of the tool body.

Thus, the present application discloses an input apparatus including a strain gauge that is provided at an appropriate position.

(1)

An example input apparatus described herein includes an elastic member, a base portion and a strain gauge. The elastic member includes a first end portion and a second end portion, and at least a part of the elastic member is elastically deformable by a user. The base portion holds the opposite end portions of the elastic member so that a ring is formed by the base portion and the elastic member. The base portion is made of a material harder than a material of an elastically deformable portion of the elastic member. The strain gauge is on the base portion and configured to detect a strain generated on the base portion due to deformation of the elastic member in response to an input from the user.

With configuration (1) above, the strain gauge is provided on the base portion, which is different from the elastic member deformed by an input from the user. Thus, the strain gauge can be provided at an appropriate position so that it is possible to reduce the possibility that the strain gauge is damaged due to deformation of the elastic member.

(2)

The base portion may include an inner portion and an outer portion. The inner portion is on a side closer to a center of the ring formed by the base portion and the elastic member. The outer portion opposes the inner portion on a side farther away from the center of the ring. The elastic member may be held by the base portion with the first end portion and the second end portion sandwiched between the outer portion and the inner portion.

(3)

The first end portion of the elastic member may be sandwiched between the outer portion and the inner portion at an end portion of the base portion on a first side in a first direction. The second end portion of the elastic member may be sandwiched between the outer portion and the inner portion at an end portion of the base portion on a second side in the first direction.

(4)

The base portion may hold the elastic member so that a tip portion of the first end portion and a tip portion of the second end portion each apply a pressing force to a surface of the outer portion that opposes the inner portion, while a portion of the first end portion that is different from the tip portion and a portion of the second end portion that is different from the tip portion apply a pressing force to opposite ends in the first direction of a surface of the inner portion that opposes the outer portion.

With any of configurations (2) to (4) above, it is possible to diffuse the force received by the base portion from the elastic member when the elastic member deforms, and it is possible to reduce the possibility of damaging the elastic member.

(5)

The input apparatus may include a first protection member and a second protection member. The first protection member is sandwiched between an end portion on the first side of the inner portion and the elastic member. The second protection member is sandwiched between an end portion on the second side of the inner portion and the elastic member. The first protection member may have a corner that is more rounded than a corner of the inner portion that is to be in contact with the first protection member, and the corner is to be in contact with the elastic member in a steady state and/or a deformed state. The second protection member may have a corner that is more rounded than a corner of the inner portion that is to be in contact with the second protection member, and the corner is to be in contact with the elastic member in the steady state and/or the deformed state.

(6)

The input apparatus may include a first protection member and a second protection member. The first protection member is sandwiched between an end portion on the first side of the inner portion and the elastic member. The second protection member is sandwiched between an end portion on the second side of the inner portion and the elastic member. The first protection member and the second protection member are made of a material that is softer than the base portion.

With configuration (5) or (6) above, it is possible to protect the elastic member because the protection members can prevent the elastic member from directly contacting the inner edge of the opening of the base portion.

(7)

The base portion may further include two side surface portions that connect together the inner portion and the outer portion respectively on one side and on the other side in a second direction that is perpendicular to the first direction. The first end portion and the second end portion of the elastic member are surrounded by the inner portion, the outer portion and the two side surface portions.

With configuration (7) above, as the base portion surrounds the end portions of the elastic member, it is possible to reduce the possibility that the elastic member may slip down the base portion or come off the base portion.

(8)

The base portion may be in a tubular shape having a first opening and a second opening, wherein an end portion on the first side in the first direction of the outer portion and an end portion on the first side of the inner portion are parts of an edge of the first opening, and an end portion on the second side in the first direction of the outer portion and an end portion on the second side of the inner portion are parts of an edge of the second opening. The elastic member may be held by the base portion with the first end portion inserted through the first opening and the second end portion inserted through the second opening.

With configuration (8) above, since the base portion has a tubular shape, it is possible to make the production of the base portion easier.

(9)

The strain gauge may be configured to detect a strain on the base portion for the first direction and a strain on the base portion for the second direction. The base portion may have a notch or a hole located in the second direction from the strain gauge.

With configuration (9) above, it is possible to accurately detect the strain generated on the base portion due to deformation of the elastic member.

(10)

A length of the notch or the hole for the first direction may be longer than a length of the strain gauge for the first direction. Opposite ends of the notch or the hole in the first direction may be located on an outer side for the first direction relative to opposite ends of the strain gauge in the first direction.

(11)

The notch or the hole may be formed on opposite sides of the strain gauge for the second direction in one of the outer portion and the inner portion where the strain gauge is provided and/or in the side surface portions.

With configuration (10) or (11) above, since it is possible to effectively reduce the strain in the second direction on a portion of the base portion where the strain gauge is provided, it is possible to more accurately detect the strain in the first direction generated on the base portion due to deformation of the elastic member.

(12)

The strain gauge may be on the outer portion or the inner portion. The input apparatus may further include a housing secured to one of the outer portion and the inner portion where the strain gauge is absent, wherein the housing at least covers the strain gauge.

With configuration (12) above, as the base portion and the housing are secured together, the strain gauge is less likely to detect the strain which may possibly be generated on the base portion, and it is therefore possible to more accurately detect the strain generated on the base portion due to deformation of the elastic member.

(13)

The base portion may be in a tubular shape having an opening at an end portion on a first side and at an end portion on a second side. The elastic member may be held by the base portion with the first end portion inserted through the opening on the first side and the second end portion inserted through the opening on the second side.

With configuration (13) above, as with configuration (8) above, since the base portion has a tubular shape, it is possible to make the production of the base portion easier.

(14)

The strain gauge may be on one of outer surfaces of the base portion that is farther away from a center of the ring.

(15)

The elastic member may include a core and a cover portion covering the core and that is softer than the core. The portions of the core may be exposed at the first end portion and the second end portion. The base portion may hold the portions of the core that are exposed at the first end portion and the second end portion.

With configuration (15) above, the cover portion improves the feel of the elastic member when touched by the user. It is possible to reduce the possibility that the cover portion, which is softer than the core, contacts the base portion and gets damaged.

(16)

The elastic member may be secured to the base portion at least two locations on a side of the first end portion and is secured to the base portion at least two locations on a side of the second end portion.

With configuration (16) above, it is possible to reduce the possibility that the elastic member pivots relative to the base portion to contact the opening of the base portion, and it is possible to reduce the possibility that the elastic member contacts the base portion and gets damaged.

(17)

The elastic member may be secured to the base portion using a rivet, a screw and/or a bolt.

With configuration (17) above, the elastic member can be firmly connected to the base portion.

(18)

The elastic member may have a linear shape while no stress is applied thereto. The base portion may hold the elastic member while a stress is applied thereto.

With configuration (18) above, since the elastic member when under no stress has a simple shape, it is possible to make the production easier.

(19)

Another example of an input apparatus described herein includes a strain gauge, a base portion, a first elastic member and a second elastic member. The base portion is on which the strain gauge is located. The first elastic member is held by one hand of a user. The second elastic member is separate from the first elastic member and is held by the other hand of the user. The base portion is made of a material harder than a material of elastically deformable portions of the first and second elastic members. The base portion includes a first portion and a second portion that opposes the first portion. The base portion holds the first elastic member and the second elastic member with one end of the first elastic member and one end of the second elastic member sandwiched between the first portion and the second portion.

With configuration (19) above, as with configuration (1) above, the strain gauge can be provided at an appropriate position so that it is possible to reduce the possibility of damaging the strain gauge due to deformation of the elastic member.

(20)

A portion of the first elastic member that is sandwiched between an end portion of the first portion and an end portion of the second portion may be elastically deformable in a direction toward the first portion and in a direction toward the second portion. A portion of the second elastic member that is sandwiched between an end portion of the first portion and an end portion of the second portion may be is elastically deformable in a direction toward the first portion and in a direction toward the second portion.

With configuration (20) above, as with configuration (2) to (4) above, it is possible to diffuse the force received by the base portion from the elastic member when the elastic member deforms.

Note that a configuration similar to any of configurations (3) to (17) above may be further employed in addition to configuration (19) above.

(21)

An example of a method for making an input apparatus comprises: providing an elastic member at least a part of which is elastically deformable by a user, wherein the elastic member has a first end portion and a second end portion;

holding both end portions of the elastic member with a base member so that a ring is formed by the base portion and the elastic member, wherein the base portion is made of a material harder than a material of an elastically deformable portion of the elastic member; and attaching a strain gauge on the base portion, the strain gauge being configured to detect a strain generated on the base portion (242) due to deformation of the elastic member in response to input from the user.

(21)

An example of a game processing method is for use with an input apparatus comprising a strain gauge, an elastic member at least a part of which is elastically deformable by a user, the elastic member having a first end portion and a second end portion, a base portion holding both end portions of the elastic member so that a ring is formed by the base portion and the elastic member, the base portion being made of a material harder than a material of an elastically deformable portion of the elastic member, the strain gauge being provided on the base portion. The method comprising: receiving data from the strain gauge indicative of a detected strain generated on the base portion due to deformation of the elastic member in response to an input from the user; and executing a game process based on the received data.

With the input apparatus set forth above, the strain gauge can be provided at an appropriate position.

These and other objects, features, aspects and advantages will become more apparent from the following detailed description when taken in conjunction with the accompanying drawings.

DETAILED DESCRIPTION OF NON-LIMITING EXAMPLE EMBODIMENTS

1. Configuration of Game System

Figure 1:
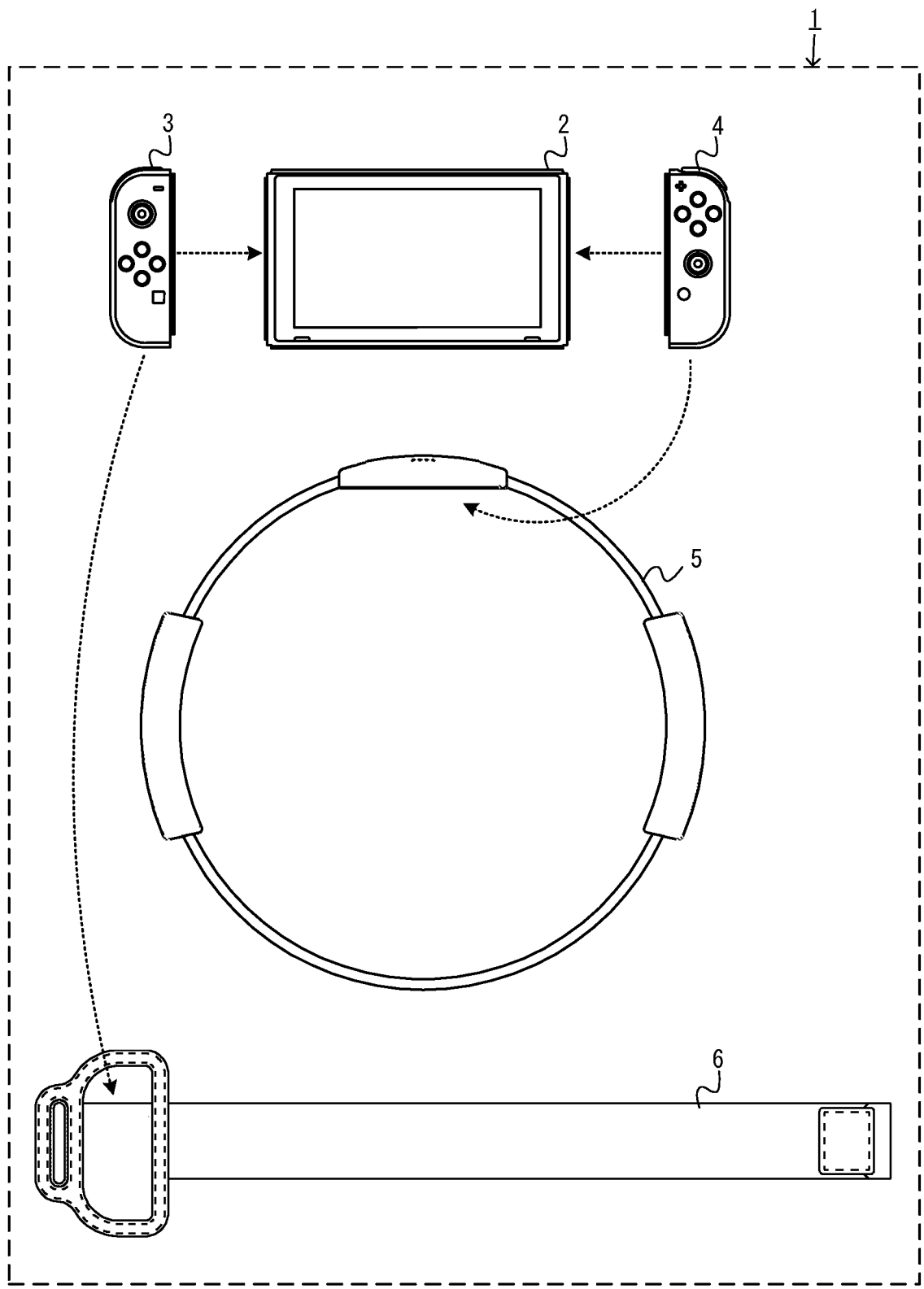
FIG. 1 is a diagram showing an example of non-limiting apparatuses included in a game system.

A game system according to an example of the present embodiment will now be described. FIG. 1 is a diagram showing an example of apparatuses included in the game system. As shown in FIG. 1, a game system 1 includes a main body or game-playing apparatus 2, a left controller 3, a right controller 4, a ring-shaped extension apparatus 5, and a belt-shaped extension apparatus 6.

The main body apparatus 2 is an example of an information processing apparatus, and functions as a game device main body in the present embodiment. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus".

The ring-shaped extension apparatus 5 is an example of an extension apparatus that is used with the right controller 4. The ring-shaped extension apparatus 5 is used with the right controller 4 attached thereto. The belt-shaped extension apparatus 6 is an example of an extension apparatus that is used with the left controller 3. The belt-shaped extension apparatus 6 is used with the left controller 3 attached thereto. Thus, in the present embodiment, the user can use the controllers 3 and 4 while they are attached to the respective extension apparatuses (see FIG. 15). Note that the ring-shaped extension apparatus 5 is not limited for use with the right controller 4, but the left controller 3 may be attachable thereto. The belt-shaped extension apparatus 6 is not limited for use with the left controller 3, but the right controller 4 may be attachable thereto.

[1-1. Configuration of Game Apparatus]

Figure 2:
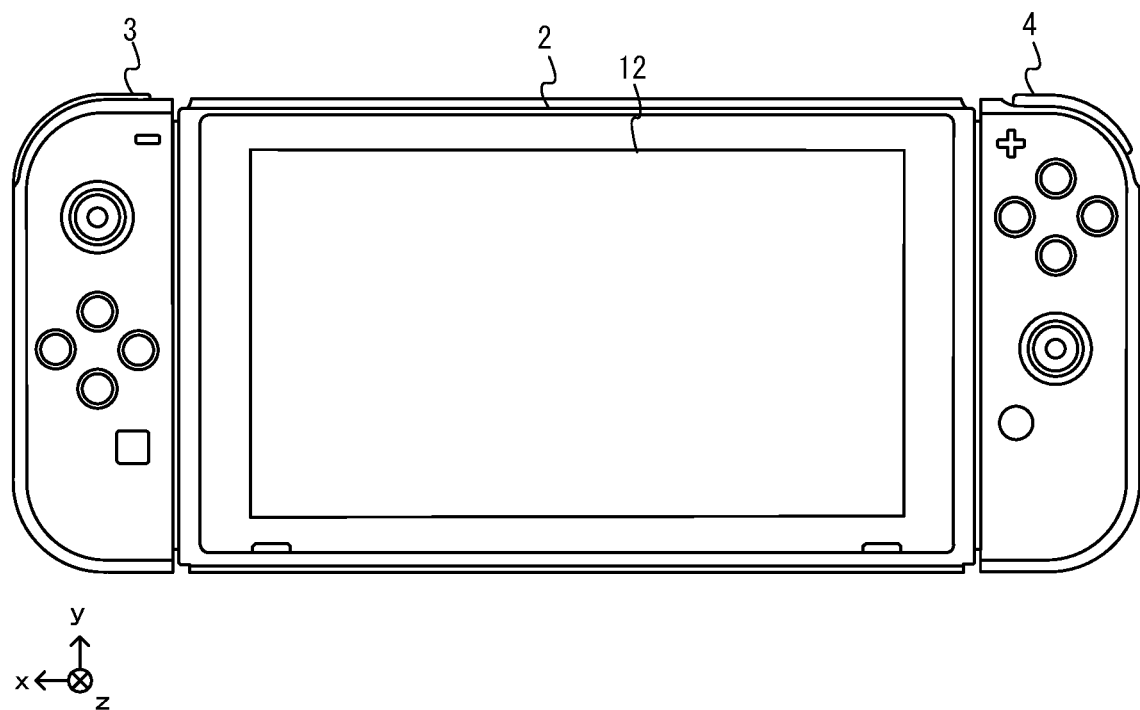
FIG. 2 is a diagram showing an example of a state where a non-limiting left controller and a non-limiting right controller are attached to a non-limiting main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
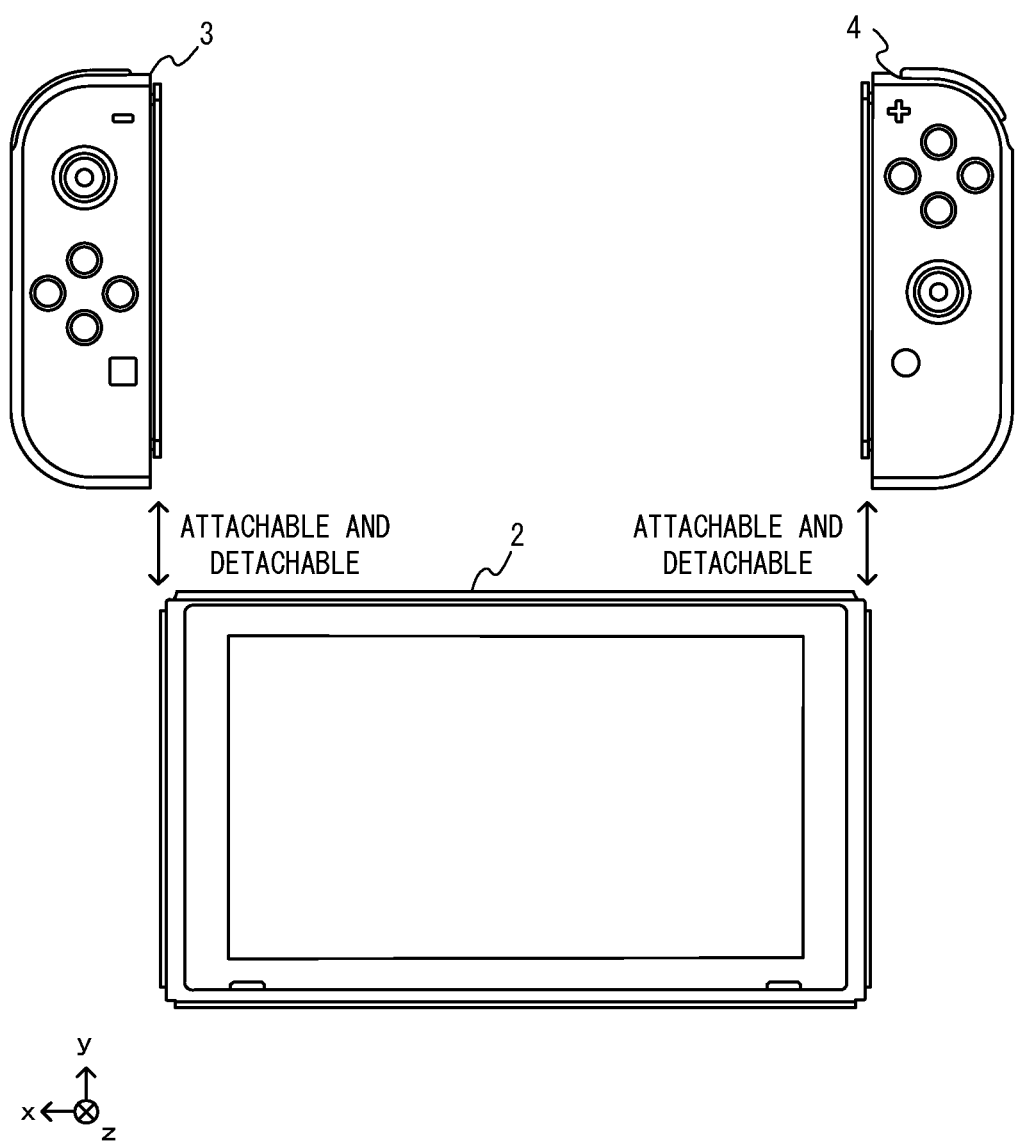
FIG. 3 is a diagram showing a state where a non-limiting left controller and a non-limiting right controller are detached from a non-limiting main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
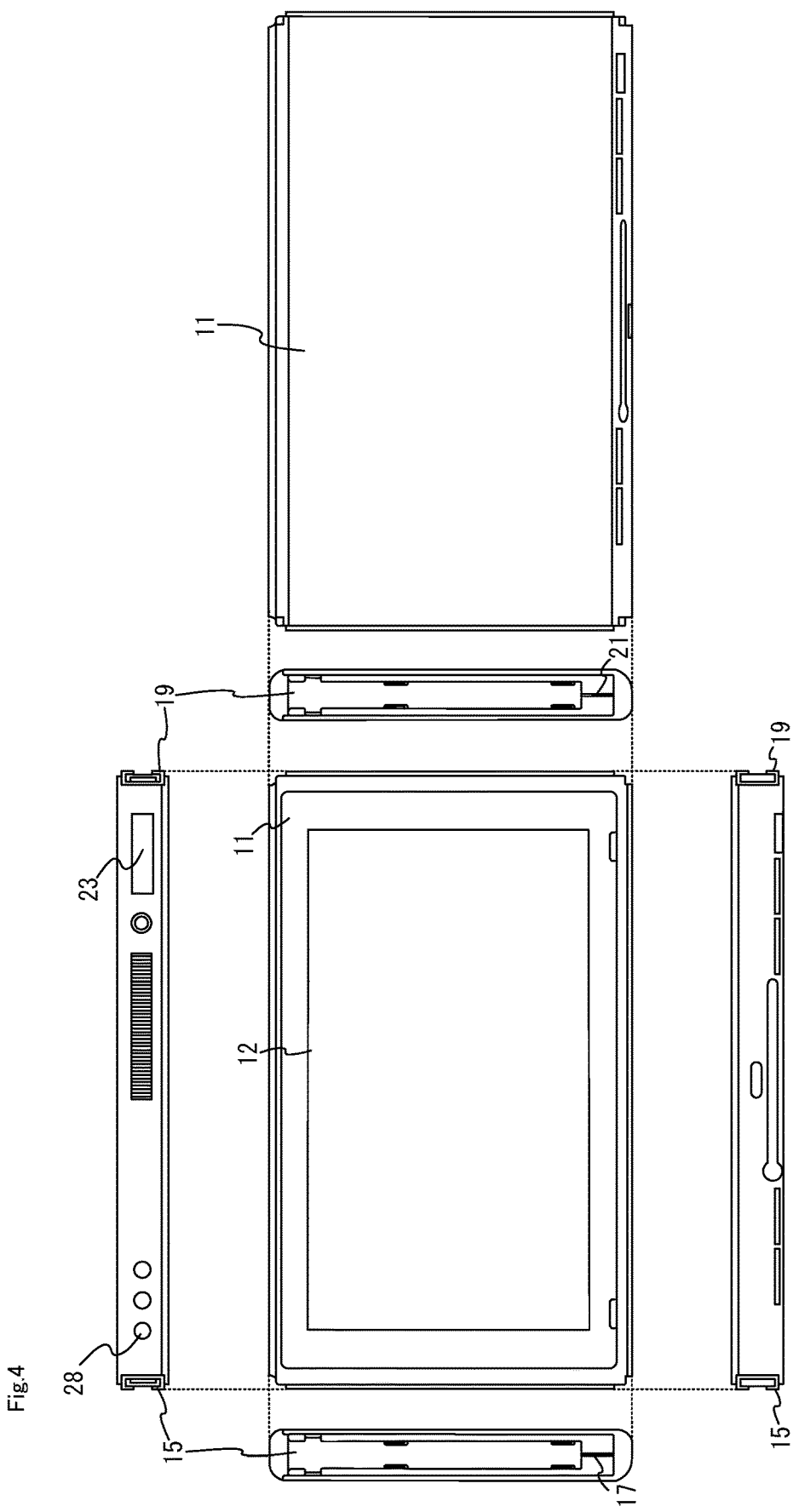
FIG. 4 is six orthogonal views showing an example of a non-limiting main body apparatus.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes rail portions as an example of slide portions for allowing controllers to be attached to and detached from the main body apparatus 2. Specifically, as shown in FIG. 4, the main body apparatus 2 includes a left rail portion 15 on the left side surface of the housing 11, and a right rail portion 19 on the right side surface of the housing 11. Each of the rail portions 15 and 19 can slidably engage with a slider of the controller (a slider 40 or 62 shown in FIG. 5).

The main body apparatus 2 includes a left-side terminal 17 that enables wired communication between the main body apparatus 2 and the left controller 3, and a right-side terminal 21 that enables wired communication between the main body apparatus 2 and the right controller 4. The left-side terminal 17 is provided on the left rail portion 15 (more specifically, in the vicinity of the lower end of the left rail portion 15). The right-side terminal 21 is provided on the right rail portion 19 (more specifically, in the vicinity of the lower end of the right rail portion 19).

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 5:
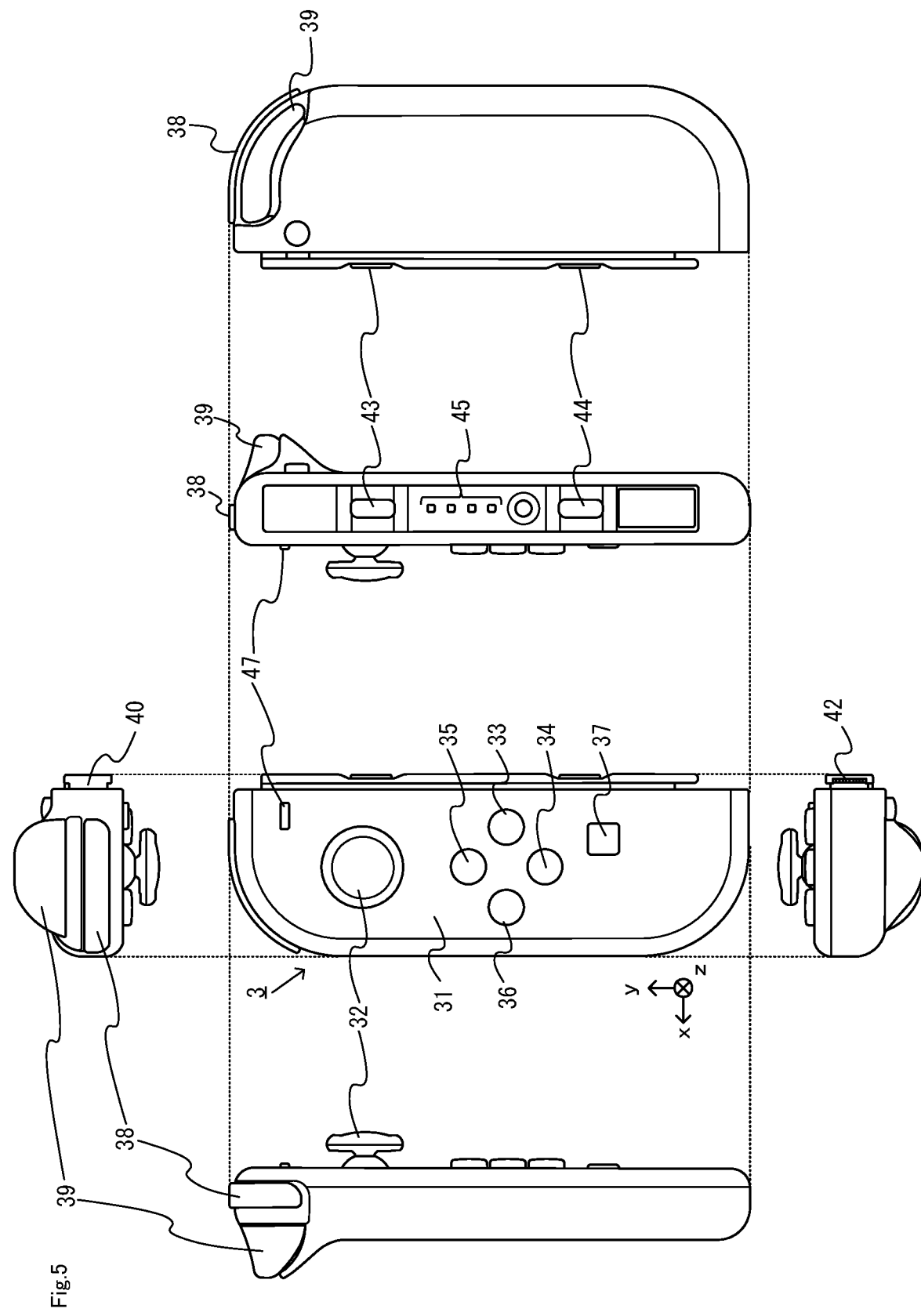
FIG. 5 is six orthogonal views showing an example of a non-limiting left controller.

FIG. 5 is six orthogonal views showing an example of the left controller 3. As shown in FIG. 5, the left controller 3 includes a housing 31. In the exemplary embodiment, the housing 31 has a vertically long shape, e.g., is shaped to be long in an up-down direction (i.e., a y-axis direction shown in FIGS. 2 and 5). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32 (or a joystick). As shown in FIG. 5, the analog stick 32 is provided on a main surface of the housing 31. The analog stick 32 can be used as a direction input section with which a direction can be input. The user tilts a shaft portion of the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 includes the slider 40 as an example of a slide portion that is used for attaching the left controller 3 to another apparatus (e.g., the main body apparatus 2). As shown in FIG. 5, the slider 40 is provided on the right side surface of the housing 31. The slider 40 can slidably engage with the left rail portion 15 of the main body apparatus 2.

The left controller 3 includes a terminal 42 that enables wired communication between the left controller 3 and the main body apparatus 2. The terminal 42 is provided on the slider 40, more specifically, in the vicinity of the lower end of the slider 40 (see FIG. 5). The terminal 42 is provided on a surface of the slider 40 that opposes the housing 31.

Figure 6:
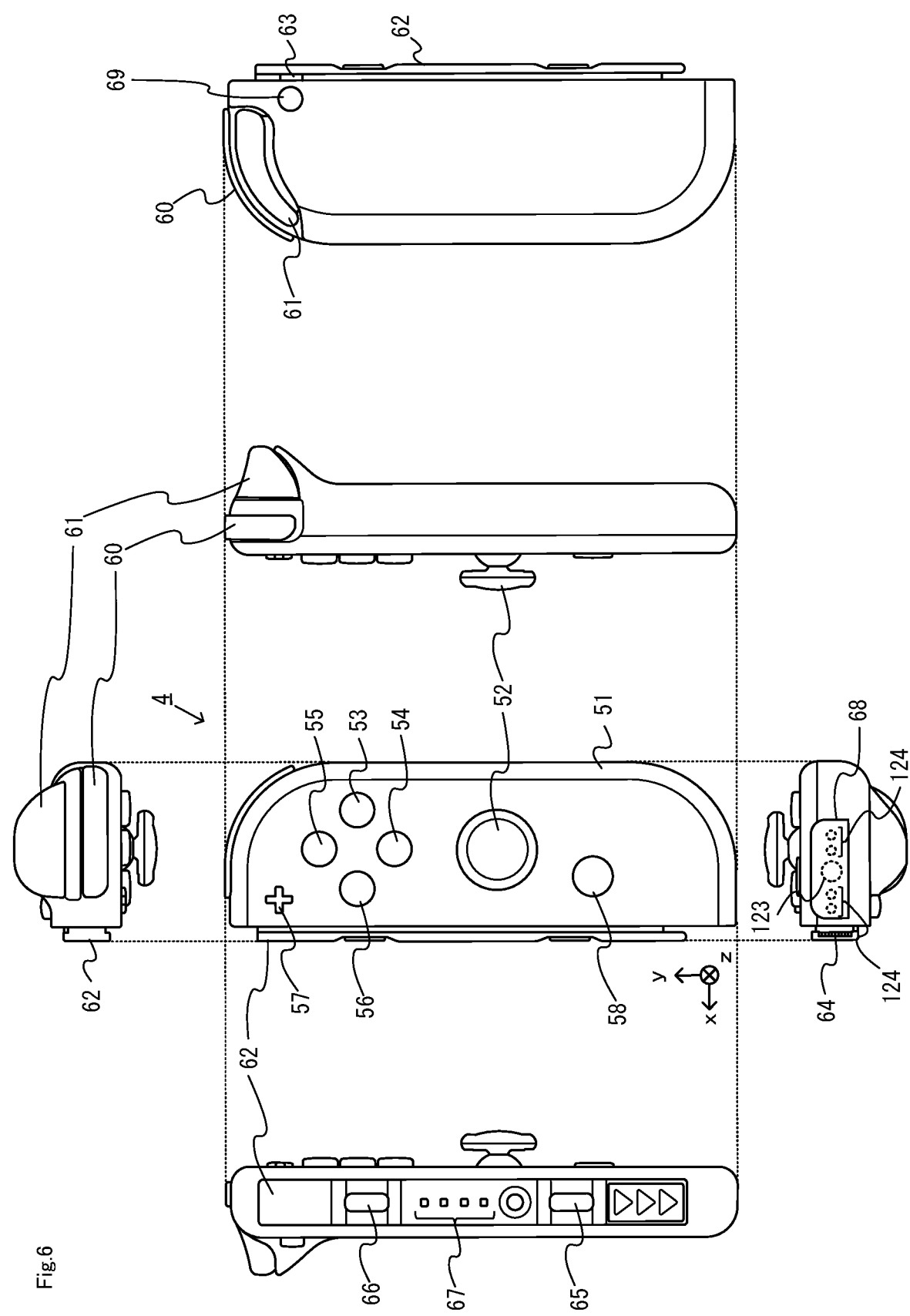
FIG. 6 is six orthogonal views showing an example of a non-limiting right controller.

FIG. 6 is six orthogonal views showing an example of the right controller 4. As shown in FIG. 6, the right controller 4 includes a housing 51. In the exemplary embodiment, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

The right controller 4 includes the slider 62 as an example of a slide portion that is used for attaching the right controller 4 to another apparatus (e.g., the main body apparatus 2 or the ring-shaped extension apparatus 5). As shown in FIG. 6, the slider 62 is provided on the left side surface of the housing 51. The slider 62 is slidably engageable with the left rail portion 15 of the main body apparatus 2, and is slidably engageable with the rail portion of the ring-shaped extension apparatus 5.

As shown in FIG. 6, the right controller 4 includes indicator LEDs 67. The indicator LEDs 67 are an indicator section for notifying the user of predetermined information. The indicator LEDs 67 are provided on the slider 62, specifically, on the engaging surface of the slider 62 (e.g., the surface that faces the x-axis positive direction side shown in FIG. 6). Note that the engaging surface of the slider 62 refers to a surface that opposes the bottom surface of the right rail portion 19 when the right controller 4 is attached to the main body apparatus 2. In the present embodiment, the right controller 4 includes four LEDs as the indicator LEDs 67. For example, the predetermined information includes a number that is assigned by the main body apparatus 2 to the right controller 4, and information relating to the remaining battery level of the right controller 4. Note that as does the right controller 4, the left controller 3 also includes four indicator LEDs 45 (see FIG. 5).

The right controller 4 includes a terminal 64 that enables wired communication between the right controller 4 and the main body apparatus 2. The terminal 64 is provided on the slider 62, more specifically, in the vicinity of the lower end of the slider 62 (see FIG. 6). In the present embodiment, the terminal 64 is provided on a surface of the slider 62 that opposes the housing 51 (more specifically, the left side surface of the housing 51).

When attaching a controller to the main body apparatus 2, the user first inserts the slider of the controller into the rail portion of the main body apparatus 2, thereby engaging the slider and the rail portion with each other. Then, the user slides the slider to the farthest end of the rail portion, thus attaching the controller to the main body apparatus 2.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Figure 7:
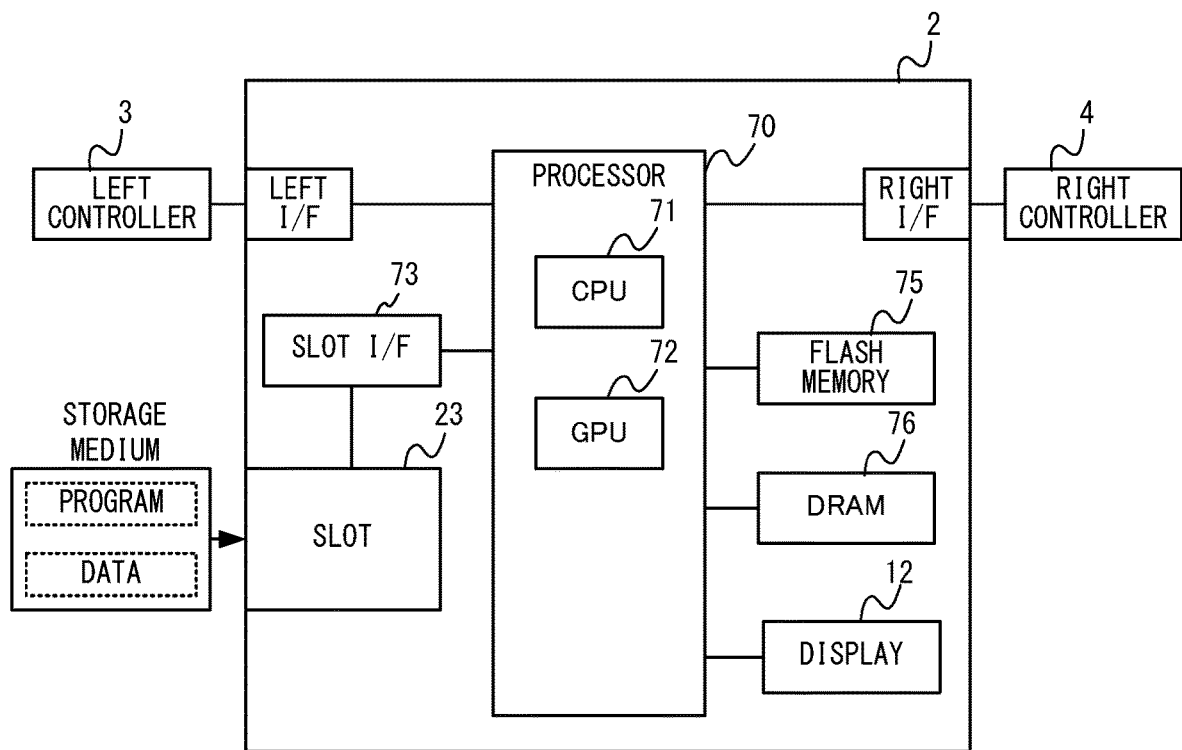
FIG. 7 is a block diagram showing an example of an internal configuration of a non-limiting main body apparatus.

FIG. 7 is a block diagram showing an example of an internal configuration of the game system 1. As shown in FIG. 7, the main body apparatus 2 includes a processor 70, a slot interface (I/F) 73, a slot 23, a flash memory 75, and a DRAM 76. The processor 70 includes a CPU (Central Processing Unit) 71 and a GPU (Graphics Processing Unit) 72. The CPU 71 is capable of executing a game program, and the CPU 71 processes operation data from the controllers, performs game processes based on the operation data, and sends the GPU 72 an instruction to generate an image. The GPU 72 is a processor for performing image processes. Note that the CPU 71 and the GPU 72 may be implemented on separate chips, or may be implemented on a single chip as a SoC (System-on-a-chip).

The slot I/F 73, the flash memory 75, the DRAM 76 and the display 12 are connected to the processor 70. The left controller 3 is connected to the processor 70 via a left interface (I/F) having the left-side terminal 17 described above, and the right controller 4 is connected to the processor 70 via a right interface (I/F) having the right-side terminal 21 described above. The predetermined type of a storage medium is removably inserted into the slot 23. Note that a program and/or data to be stored in the storage medium may be stored in advance in the flash memory 75 or may be downloaded from a network (e.g., the Internet) to be stored in the flash memory 75.

The program (e.g., a game program) and/or data stored in the storage medium (or the flash memory 75) is loaded onto the DRAM 76 before the start of the game process. The CPU 71 executes the program to perform the game process. The CPU 71 sends a command for displaying an image on the display 12 to the GPU 72, and the GPU 72 renders an image in accordance with the command and displays the image on the display 12. Note that the main body apparatus 2 may be connected to an external display device different from the display 12 so as to display the image generated by the GPU 72 on the external display device.

Figure 8:
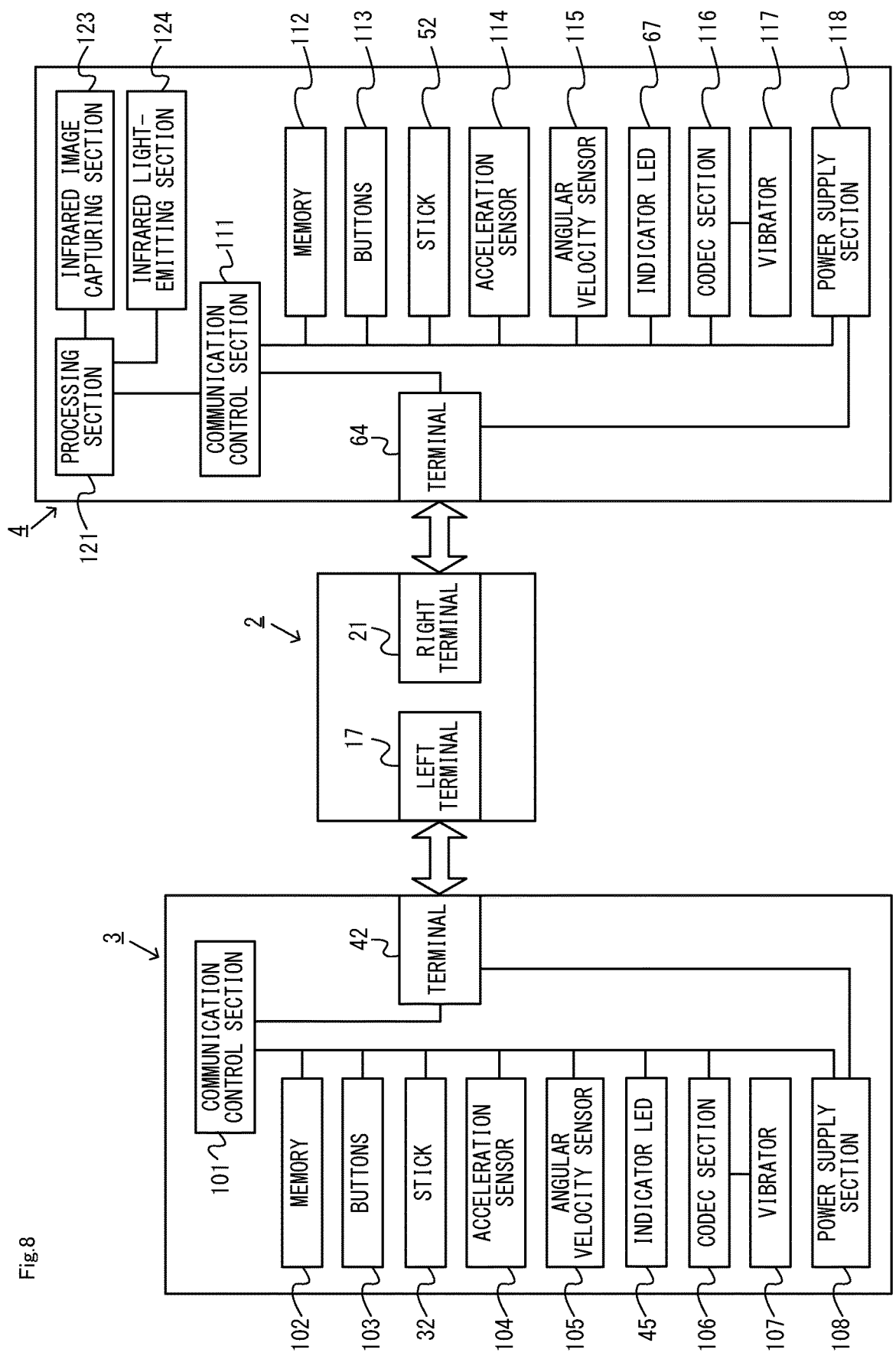
FIG. 8 is a block diagram showing an example of an internal configuration of a non-limiting main body apparatus, a non-limiting left controller and a non-limiting right controller.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, a communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In the exemplary embodiment, an angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The indicator LEDs 45 described above are connected to the communication control section 101. In the present embodiment, the indicator LEDs 45 are controlled by a command from the main body apparatus 2. That is, upon receiving such a command from the main body apparatus 2, the communication control section 101 outputs, to the indicator LEDs 45, a control signal for controlling ON/OFF of the indicator LEDs 45 in accordance with the command.

The left controller 3 includes a power supply section 108. In the exemplary embodiment, the power supply section 108 includes a battery and a power control circuit. Although not shown in FIG. 8, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The indicator LEDs 67 of the right controller 4 operate in a similar manner to the indicator LEDs 45 of the left controller 3. That is, upon receiving a command from the main body apparatus 2, the communication control section 111 outputs, to the indicator LEDs 67, a control signal for controlling ON/OFF of the indicator LED 67 in accordance with the command.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

[1-2. Configuration of Ring-Shaped Extension Apparatus]

Figure 9:
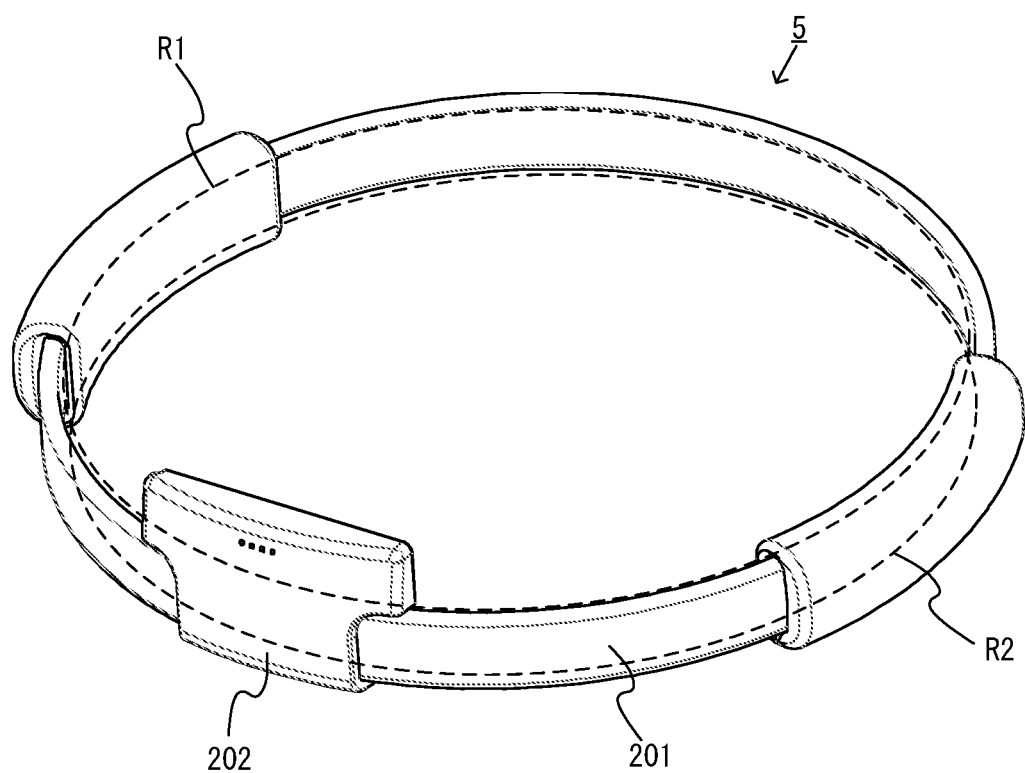
FIG. 9 is a perspective view showing an example of a non-limiting ring-shaped extension apparatus.
Figure 10:
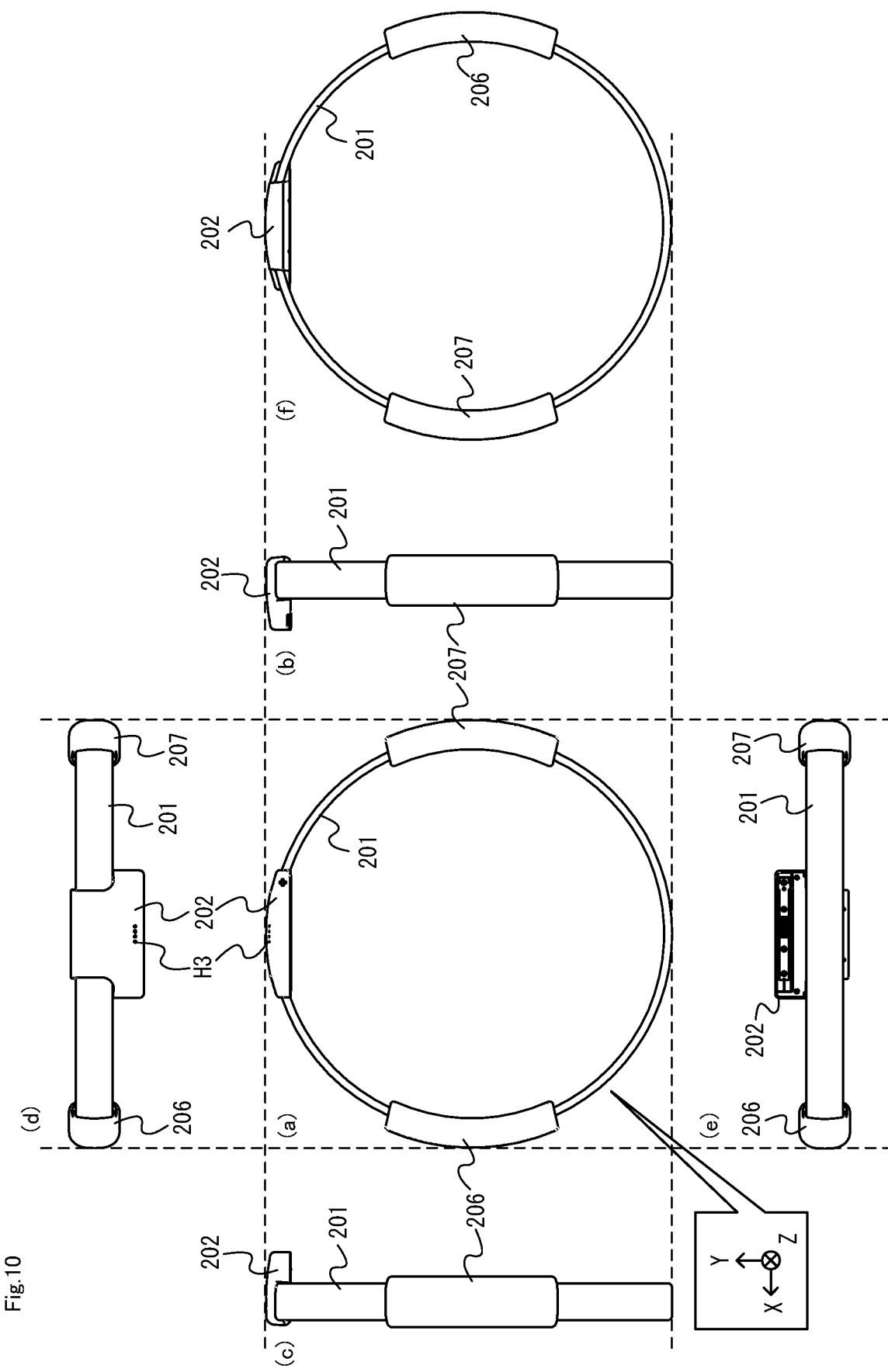
FIG. 10 is six orthogonal views showing an example of a non-limiting ring-shaped extension apparatus.

Next, a configuration of the ring-shaped extension apparatus 5 will be described. FIG. 9 is a perspective view showing an example of a ring-shaped extension apparatus. FIG. 10 is six orthogonal views showing an example of a ring-shaped extension apparatus. In FIG. 10, (a) is a front view, (b) is a right side view, (c) is a left side view, (d) is a top view, (e) is a bottom view, and (f) is a back view.

In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment (see FIG. 15). The user can operate the ring-shaped extension apparatus 5 by performing a fitness exercise operation using the ring-shaped extension apparatus 5 as if the user were doing an exercise, for example. That is, the ring-shaped extension apparatus 5 gives an extension to the conventional operation method and allows the user for novel operation methods. In the present embodiment, the ring-shaped extension apparatus 5 is an apparatus that extends the function of the right controller 4, more specifically, an apparatus that extends the operation function of the right controller 4. That is, by using the ring-shaped extension apparatus 5 to which the right controller 4 is attached, the user can perform an operation that cannot be performed only with the right controller 4.

As shown in FIG. 9 and FIG. 10, the ring-shaped extension apparatus 5 includes a ring-shaped portion 201 and a main portion 202. The ring-shaped portion 201 has a ring shape. Note that in the present embodiment, the ring-shaped portion 201 includes an elastic member 241 and a base portion 242 (see FIG. 18) and is formed in a ring shape. In the present embodiment, the ring-shaped portion 201 has a circular ring shape. Note that in other embodiments, the ring-shaped portion 201 may be of any shape, e.g., an elliptical ring shape. In the present embodiment, the diameter of the ring formed by the ring-shaped portion 201 is 30 [cm]. The ring-shaped portion 201 may be sized so that the user can hold a portion thereof one side with the left hand and another portion thereof on the other side with the right hand, the portions being symmetrical with each other with respect to the center of the ring. The size of the ring-shaped portion 201 may be determined in accordance with the body size and the age group of users contemplated, and the diameter may be 20 to 50 [cm], for example. In the present embodiment, the ring-shaped portion 201 is a band-shaped member having a predetermined width (e.g., 3 to 10 [cm]) that is formed in a ring shape. Herein, the generally cylindrical space inside the ring-shaped portion 201 (generally, a cylindrical space whose bottom surfaces are the two circular areas R1 and R2 shown in FIG. 9) is referred to as "the space surrounded by the ring-shaped portion 201". Note that the circular area R1 is a circular area whose circumference is defined by the edge of the elastic member 241 on the front side (i.e., the Z-axis negative direction side shown in FIG. 9), and the circular area R2 is a circular area whose circumference is defined by the edge of the elastic member 241 on the rear side (i.e., the Z-axis positive direction side shown in FIG. 9). Although the details will be described later, as the band-shaped elastic member 241 is bent into a circular shape (strictly speaking, an incomplete circular shape), the ring-shaped portion 201 is formed into a ring shape that includes the elastic member 241 and the base portion 242. As the elastic member 241 is bent into a circular shape, the opposing long sides of the band of the elastic member 241 are both formed into a circular shape that defines the circular area (R1, R2) therein. That is, the circumferences of the areas R1 and R2 are defined by the opposing long sides the band of the elastic member 241 bent as described above. In the present embodiment, a first plane that includes the circular area R1 and a second plane that the circular area R2 are both parallel to the XY plane, and the two areas R1 and R2 appear to coincide with each other as seen from the Z-axis direction. The cylindrical space is a space that is defined between the first plane and the second plane and within the circular areas R1 and R2 as seen from the direction (i.e., the Z-axis direction) perpendicular to the planes. At least a portion (the elastic member in the present embodiment) of the ring-shaped portion 201 is elastically deformable. Note that in the present embodiment, a member being "elastically deformable" means that the member is capable of being elastically deformed by such an amount that the deformation can be perceived by a human.

The right controller 4 can be attached to the main portion 202. Note that a state where "the right controller 4 is attached to the main portion 202" refers to a state where the right controller 4 is put on the main portion 202. It can be said to be for example a state where the right controller 4 is integrally secured to the main portion 202. Alternatively, it can be said to be for example a state where the right controller 4 and the main portion 202 cannot be separated from each other without a special operation or without applying a certain amount of load thereto. Note that to "secure" means that the right controller 4 and the main portion 202 do not basically move relative to each other, and there may be a slight movement therebetween.

The main portion 202 is provided on the ring-shaped portion 201. Note that "the main portion 202 being provided on the ring-shaped portion 201" means that the main portion 202 is secured to the ring-shaped portion 201.

Figure 11:
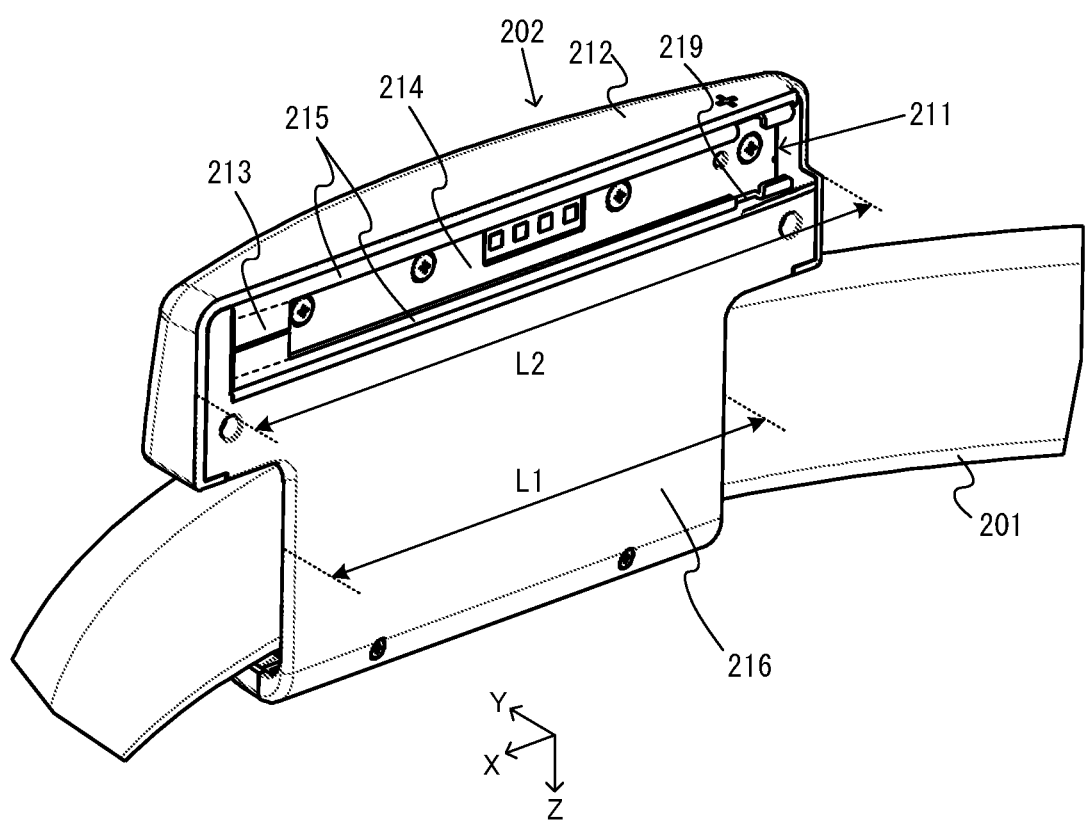
FIG. 11 is a perspective view showing the vicinity of a main portion of a ring-shaped extension apparatus shown in FIG. 9.

FIG. 11 is a perspective view showing the vicinity of the main portion 202 of the ring-shaped extension apparatus 5 shown in FIG. 9. As shown in FIG. 11, the main portion 202 includes a rail portion 211. The rail portion 211 is an example of an attachment portion to which the right controller 4 can be attached. In the present embodiment, the rail portion 211 slidably engages with the slider 62 of the right controller 4. The rail portion 211 is an example of an extension apparatus-side engagement portion that engages with a game controller-side engagement portion (specifically, the slider 62). It can be said that the rail portion 211 is an example of an extension apparatus-side slide portion that engages with a game controller-side slide portion.

The rail portion 211 is similar to the rail portion of the main body apparatus 2 in that it is slidably engageable with the slider of the controller. Therefore, the rail portion 211 may have a similar configuration to that of the rail portion of the main body apparatus 2. By means of the rail portion 211, the right controller 4 is attached to the main portion 202. Note that although the details of the configuration of the rail portion 211 will be described later, the rail portion 211 is provided so as to extend in one direction (specifically, in the left-right direction to be described below).

Figure 12:
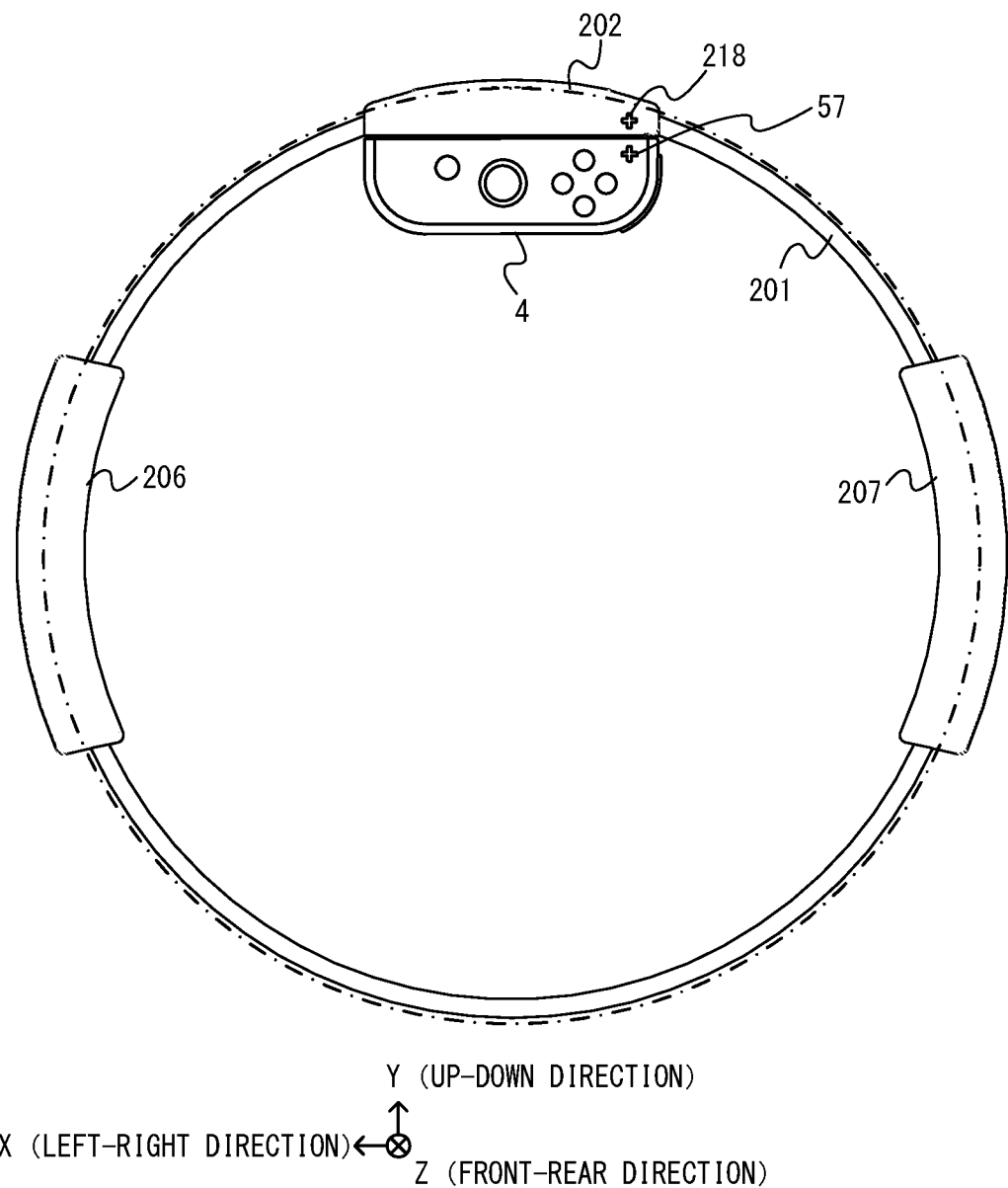
FIG. 12 is a diagram showing an example of a state where a right controller is attached to a non-limiting ring-shaped extension apparatus.

FIG. 12 is a diagram showing an example of a state where the right controller 4 is attached to the ring-shaped extension apparatus 5. Herein, in the present embodiment, the up-down direction, the left-right direction and the front-rear direction of the ring-shaped extension apparatus 5 are defined as follows. First, in the present embodiment, the direction parallel to the direction (referred to as the "front view direction") in which the ring formed by the ring-shaped portion 201 is viewed from front is the front-rear direction of the ring-shaped extension apparatus 5 (i.e., the Z-axis direction shown in FIG. 12). For example, "the direction in which the ring is viewed from front" is the direction from which the area of the shape represented by the outer edge of the ring appears largest. Where the ring is a circular ring, the "front view direction" can also be said to be the direction from which the ring appears circular.

As shown in FIG. 11, the rail portion 211 is provided on one side in the front-rear direction relative to the ring-shaped portion 201. Specifically, in the present embodiment, as shown in FIG. 11, the rail portion 211 is provided on the Z-axis negative direction side relative to the ring-shaped portion 201. Note that in the present embodiment, this side is denoted as the front side (in other words, the front near side) of the ring-shaped extension apparatus 5, and the opposite side thereto is denoted as the rear side (in other words, the back side) of the ring-shaped extension apparatus 5.

The rail portion 211 of the main portion 202 is provided so as to extend in a direction that is substantially perpendicular to the front-rear direction. In the present embodiment, the direction that is perpendicular to the front-rear direction and substantially parallel to the direction in which the rail portion 211 extends is denoted as the left-right direction of the ring-shaped extension apparatus 5 (i.e., the X-axis direction shown in FIG. 12).

As used herein, "substantially (in a certain state)" means to include both cases where the certain state is achieved in a strict sense and cases where the certain state is generally achieved. For example, "the left-right direction is substantially parallel to the rail portion 211" means to include both cases where the left-right direction is parallel to the rail portion 211 in a strict sense and cases where they are generally parallel to each other though not strictly parallel to each other.

As shown in FIG. 11, the rail portion 211 is shaped so that one end thereof in the left-right direction is open with the other end thereof being closed. In the present embodiment, the side of the first end that is open is denoted as the right side of the ring-shaped extension apparatus 5, and the side of the other end as the left side of the ring-shaped extension apparatus 5. That is, the direction (i.e., the X-axis positive direction shown in FIG. 12) in which the right controller 4 is inserted into the rail portion 211 of the main portion 202, as the ring-shaped extension apparatus 5 is viewed from the front side, is the left direction of the ring-shaped extension apparatus 5, and the opposite direction thereto is the right direction of the ring-shaped extension apparatus 5 (see FIG. 12).

Moreover, in the present embodiment, the direction that is perpendicular to the front-rear direction and the left-right direction is denoted as the up-down direction of the ring-shaped extension apparatus 5 (i.e., the Y-axis direction shown in FIG. 12). The direction from the main portion 202 toward the center of the ring-shaped portion 201, as the ring-shaped extension apparatus 5 is viewed from the front side, is denoted as the down direction of the ring-shaped extension apparatus 5 (i.e., the Y-axis negative direction shown in FIG. 12), and the opposite direction thereto as the up direction of the ring-shaped extension apparatus 5.

Where directions of the ring-shaped extension apparatus 5 are defined as described above, it can be said that the main portion 202 is provided on the upper end portion of the ring-shaped portion 201. Note that in the present embodiment, where directions of the ring-shaped extension apparatus 5 are defined as described above, the up direction is equal to the direction (i.e., the x-axis positive direction in FIG. 6) in which the shaft portion of the analog stick 52 is inclined for giving an up instruction to the analog stick 52 of the right controller 4 as attached to the ring-shaped extension apparatus 5.

[1-2-1. Main Portion]

As shown in FIG. 11, the main portion 202 includes a housing 212. The housing 212 is secured to the ring-shaped portion 201 using screws, for example (the details will be described later). In the present embodiment, the housing 212 is secured to the ring-shaped portion 201 so as to cover a portion of the ring-shaped portion 201 (specifically, a portion of the ring-shaped portion 201 near the upper end). As shown in FIG. 11, the housing 212 is shaped so as to protrude forward relative to the ring-shaped portion 201. Note that in the present embodiment, the housing 212 is shaped so as to also protrude rearward relative to the ring-shaped portion 201. In the present embodiment, the amount by which the housing 212 protrudes forward relative to the ring-shaped portion 201 is greater than the amount by which the housing 212 protrudes rearward relative to the ring-shaped portion 201.

As shown in FIG. 11, the rail portion 211 is provided on the housing 212. The rail portion 211 has a groove extending in the left-right direction (in other words, the slide direction). As shown in FIG. 11, the groove of the rail portion 211 is open at the right end thereof (i.e., the end thereof on the X-axis negative direction side).

The groove of the rail portion 211 is shaped so that the groove is slidably engageable with the slider 62 of the right controller 4. Specifically, the cross-sectional shape of the slider 62 of the right controller 4 along a section perpendicular to the slide direction (i.e., the y-axis direction shown in FIG. 6) is generally a T-letter shape. The slider 62 has a top surface on one side that is away from the side surface of the right controller 4 (i.e., the surface on the x-axis positive direction side shown in FIG. 6), and has protruding portions that are protruding on opposite sides of the direction (i.e., the z-axis direction shown in FIG. 6) parallel to the top surface as viewed from the slide direction. On the other hand, the rail portion 211 has two opposing portions 215 that are opposing the bottom surface 214 of the groove and are protruding inward from the side surfaces of the groove, as viewed from the direction perpendicular to the slide direction (i.e., the X-axis direction shown in FIG. 11). The slider 62 is inserted into the rail member 211 so that the protruding portions of the slider 62 slide into between the bottom surface 214 and the opposing portions 215 of the rail portion 211, thereby engaging the slider 62 and the rail member 211 with each other. Thus, as the slider 62 is inserted into the rail member 211 in a predetermined straight direction (i.e., the slide direction), the rail member 211 engages with the slider 62 so that the slider 62 is slidable against the rail member 211 in the straight direction. The slider 62 in engagement with the rail member 211 is restricted so as not come off the rail member 211 in a direction that is perpendicular to the slide direction (or a direction that is different from the slide direction).

A stopper portion 213 for stopping the slide movement of the slider 62, which has been inserted from the right end of the rail portion 211, is provided at the left end of the rail portion 211 (see FIG. 11). The stopper portion 213 is a part of the opposing portion 215. The stopper portion 213 is provided at the left end of the groove of the rail portion 211. Herein, across the groove excluding the left end thereof, the opposing portion 215 protrudes by a predetermined length from the side surface of the groove. At the left end portion of the groove, the opposing portion 215 protrudes by a greater length than the predetermined length. In the present embodiment, the part of the opposing portion 215 that is protruding by a greater length than the predetermined length is referred to as the stopper portion 213 (see FIG. 11). Note that the dotted lines in FIG. 11 are drawn for ease of understanding of the position of the stopper portion 213, and the dotted lines are not actually drawn on the rail portion 211. Thus, the slider 62 comes into contact with the stopper portion 213 as the slider 62 is inserted from the right end of the rail portion 211 and is slid toward the left end of the rail portion 211. Note that the lower end portion (i.e., the end portion on the y-axis negative direction side shown in FIG. 6) of the slider 62 is shaped so that the protruding portion thereof on the side that is away from the side surface of the right controller 4 is protruding relative to the base portion on the side that is close to the side surface of the right controller 4 (i.e., the side that is in contact with the side surface) as viewed from the direction (i.e., the z-axis direction shown in FIG. 6) that is parallel to the top surface and perpendicular to the slide direction (see FIG. 6). When the slider 62 is slid in the insertion direction (i.e., the direction from the right end to the left end of the rail portion 211), the stopper portion 213 comes into contact with the base portion. Note that with the stopper portion 213 in contact with the base portion, the protruding portion may be or may not be in contact with the wall surface on the left side of the groove of the rail portion 211 (i.e., the far side where the slider 62 is inserted from the right end of the groove). As described above, the slide movement of the slider 62 is stopped as the slider 62 comes into contact with the stopper portion 213. Note that in other embodiments, when the slider 62 is slid in the insertion direction, the slide movement of the slider 62 may be stopped as the protruding portion comes into contact with the wall surface on the left side of the groove of the rail portion 211 before the stopper portion 213 comes into contact with the base portion.

In the present embodiment, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. As shown in FIG. 11, the opposing portion 215 of the rail portion 211 is provided with a notch 219. The notch 219 is provided at a position that opposes the latch portion 63 in a state where the slider 62 is inserted to the far end of the rail portion 211 (specifically, a state where the slider 62 is in contact with the stopper portion 213. Note that the slider 62 does not need to be strictly in contact with the stopper portion 213 but there may be a slight gap between the slider 62 and the stopper portion 213). Therefore, with the slider 62 inserted to the far end of the rail portion 211, the latch portion 63 snaps into the notch 219. That is, the latch portion 63 engages with the notch 219. With the latch portion 63 in engagement with the notch 219, the slide movement of the slider 62 is restricted in the direction in which the slider 62 is removed from the rail portion 211 (i.e., the direction in which the slider 62 moves away from the stopper portion 213). Therefore, with the latch portion 63 in engagement with the notch 219, the slider 62 does not come off the rail portion 211 even if a certain force is applied. As described above, as the latch portion 63 engages with the notch 219 while the rail portion 211 is in engagement with the slider 62, the right controller 4 is attached to the main portion 202.

Note that with the latch portion 63 in engagement with the notch 219, the slide movement of the slider 62 against the rail portion 211 is restricted by the latch portion 63 both for the insertion direction and for the reverse direction of the insertion direction. Therefore, in the state described above, the slide movement in the insertion direction can be said to be restricted by the stopper portion 213 or can be said to be restricted by the latch portion 63. Note that in other embodiments, the slide movement in the insertion direction may be restricted by either one of the stopper portion 213 and the latch portion 63.

Note that although not shown in the figures, in the present embodiment, the upper surface (i.e., the surface on the y-axis positive direction side shown in FIG. 6) of the latch portion 63 is substantially perpendicular to the slide direction, whereas the lower surface of the latch portion 63 is a sloped surface that is inclined relative to the slide direction. Note that the lower surface is sloped so that when the slider 62 is inserted into the rail portion 211 and moved in the insertion direction, the latch portion 63 is unlikely to interfere with the opposing portion 215, allowing for smooth slide movement. Since the upper and lower surfaces of the latch portion 63 are configured as described above, the movement of the slider 62 in the reverse direction of the insertion direction is restricted with a relatively strong force because the upper surface is in contact with the notch 219 of the opposing portion 215 while the latch portion 63 is in engagement with the notch 219. On the other hand, the movement of the slider 62 in the insertion direction is restricted with a relatively weak force because the sloped surface is in contact with the notch 219 of the opposing portion 215. Note however that in other embodiments, the lower surface of the latch portion 63 may be substantially perpendicular to the slide direction, as is the upper surface of the latch portion 63, so as to increase the force with which to restrict the slide movement of the latch portion 63 in the insertion direction.

As described above, in the present embodiment, the "state where the right controller 4 is attached to the main portion 202" refers to a state where the respective engagement portions thereof (e.g., the rail portion 211 and the slider 62) are in engagement with each other and where the slide movement is restricted. Thus, the right controller 4 is put on the main portion 202. In the present embodiment, the engagement of the latch portion 63 with the notch 219 is released as the latch portion 63 is retracted into the slider 62 (by operating a release button 69 to be described below). This releases the state where the right controller 4 is attached to, i.e., put on, the main portion 202. Then, the right controller 4 is removed from the main portion 202 when the slider 62 is slid in the direction opposite to the insertion direction and the engagement between the slider 62 and the rail portion 211 is released.

Note that while the slide movement is restricted by the latch portion 63 and the notch 219 in the present embodiment, there is no limitation on the method for restricting the slide movement. For example, in other embodiments, the rail portion 211 may include a portion that comes into contact with the slider 62 so as to press the slider 62 with a force that includes a component perpendicular to the slide direction when the slider 62 is inserted to the far end of the rail portion 211, thereby restricting the slide movement by means of the frictional force between this portion and the slider 62.

Thus, when the right controller 4 is put on the ring-shaped extension apparatus 5, the user first inserts the slider 62 of the right controller 4 into the rail portion 211 from the right end of the rail portion 211. Then, the user slides the inserted slider 62 toward the left end of the rail portion 211 to the far end thereof, thereby engaging the latch portion 63 with the notch 219, achieving the state where the right controller 4 is attached to the main portion 202. As described above, the user can put the right controller 4 on the ring-shaped extension apparatus 5.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch 219. Thus, in the state where the right controller 4 is attached to the main portion 202 of the ring-shaped extension apparatus 5, the user can easily remove the right controller 4 from the ring-shaped extension apparatus 5 by pressing the release button 69.

As described above, the housing 212 is provided so as to protrude forward relative to the ring-shaped portion 201. Specifically, as shown in FIG. 11, an inner side surface 216 of the housing 212 (i.e., the surface that faces the central axis of the ring formed by the ring-shaped portion 201) has a portion that protrudes more forward than it does rearward relative to the ring-shaped portion 201. The rail portion 211 is provided on this portion of the inner side surface 216. Thus, the rail portion 211 is provided on the outer side of the space surrounded by the ring-shaped portion 201. Note that the region "on the outer side of the space surrounded by the ring-shaped portion 201" at least includes a region that is forward of the front end of the ring-shaped portion 201 with respect to the front view direction, and a region that is rearward of the rear end of the ring-shaped portion 201 with respect to the front view direction. In the present embodiment, the rail portion 211 is provided in such a region. More specifically, as the ring formed by the ring-shaped portion 201 is viewed from the front side is viewed from the front side, the rail portion 211 is on one side in the front view direction relative to the hole of the housing 212 (i.e., the hole through which the ring-shaped portion 201 passes). Note that it can also be said that the rail portion 211 is provided in such an orientation that the slide direction thereof is substantially perpendicular to the front view direction and is provided at a position that is shifted off the ring-shaped portion 201 in the front view direction. Thus, the rail portion 211 is provided at a position that is away from the ring-shaped portion 201 in the front view direction (specifically, on the near side relative to the ring-shaped portion 201 as viewed from the front view direction).

According to the description above, the ring-shaped portion 201, which is deformed by an operation of the user, is less likely to contact the rail portion 211. Thus, it is possible to reduce the possibility that the ring-shaped portion 201 contacts the rail portion 211, thereby detaching the right controller 4 from the ring-shaped extension apparatus 5. While one may consider increasing the diameter of the ring-shaped portion 201 so that the ring-shaped portion 201, when deformed, is less likely to contact the rail portion 211, the need for increasing the size of the ring-shaped portion 201 is reduced in the present embodiment (because the rail portion 211 is shifted in the front view direction relative to the ring-shaped portion 201 so that they are less likely to contact each other). When the user puts the right controller 4 on the ring-shaped extension apparatus 5 by inserting the slider 62 of the right controller 4 into the rail portion 211, the right controller 4 is unlikely to contact the ring-shaped portion 201. This makes it easier for the user to perform the operation of putting the right controller 4 on the ring-shaped extension apparatus 5.

In the present embodiment, the rail portion 211 is provided outside the area through which the ring-shaped portion 201 passes when the ring-shaped portion 201 is deformed so as to elongate in the up-down direction (i.e., the direction parallel to the straight line that connects together the center of the rail portion 211 and the center of the ring formed by the ring-shaped portion 201) and shrink in the left-right direction. Thus, it is possible to achieve the state where the rail portion 211 is unlikely to contact the ring-shaped portion 201.

In the present embodiment, the slide direction of the rail portion 211 is perpendicular to the front view direction. Thus, the rail portion 211 can be arranged in a compact arrangement so as not to protrude in the front view direction. In the present embodiment, the rail portion 211 is provided so that the straight line that connects together the central portion of the rail portion 211 in the slide direction and the center of the ring is perpendicular to the slide direction as the ring formed by the ring-shaped portion 201 is viewed from the front side. Thus, the rail portion 211 can be arranged close to the ring-shaped portion 201 (in the present embodiment, the rail portion 211 is arranged in the vicinity of the inner circumference of the ring-shaped portion 201 as viewed from the front view direction as shown in FIG. 12) while maintaining the state where the rail portion 211 is unlikely to contact the ring-shaped portion 201. Therefore, the ring-shaped extension apparatus 5 as a whole can be made compact.

As shown in FIG. 11, the rail portion 211 is provided on one side of the main portion 202 that is closer to the central axis of the ring formed by the ring-shaped portion 201 (i.e., located on the side of the central axis of the ring relative to the center of the main portion 202). Specifically, the rail portion 211 is provided on the surface of the main portion 202 that is facing the center of the ring (specifically, the inner side surface 216) so that the right controller 4 can be attached facing the inner side of the ring-shaped portion 201. The rail portion 211 (specifically, the bottom surface 214 of the rail portion 211) faces toward the space surrounded by the ring-shaped portion 201, i.e., toward the central axis of the ring formed by the ring-shaped portion 201. Note that "the central axis of the ring" is an axis that passes through the center of the ring as viewed from the front side and extends in parallel to the front view direction of the ring. Moreover, "the rail portion 211 facing toward the central axis of the ring" is not limited to embodiments where the normal to the bottom surface of the rail portion 211 strictly passes through the central axis of the ring.

As the ring formed by the ring-shaped portion 201 is viewed from the front side, the rail portion 211 is provided at a position on the inner side relative to the outer edge of the ring (see the one-dot-chain line shown in FIG. 12. Note however that the one-dot-chain line is drawn in FIG. 12 to be slightly on the outer side of the outer edge of the ring for the sake of illustration). Note that in the present embodiment, since the right controller 4 is attached to the main portion 202 so that the bottom surface of the rail portion 211 faces toward the center of the ring and the left side surface of the right controller 4 is parallel to the bottom surface of the rail portion 211, and the primary surface of the right controller 4 is perpendicular to the left side surface, the front view direction is perpendicular to the primary surface. Therefore, it can be said that "as the ring formed by the ring-shaped portion is viewed from the front side" in the present embodiment means as the ring is viewed from the direction perpendicular to the primary surface of the right controller 4 attached to the main portion 202. As described above, the main portion 202 is attached to the right controller 4 so as to be located on the inner side relative to the outer edge of the ring as the ring formed by the ring-shaped portion 201 is viewed from the front side. Note that it can also be said that the main portion 202 is attached to the right controller 4 so that the right controller 4 is located on the side of the center of the ring formed by the ring-shaped portion 201 relative to the main portion 202. Note that "on the inner side relative to the outer edge of the ring formed by the ring-shaped portion 201" refers to an area that can be seen on the inner side of the outer edge of the ring as viewed from the front view direction. Therefore, the rail portion 211 may be at a different location from the ring-shaped portion 201 with respect to the front view direction.

According to the configuration where the rail portion 211 faces toward the central axis of the ring or the configuration where the rail portion 211 is located on the inner side relative to the outer edge of the ring as described above, it is possible to reduce the possibility that the right controller 4 contacts other objects when the user uses the ring-shaped extension apparatus 5 with the right controller 4 attached thereto. Therefore, it is possible to reduce the possibility that the right controller 4 contacts other objects so that the right controller 4 comes off the ring-shaped extension apparatus 5 or is damaged.

Note that in other embodiments, at least a portion of the rail portion 211 may be provided at a position on the inner side relative to the outer edge of the ring formed by the ring-shaped portion 201. That is, the right controller 4 may be attached to the main portion 202 so that at least a portion of the right controller 4 is at a position on the inner side relative to the outer edge of the ring formed by the ring-shaped portion 201. This also makes it possible to reduce the possibility that the right controller 4 attached to the ring-shaped extension apparatus 5 contacts other objects.

In the present embodiment, the primary surface of the right controller 4 attached to the main portion 202 faces the front side as the ring formed by the ring-shaped portion 201 is viewed from the front side (see FIG. 12). The direction in which the analog stick 52 sticks out is the direction in which a portion of the main portion 202 where the rail portion 211 is provided (i.e., a portion that protrudes forward) protrudes relative to the ring-shaped portion 201. Therefore, in the present embodiment, when the user holds the ring-shaped extension apparatus 5 while facing the ring-shaped extension apparatus 5, the primary surface of the right controller 4 attached to the ring-shaped extension apparatus 5 faces the user. Thus, it is easy for the user to operate the operation sections provided on the primary surface of the right controller 4 (e.g., the analog stick 52 and the buttons 53 to 56) even when the right controller 4 is attached to the ring-shaped extension apparatus 5.

As shown in FIG. 12, the housing 212 has a marking 218 thereon that is located so as to be next to a plus button 57 of the right controller 4 when attached to the main portion 202. Specifically, the marking 218 is located so as to come gradually closer to the plus button 57 as the right controller 4 is slid in the insertion direction while in engagement with the rail portion 211. Moreover, the marking 218 is located so as to be perpendicular to the slide direction with respect to the plus button 57 in the state where the right controller 4 is attached to the main portion 202. Moreover, the marking 218 is located so as to be in symmetry with the plus button 57 with respect to the boundary between the primary surface of the right controller 4 and the housing 212 (herein, the gap between the primary surface of the right controller 4 and the housing 212). That is, the length of the perpendicular drawn from the boundary to the position of the marking 218 is generally equal to the length of the perpendicular drawn from the boundary to the position of the plus button 57. With the right controller 4 attached to the main portion 202, the distance between the marking 218 and the plus button 57 is shorter than the distance between the operation section (herein, the X button 55) of the right controller 4 that is closest to the plus button 57 and the plus button 57. With the right controller 4 attached to the main portion 202, an operation section, among all the operation sections of the right controller 4, that is located closest to the marking 218 is the plus button 57.

As shown in FIG. 12, the marking 218 represents the plus button 57. Note that the marking 218 may be a (solid) part provided on the housing 212 or may be a pattern drawn on the housing 212. While the marking 218 has the same shape as the plus button 57 in the present embodiment, the marking 218 may have any shape that represents the plus button 57. Note that "the shape of the marking" means that it may be a solid shape whose outer shape represents the object or may be a planar shape whose pattern represents the object. Instead of directly representing the plus button 57, the marking 218 may have a shape that is reminiscent of the plus button 57 or may have a shape that is associated with the plus button 57 (excluding a shape that represents a minus sign). With the marking 218, the user can realize that the right controller 4 having the plus button 57 thereon, rather than the left controller 3 having the minus button 47 thereon, should be put on the ring-shaped extension apparatus 5. Based on the position of the marking 218, the user can realize that when the right controller 4 is put on the ring-shaped extension apparatus 5, the user should insert the right controller 4 into the rail portion 211 up to a position where the plus button 57 and the marking 218 are aligned together. Note that the marking 218 may have a shape such as an arrow shape, for example, instead of a shape relating to the plus button 57. Thus, with the marking 218, it is easier for the user to perform the operation of putting the right controller 4 on the ring-shaped extension apparatus 5. Note that the shape and the position of the marking 218 are not limited to those described above, but any suitable changes may be made thereto as long as the user can realize that the right controller 4, rather than the left controller 3, should be put on the ring-shaped extension apparatus 5, and the user can realize how far into the rail portion 211 the right controller 4 should be inserted when putting the right controller 4 on the ring-shaped extension apparatus 5.

The ring-shaped extension apparatus 5 includes a terminal (a terminal 294 shown in FIG. 26) for electrical connection with the right controller 4. The terminal 294 is provided at a position along the rail portion 211 that corresponds to the terminal 64 of the right controller 4 attached to the ring-shaped extension apparatus 5. The terminal 64 of the right controller 4 is provided on a surface that opposes the housing 51 near the lower end (i.e., the end portion in the insertion direction) of the slider 62 (see FIG. 6). Thus, the terminal 294 is provided on the reverse side surface of the stopper portion 213 (i.e., a surface that opposes the bottom surface 214 of the rail portion 211). Therefore, when the right controller 4 is attached to the ring-shaped extension apparatus 5 (i.e., when the latch portion 63 of the right controller 4 engages with the notch 219 of the rail portion 211 while the slider 62 of the right controller 4 is in engagement with the rail portion 211), the terminal 294 of the ring-shaped extension apparatus 5 and the terminal 64 of the right controller 4 come into contact with each other. Thus, the terminal 294 of the ring-shaped extension apparatus 5 and the terminal 64 of the right controller 4 are electrically connected to each other. Note that in the present embodiment, the terminal 294 is provided on the side (i.e., the left side) of the rail portion 211 that is opposite to the side from which the right controller 4 is inserted. Thus, when the right controller 4 is attached to the rail portion 211, it is possible to reduce the frequency the terminal 294 contacts the right controller 4, and it is possible to reduce the possibility that the terminal 294 is damaged.

Figure 13:
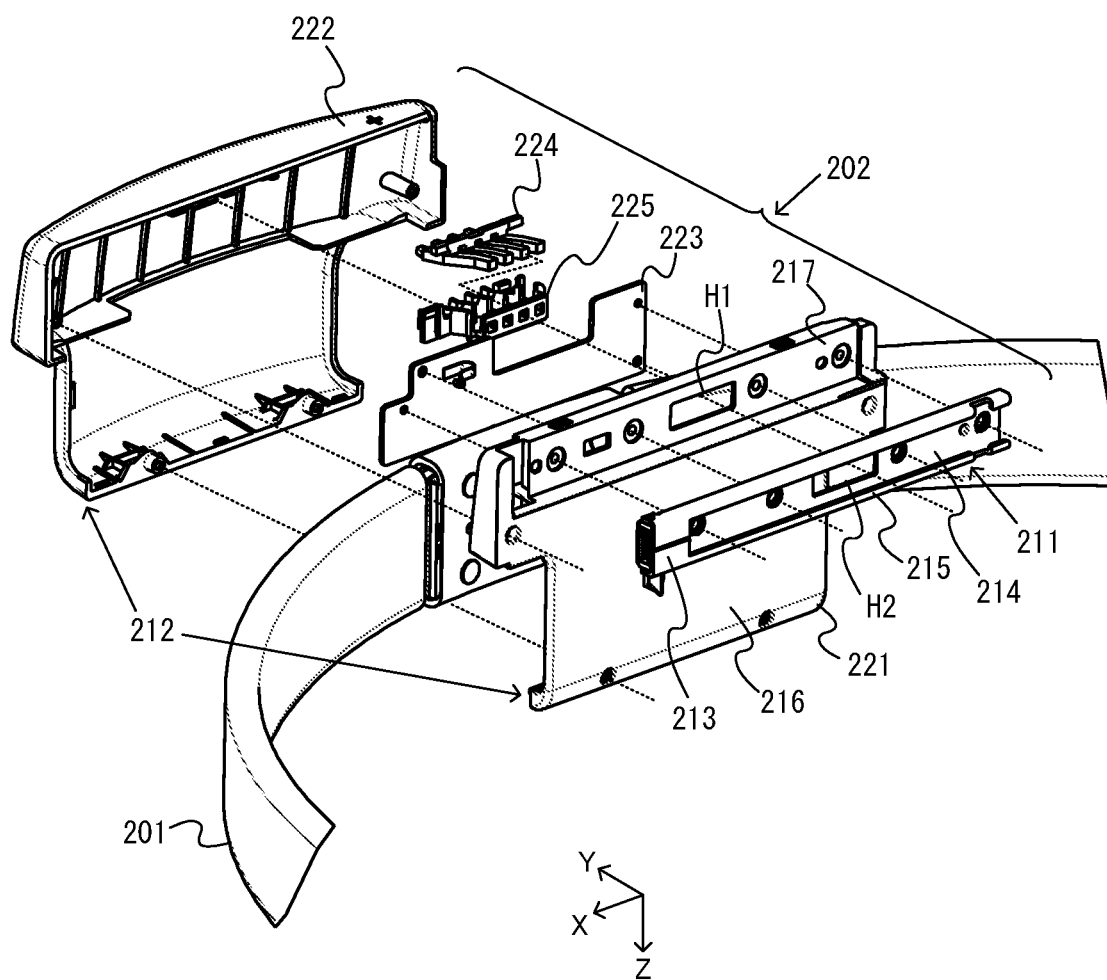
FIG. 13 is an exploded perspective view of the main portion shown in FIG. 11.
Figure 14:
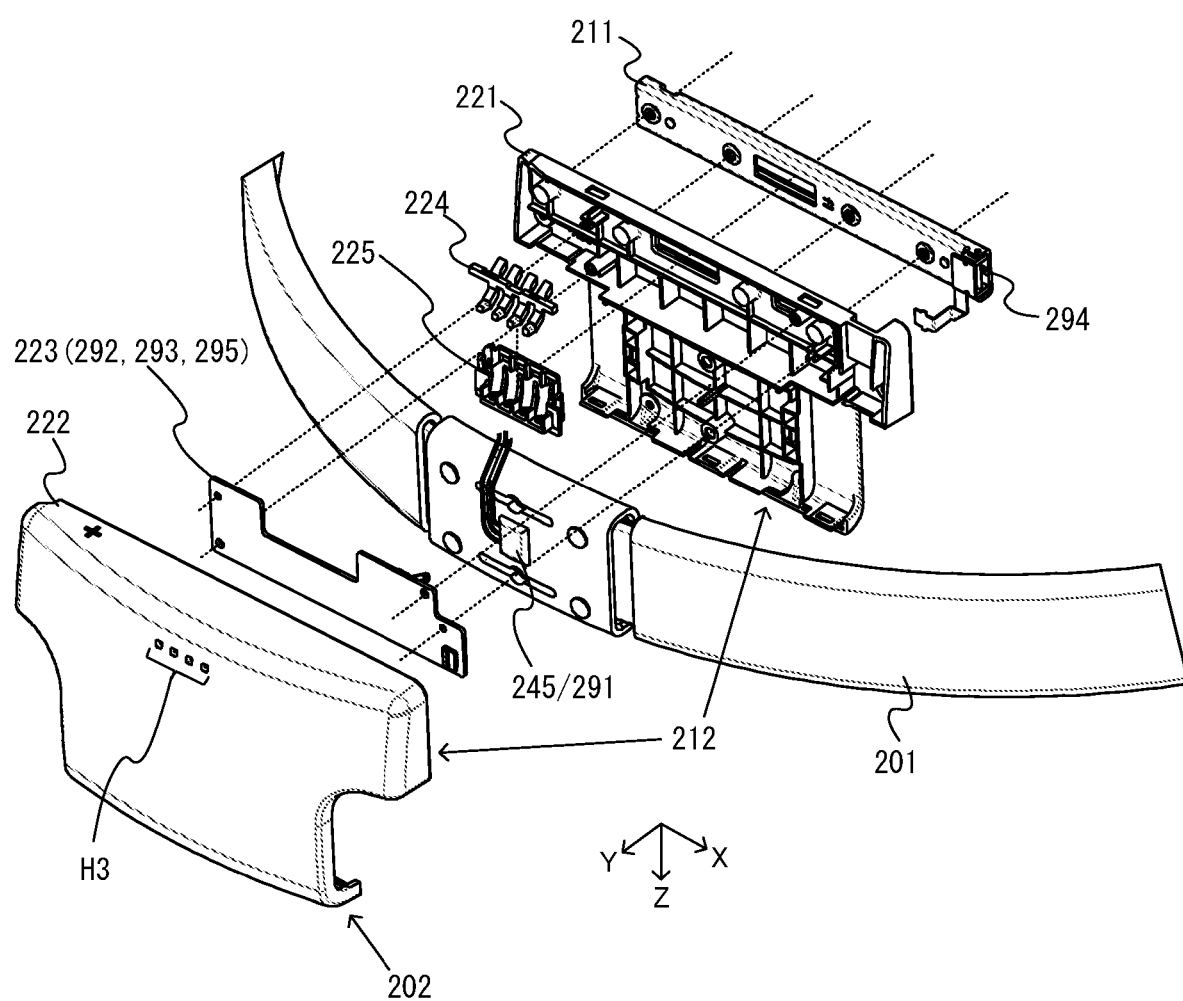
FIG. 14 is an exploded perspective view of the main portion shown in FIG. 11.

FIG. 13 and FIG. 14 are exploded perspective views of the main portion shown in FIG. 11. FIG. 13 is an exploded perspective view of the main portion 202 as viewed from the inner side of the ring formed by the ring-shaped portion 201 (specifically, the Y-axis negative direction side), and FIG. 14 is an exploded perspective view of the main portion 202 as viewed from the outer side of the ring formed by the ring-shaped portion 201 (specifically, the Y-axis positive direction side).

As shown in FIG. 13 and FIG. 14, in the present embodiment, the housing 212 includes an inner housing 221 and an outer housing 222. The inner housing 221 is generally arranged on the inner side of the ring formed by the ring-shaped portion 201. The outer housing 222 is generally arranged on the outer side of the ring formed by the ring-shaped portion 201. The inner housing 221 and the outer housing 222 are secured to each other using screws, for example. Note that in the present embodiment, there is no limitation on the method for securing two members together (i.e., so that one member does not come off the other member), and it may be a method for connecting together two members by fastening using screws, or the like, a method for bonding together two members using an adhesive, or a method for fitting one member to the other member.

As shown in FIG. 13 and FIG. 14, the ring-shaped portion 201 is secured to the housing 212 while being sandwiched between the inner housing 221 and the outer housing 222. In the present embodiment, as the inner housing 221 and the base portion of the ring-shaped portion 201 are fastened together using screws, thereby securing the ring-shaped portion 201 to the inner housing 221. The ring-shaped portion 201 is secured to the housing 212 while passing through a hole that is produced when the inner housing 221 and the outer housing 222 are secured together. Thus, a portion of the ring-shaped portion 201 (specifically, a portion including the base portion to be described below) is covered by the housing 212.

As shown in FIG. 13, the rail portion 211 is secured to the inner housing 221 using screws, for example. The inner housing 221 has a retracted portion 217 that is retracted from the inner side surface 216, and the rail portion 211 is secured to the retracted portion 217. In the present embodiment, the depth of the retracted portion 217 is slightly greater than the thickness of the rail portion 211. Therefore, with the rail portion 211 secured to the retracted portion 217 of the inner housing 221, the stopper portion 213 and the opposing portion 215 of the rail portion 211 are located slightly retracted relative to the inner side surface 216.

As described above, in the present embodiment, the rail portion 211 is located retracted relative to the surface (e.g., the inner side surface 216) of the housing 212. Thus, with the right controller 4 attached to the ring-shaped extension apparatus 5, the inner side surface 216 of the housing 212 is in contact with the right controller 4 to apply a force pressing against the right controller 4. This reduces the looseness between the ring-shaped extension apparatus 5 and the right controller 4.

In the present embodiment, the rail portion 211 is provided on the housing 212 with a portion of the rail portion 211 exposed to the outside of the housing 212 so that the slider 62 can be inserted into the rail portion 211. As shown in FIG. 13 and FIG. 14, as for the length of the rail portion 211 in the slide direction (i.e., the X-axis direction), the length (L1 shown in FIG. 11) of the non-protruding portion of the housing 212 that covers the ring-shaped portion 201 is shorter than the length (L2 shown in FIG. 11) of the protruding portion of the housing 212 where the rail portion 211 is provided. Thus, according to the present embodiment, it is possible to securely protect the rail portion 211 by the housing 212, and it is possible to make the housing 212 compact by relatively reducing the area where the housing 212 covers the ring-shaped portion 201. When designing the shape of the housing 212, first, the length of the protruding portion is determined based on the length of the slider 62 of the right controller 4. With the length of the protruding portion having been determined, in order to make the outer shape of the housing 212 simple, one may consider making the length of the housing 212 in the slide direction constant at the length of the protruding portion of the housing 212, thereby making flat the surfaces of the housing 212 on opposite sides in the slide direction. However, if the first portion where the housing 212 covers the ring-shaped portion 201 becomes longer in that direction, the ring-shaped portion 201 may be more likely to contact the housing 212 when the ring-shaped portion 201 is deformed, and the load to be applied to the housing 212 as the ring-shaped portion 201 contacts the housing 212 may increase. In contrast, according to the present embodiment, by making the non-protruding portion compact, the ring-shaped portion 201 is less likely to contact the housing 212 and it is possible to reduce the load applied to the housing 212 when contacted by the ring-shaped portion 201, as compared with the case where the housing 212 has a constant length in the slide direction.

As shown in FIG. 13 and FIG. 14, the ring-shaped extension apparatus 5 includes a substrate 223. A circuit that functions as a processing section 293, a signal conversion section 292 and a power conversion section 295 (see FIG. 26) to be described below is provided on the substrate 223. The substrate 223 is provided inside the housing 212, and is fastened to the housing 212 using screws, for example. In the present embodiment, the protruding portion includes the substrate 223. Specifically, the substrate 223 is provided inside the protruding portion. Note that although not shown in the figures, the circuit on the substrate 223 is electrically connected to the terminal 294 described above and is electrically connected to a strain gauge to be described below.

As shown in FIG. 13 and FIG. 14, the main portion 202 includes a lightguide portion 224 and a holder 225. The holder 225 holds the lightguide portion 224 inside the housing 212. That is, in the present embodiment, the holder 225 for holding the lightguide portion 224 is secured to the housing 212.

As described above, the right controller 4 includes the indicator LEDs 67 on the engaging surface of the slider 62 (see FIG. 6). With the right controller 4 attached to the ring-shaped extension apparatus 5, the engaging surface of the slider 62 opposes the bottom surface of the rail portion 211 and is no longer exposed. Therefore, in the present embodiment, the lightguide portion 224 is provided so as to allow the user to see the light emitted from the indicator LEDs 67 from outside the housing 212 even in the state described above.

The lightguide portion 224 includes the same number of lightguides as the number of the indicator LEDs 67 (herein, four). One end of each lightguide is the light-receiving surface, and the other end thereof is the light-exiting surface. The lightguides are transparent members made of a resin, or the like, for example. Note that the lightguides are each any component that has the function of guiding light from the light-receiving surface to the light-exiting surface. The lightguide may have any shape such that the light-receiving surface is located in the vicinity of the light-receiving port to be described later and the light-exiting surface is located in the vicinity of the light-exiting port to be described later.

As shown in FIG. 13, a light-receiving port H1 is provided on the retracted portion 217 of the inner housing 221, and a light-receiving port H2 is provided on the bottom surface 214 of the rail portion 211. The light-receiving ports H1 and H2 are located so as to substantially oppose the position of the indicator LEDs 67 of the right controller 4 attached to the ring-shaped extension apparatus 5. Specifically, the position of the light-receiving ports H1 and H2 overlaps with the position of the indicator LEDs 67 for the left-right direction (i.e., the X-axis direction) and the front-rear direction (i.e., the Z-axis direction) of the ring-shaped extension apparatus 5. The holder 225 holds the lightguide portion 224 at such a position that the light-receiving surfaces of the lightguide portion 224 are exposed through the light-receiving ports H1 and H2.

As shown in FIG. 14, the outer housing 222 includes light-exiting ports H3. In the present embodiment, the outer housing 222 includes the same number, i.e., four, of light-exiting ports H3 as the number of the indicator LEDs 67. The holder 225 holds the lightguide portion 224 at such a position that the light-exiting surfaces of the lightguide portion 224 are exposed respectively through the light-exiting ports H3. Therefore, when light from the indicator LEDs 67 of the right controller 4 enters the light-receiving port H2, light is guided through the lightguide portion 224 to exit through the light-exiting ports H3.

Thus, the lightguide portion 224 guides the light, which is from the indicator LEDs 67 of the right controller 4 attached to the ring-shaped extension apparatus 5 and received by the light-receiving port H2 provided on a predetermined surface (specifically, the bottom surface 214) of the rail portion 211, to the light-exiting port H3 provided on another surface of the main portion 202 that is different from the predetermined surface of the rail portion 211. Then, based on the light from the light-exiting port H3, the user can check the light emission of the indicator LEDs 67, even when the right controller 4 is attached to the ring-shaped extension apparatus 5. Information that is conveyed by the indicator LEDs 67 of the right controller 4 can be presented to the user with a simple configuration using the lightguide portion 224.

Note that in the present embodiment, the light-exiting ports H3 are provided at positions that can be seen from the front side and from the upper side of the ring-shaped extension apparatus 5 (see FIG. 10). Therefore, in the present embodiment, the user can see the light from the light-exiting ports H3 not only when the ring-shaped extension apparatus 5 is used at a relatively high position with the front side the ring-shaped extension apparatus 5 facing toward the front side (see FIG. 15), but also when the ring-shaped extension apparatus 5 is used at a relatively low position, and when the ring-shaped extension apparatus 5 is not held by the user and is put down where the user sees the ring-shaped extension apparatus 5 from outside the ring formed by the ring-shaped portion 201. That is, the light-exiting ports H3 can be arranged at such positions that it is easy for the user to see the light from the light-exiting ports H3.

Note that in other embodiments, there is no limitation on the positions of the light-exiting ports H3, and the light-exiting ports H3 may be provided at any positions where the light-exiting ports H3 can be seen from outside the housing 212. For example, the light-exiting ports H3 may be provided at any positions on the outer housing 222.

[1-2-2. Grip Cover]

As shown in FIG. 10 and FIG. 12, the ring-shaped extension apparatus 5 includes grip covers 206 and 207. The grip covers 206 and 207 are components to be held by the user. In the present embodiment, with the provision of the grip covers 206 and 207, it is easier for the user to hold the ring-shaped extension apparatus 5. The details of the grip covers 206 and 207 will now be described.

As shown in FIG. 10 and FIG. 12, in the present embodiment, two grip covers 206 and 207 are provided on the ring-shaped portion 201. In the present embodiment, the grip covers 206 and 207 can be removed from the ring-shaped portion 201. The grip covers 206 and 207 are put on the grip portions of the ring-shaped portion 201. Herein, a grip portion is a portion of the ring-shaped portion 201 to be held by the user. In the present embodiment, a portion of the ring-shaped portion 201 near the right end thereof and a portion of the ring-shaped portion 201 near the left end thereof are the grip portions. That is, it can be said that when the main portion 202 is located at the central angle of 0° with respect to the center of the ring-shaped portion 201, the grip portions are provided at the position of +90° and at the position of −90°. Hereinafter, the grip portion near the right end of the ring-shaped portion 201 will be referred to as the right grip portion, and the grip portion near the left end of the ring-shaped portion 201 will be referred to as the left grip portion. Although the details will be described later, each grip portion is provided with an element (a fourth touch fastener 233 to be described below) that allows the grip cover 206 or 207 to be put on. Where the grip cover 206 or 207 is removable from the ring-shaped portion 201 as in the present embodiment, the portion where the element that allows the grip cover 206 or 207 to be put on is provided can be said to be the grip portion.

Note that the grip portions may have any configuration such that the grip portions can be recognized distinguished from the other portions of the ring-shaped portion 201. For example, when portions of the ring-shaped portion 201 (specifically, a portion near the left end and a portion near the right end of the ring-shaped portion 201) are of a different color and/or a different pattern from the other portions, they can be said to be grip portions (as they serve to allow the user to realize that they are the portions to be held for performing operations). When portions of the ring-shaped portion 201 (specifically, a portion near the left end and a portion near the right end of the ring-shaped portion 201) are formed to be thicker than the other portions, they can be said to be grip portions (as they serve to allow the user to realize that they are the portions to be held for performing operations). For example, when similar members to the grip covers are non-removably secured to the ring-shaped portion 201, those members can be said to be grip portions. As described above, with the grip portions, the ring-shaped extension apparatus 5 allows the user to perform operations while holding appropriate positions thereof.

Note that in the present embodiment, the user holds the grip covers 206 and 207, which are put on the grip portions of the ring-shaped portion 201, thereby indirectly holding the grip portions. In contrast, in other embodiments, the ring-shaped extension apparatus 5 may include no grip covers, in which case the user can directly hold the grip portions of the ring-shaped portion 201. That is, the grip portions may be portions to be directly or indirectly held by the user.

In the present embodiment, the left grip cover 206 is provided on the left grip portion near the left end of the ring-shaped portion 201, and the right grip cover 207 is provided on the right grip portion near the right end of the ring-shaped portion 201. Thus, in the present embodiment, the grip portions are provided at two locations, left and right, of the ring-shaped portion 201 assuming that the user will be holding the two grip portions with two hands, respectively. Note that there is no limitation on the number of grip portions, and the grip portions may be provided at three or more locations, or at only one location, depending on the operation method or methods contemplated. Depending on the content of the game (or the content of the fitness exercise operation to be performed by the user in the game), only a particular one or particular ones of a plurality of grip portions may be held by one hand or both hands. In other embodiments, there may be no grip portions that can be recognized distinguished from the other portions of the ring-shaped portion 201.

Figure 15:
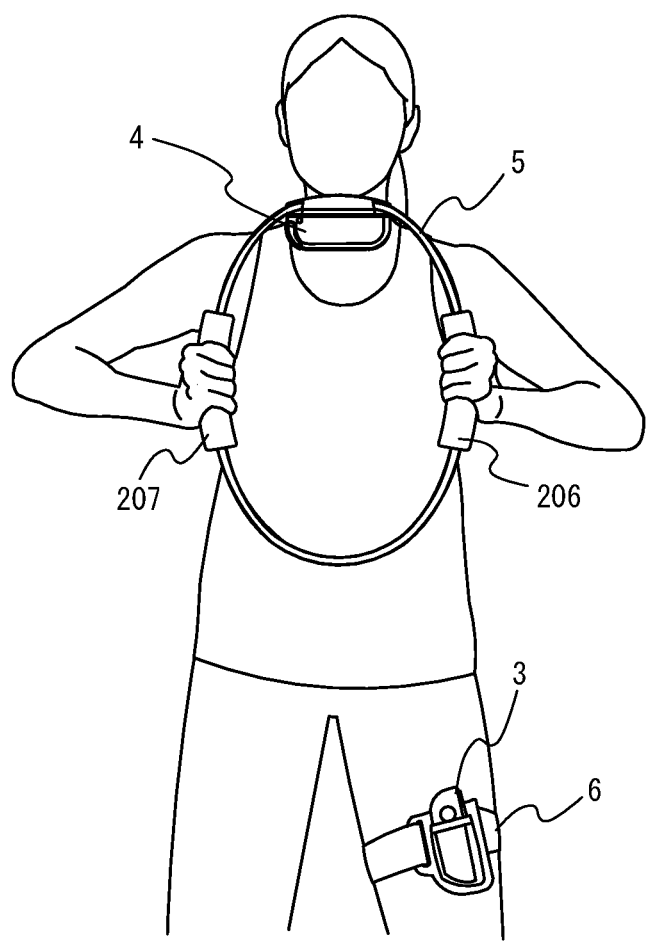
FIG. 15 is a diagram showing an example of how a user uses a non-limiting extension apparatus.

FIG. 15 is a diagram showing an example of how the user uses the extension apparatus. As shown in FIG. 15, when using the ring-shaped extension apparatus 5, the user can hold the left grip cover 206 put on the left grip portion with the left hand and hold the right grip cover 207 put on the right grip portion with the right hand. Note that although the details will be described later, the user can use the ring-shaped extension apparatus 5 in a different manner from that shown in FIG. 15.

In the present embodiment, the two grip portions can provided at positions on the ring-shaped portion 201 that are in symmetry with each other with respect to the center of the circular ring (which may also be an elliptical ring) of the ring-shaped portion 201 (see FIG. 12). This allows the user to hold the ring-shaped portion 201 at such positions that it is easier for the user to apply a force on the ring-shaped portion 201, and it is possible to provide an input apparatus that is easy to operate.

In the present embodiment, two grip portions are provided in parallel to the left-right direction. Therefore, the rail portion 211 of the main portion 202 is provided in such an orientation that the direction from one of the two grip portions to the other is substantially parallel to the slide direction (of the rail portion 211). It is assumed that when using the ring-shaped extension apparatus 5, the user holds the ring-shaped extension apparatus 5 so that the two grip portions are arranged horizontal with each other (see FIG. 15). Therefore, in the state where the ring-shaped extension apparatus 5 is held as described above, the user can put the right controller 4 on the ring-shaped extension apparatus 5 by horizontally moving and inserting the right controller 4 into the rail portion 211. That is, according to the present embodiment, it is easier for the user to put the right controller 4 on the ring-shaped extension apparatus 5 while holding the ring-shaped extension apparatus 5.

Note that in the present embodiment, where the up direction is defined as the direction in which the shaft portion of the analog stick 52 is tilted to give an upward instruction to the analog stick 52 of the right controller 4 attached to the ring-shaped extension apparatus 5, the main portion 202 is provided at a position on the ring-shaped portion 201 that is on the upper side relative to the center of the ring formed by the ring-shaped portion 201 (see FIG. 12). Then, it is assumed that the user uses the ring-shaped extension apparatus 5 in such an orientation that the main portion 202 is located on the upper side (see FIG. 15). Therefore, assuming that the user uses the ring-shaped extension apparatus 5 in such an orientation, even if the user inadvertently drops the ring-shaped extension apparatus 5 during use, the shock is less transmitted to the right controller 4, and it is possible to reduce the possibility that the right controller 4 comes off the ring-shaped extension apparatus 5.

Note that in the present embodiment, since the ring-shaped portion 201 is elastically deformable, even if the user inadvertently drops the ring-shaped extension apparatus 5 during use, the shock is absorbed by the ring-shaped portion 201. Therefore, even in such a case as described above, the possibility is low for the right controller 4 to come off the ring-shaped extension apparatus 5.

While the user is using the ring-shaped extension apparatus 5, the user may switch grip from holding two grip portions, and operate the right controller 4 while letting go of one hand from the grip portion. In such a case, in the present embodiment, since the main portion 202 is provided on the upper side relative to the grip portions, it is possible to arrange the right controller 4 at such a position that it is easy to operate the right controller 4.

Figure 16:
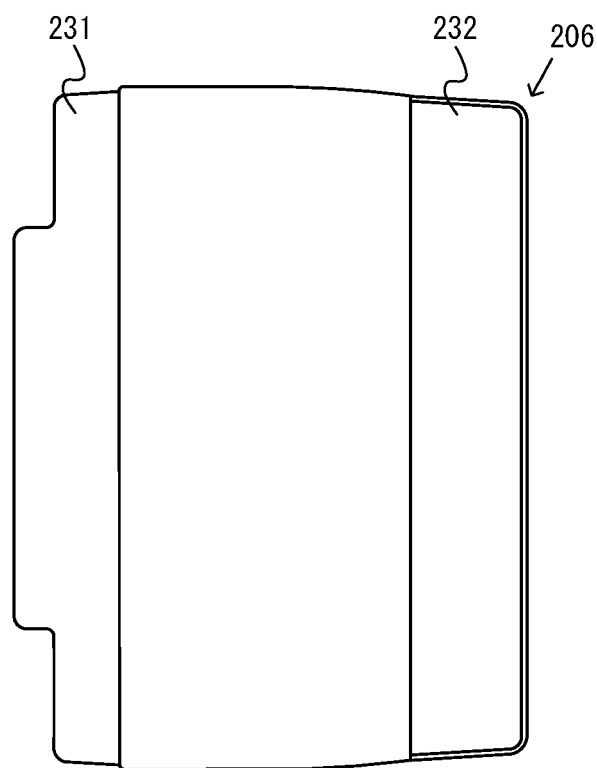
FIG. 16 is a diagram showing an example of a non-limiting left grip cover.
Figure 17:
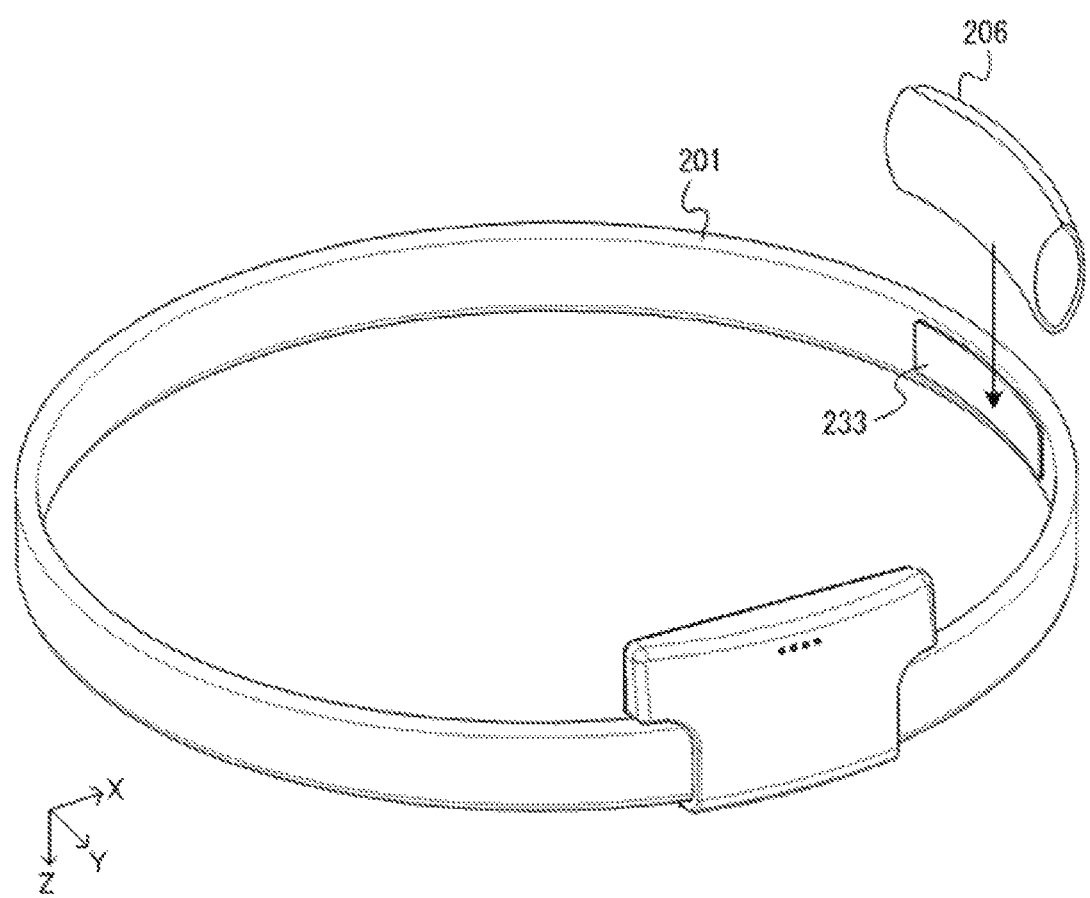
FIG. 17 is a diagram illustrating a case where a non-limiting left grip cover is put on another portion of a ring-shaped portion.

FIG. 16 is a diagram showing an example of the left grip cover 206. FIG. 17 is a diagram illustrating a case where the left grip cover 206 is put on the left grip portion of the ring-shaped portion 201. Note that the grip cover will be described with reference to the left grip cover 206 as an example, while omitting the detailed description of the right grip cover 207, which has a similar configuration to the left grip cover 206.

The left grip cover 206 has a flat shape and is made of a fabric. As shown in FIG. 16, the left grip cover 206 has a generally quadrangular shape. As shown in FIG. 17 the left grip cover 206 is put on the ring-shaped portion 201 in a tubular shape (in other words, the left grip cover 206 is wound around the ring-shaped portion 201). The left grip cover 206 may be of any material such that the left grip cover 206 can be rolled into a tubular shape by securing one end thereof to the other end thereof. The left grip cover 206 may have a shock absorbing material, such as foam, inside so that it is easier for the user to hold.

FIG. 16 shows the inner side surface the left grip cover 206. Note that the inner side surface of the left grip cover 206 is a surface to be on the inner side when the left grip cover 206 is put on around the ring-shaped portion 201. As shown in FIG. 16, a first touch fastener 231 is provided at the end portion on one side of the inner side surface of the left grip cover 206, and a second touch fastener 232 is provided at the end portion on the other side. Note that the "end portion", as used herein, refers to the tip in a strict sense and to a portion around the tip. Although not shown in the figures, a third touch fastener is provided on the area of the outer side surface of the left grip cover 206 that is on the reverse side of the first touch fastener 231. The second touch fastener 232 and the third touch fastener can be attached to and detached from each other. For example, the second touch fastener 232 may be a hook-surface touch fastener, and the third touch fastener is a loop-surface touch fastener.

As shown in FIG. 17, the ring-shaped portion 201 includes the fourth touch fastener 233 on the grip portion. The fourth touch fastener 233 is bonded to the grip portion of the ring-shaped portion 201 by an adhesive, for example. In the present embodiment, the fourth touch fastener 233 is provided on the inner side surface of the ring-shaped portion 201, which is band-shaped. Thus, other objects are less likely to contact the fourth touch fastener 233. Note that although not shown in the figures, a fifth touch fastener is provided on the inner side surface of the ring-shaped portion 201 at the right grip portion near the right end of the ring-shaped portion 201. The fourth touch fastener 233 allows the left grip cover 206 to be put on the ring-shaped portion 201, and the fifth touch fastener allows the right grip cover 207 to be put on the ring-shaped portion 201.

The first touch fastener 231 and the fourth touch fastener 233 can be attached to and detached from each other. For example, the first touch fastener 231 is a loop-surface touch fastener and the fourth touch fastener 233 is a hook-surface touch fastener. Note that the fifth touch fastener is a touch fastener similar to the fourth touch fastener 233 (herein, a hook-surface touch fastener).

When the left grip cover 206 is put on the ring-shaped portion 201, the first touch fastener 231 of the left grip cover 206 is first fastened to the fourth touch fastener 233 of the ring-shaped portion 201. Then, with the left grip cover 206 wound around the ring-shaped portion 201, the second touch fastener 232 of the left grip cover 206 and the third touch fastener are fastened together. The left grip cover 206 can be put on the ring-shaped portion 201 as described above.

In the present embodiment, since the left grip cover 206 is wound around the ring-shaped portion 201, the left grip cover 206 is unlikely to come off the ring-shaped portion 201. Since the first touch fastener 231 and the fourth touch fastener 233 are fastened together, the left grip cover 206 is unlikely to slip down the ring-shaped portion 201. According to the present embodiment, it is possible to reduce the possibility that the grip covers 206 and 207 come off the ring-shaped portion 201 or slip down the ring-shaped portion 201 while the user is holding the grip covers 206 and 207, thus improving the operability of the ring-shaped extension apparatus 5.

Note that the right grip cover 207 can be put on the ring-shaped portion 201 in a similar manner to that for putting the left grip cover 206 on the ring-shaped portion 201.

As described above, in the present embodiment, the grip covers 206 and 207 can be removed from the ring-shaped portion 201. Thus, when the grip covers 206 and 207 get dirty or damaged over long-term use, the user can clean or replace the grip covers 206 and 207.

[1-2-3. Ring-Shaped Portion]

Figure 18:
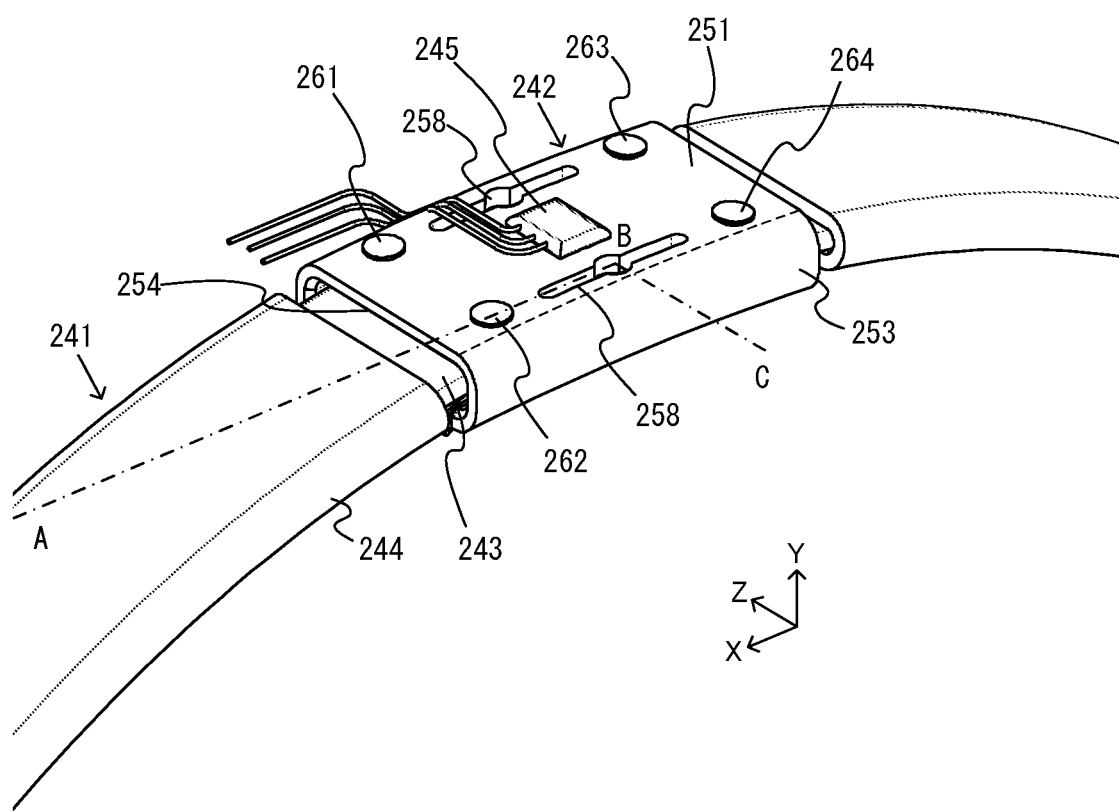
FIG. 18 is a diagram showing a portion of a non-limiting ring-shaped portion.
Figure 19:
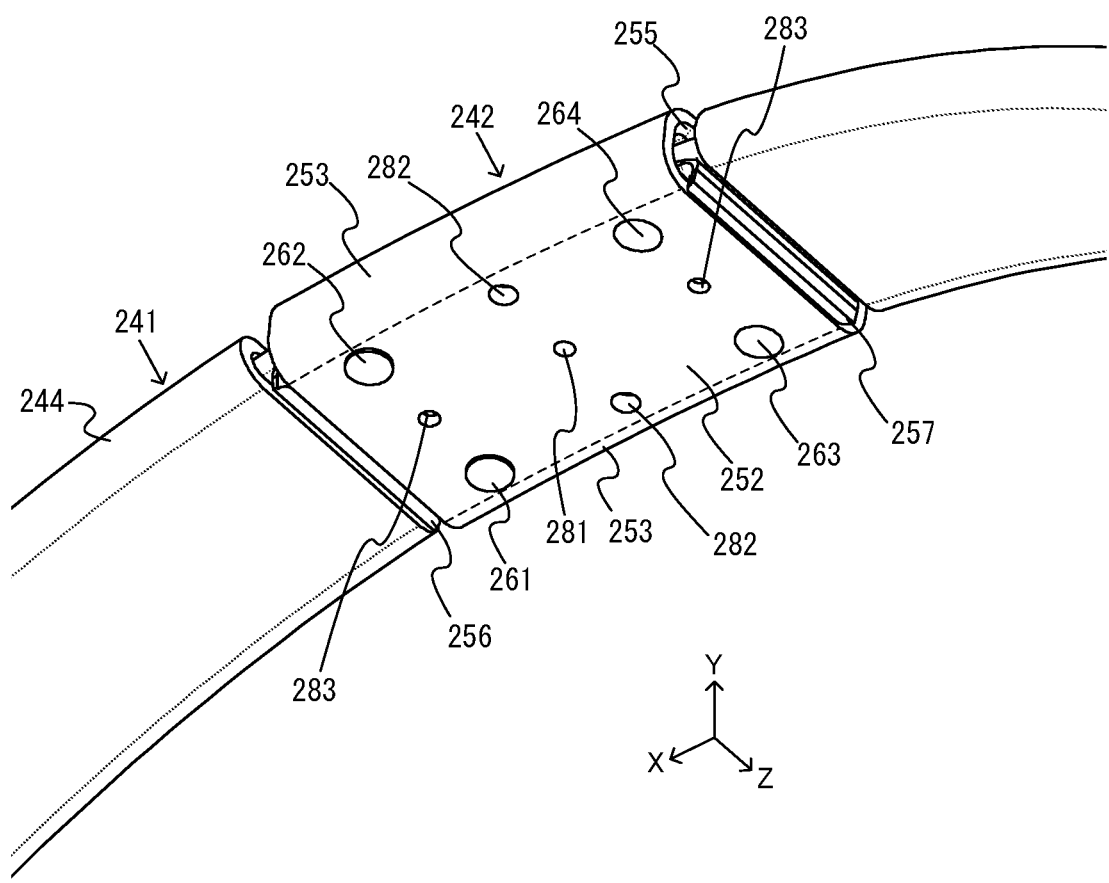
FIG. 19 is a diagram showing a portion of a non-limiting ring-shaped portion.

FIG. 18 and FIG. 19 are diagrams showing a portion of the ring-shaped portion. FIG. 18 and FIG. 19 show a portion of the ring-shaped portion 201 when the main portion 202 is not put on the ring-shaped portion 201, and specifically show a portion of the ring-shaped portion 201 near the base portion 242. Note that FIG. 18 is a perspective view of a portion of the ring-shaped portion 201 as viewed from the outer side of the ring formed by the ring-shaped portion 201. FIG. 19 is a perspective view of a portion of the ring-shaped portion 201 as viewed from the inner side of the ring formed by the ring-shaped portion 201.

As shown in FIG. 18 and FIG. 19, the ring-shaped portion 201 includes the elastic member 241 and the base portion 242. The elastic member 241 is made of an elastically deformable material. Although the details will be described later, a core 243 of the elastic member 241 is made of a resin (specifically, an FRP (Fiber Reinforced Plastic)). The elastic member 241 is a portion of the ring-shaped portion 201 that elastically deforms in response to an operation by the user.

The base portion 242 holds the opposite ends of the elastic member 241 so that a ring is formed by the base portion 242 and the elastic member 241. Herein, "the base portion 242 holds the elastic member 241" means that the base portion 242 secures the elastic member 241 so that the elastic member 241 does not come off while maintaining a certain shape (herein, a ring shape that is formed together with the base portion 242). Note however that the elastic member 241 may deform when another force is applied to the elastic member 241 while the base portion 242 holds the elastic member 241, as will be described below, and this is encompassed by the phrase "the base portion 242 holds the elastic member 241". The base portion 242 is made of a material having a higher rigidity than the elastic member 241. In the present embodiment, the base portion 242 is made of a metal. Therefore, when the same force is applied to the base portion 242 and the elastic member 241, the amount of strain of the base portion 242 is smaller than the amount of strain of the elastic member 241.

In the present embodiment, as shown in FIG. 9 and FIG. 18, the elastic member 241 has a plate shape having two surfaces (which can also be said to be a band shape), and the base portion 242 holds the elastic member 241 with one surface of the elastic member 241 facing the outer side of the ring and the other surface facing the inner side of the ring. The elastic member 241 forms a part of the ring so that the longitudinal direction of the elastic member 241 is the circumferential direction of the ring-shaped portion 201. Note that the longitudinal direction of the elastic member 241 is the longitudinal direction when the elastic member 241 is flattened out, and the width direction of the elastic member 241 is the width direction (in the present embodiment, the front-rear direction) when the elastic member 241 is flattened out. In the present embodiment, the elastic member 241, as flattened out, has a rectangular shape. Therefore, it can be said that the longitudinal direction of the elastic member 241 is the direction along the longer side of the surface of the elastic member 241, and the width direction of the elastic member 241 is the direction along the shorter side thereof.

Note that in the present embodiment, the elastic member 241 is in a linear shape while not being held by the base portion 242. The base portion 242 holds the elastic member 241, which is in a linear shape while no force is applied thereto, in such a bent state that it forms a ring. Thus, using the elastic member 241 having a linear shape makes the production of the ring-shaped extension apparatus 5 easier.

Note that in other embodiments, the elastic member 241 may have any shape, and may have a shape that is bent while not being held by the base portion 242. For example, the elastic member 241 may have a shape that forms a part of a ring (e.g., a circular ring that coincides with the circular ring of the ring-shaped portion 201 of the present embodiment) while not being held by the base portion 242. In the present embodiment, the elastic member 241 is held by the base portion 242 while under a stress being bent in a ring shape.

In other embodiments, the elastic member 241 may have a shape that forms a part of a ring while under no stress, and may be held by the base portion 242 while under no stress. While the elastic member 241 has a band shape in the present embodiment, it may have a cylindrical shape (e.g., a shape whose cross section perpendicular the circumferential direction is a circular shape) in other embodiments.

Figure 20:
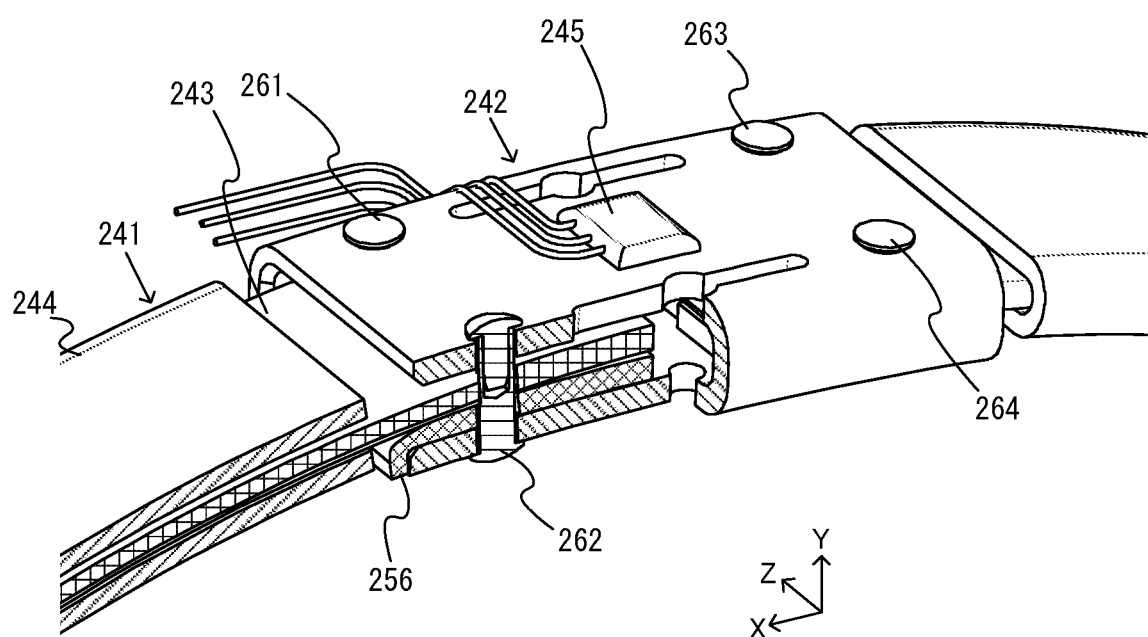
FIG. 20 is a partially cut-away cross-sectional view of the ring-shaped portion shown in FIG. 18.

FIG. 20 is a partially cut-away cross-sectional view of the ring-shaped portion shown in FIG. 18. FIG. 20 shows the ring-shaped portion 201 that is cut away along a cross section that extends along half line AB of FIG. 18 and is perpendicular to the Z axis and a cross section that extends along half line BC of FIG. 18 and is perpendicular to the X axis.

As shown in FIG. 18 and FIG. 20, the elastic member 241 includes the core 243 and a cover portion 244. The core 243 is made of an elastically deformable material. In the present embodiment, the core 243 is a resin, specifically, an FRP (Fiber Reinforced Plastic). The core 243 has such a rigidity that the core 243 can be deformed by a human. For example, the flexural rigidity of the core 243 is in the range of 0.33 to 0.50 [Pa·m$^4$]. In the present embodiment, the core 243 has a band shape, and is held by the base portion 242 with one surface facing the outer side of the ring the other surface facing the inner side of the ring.

The cover portion 244 has a tubular shape and is provided so as to cover the core 243 (see FIG. 20). In the present embodiment, the cover portion 244 is made of a material that is softer than the core 243 (i.e., a material that has a low indentation hardness). Specifically, in the present embodiment, the cover portion 244 is of a silicone resin. The cover portion 244 improves the feel of the elastic member 241 when touched by the user. The cover portion 244 can also absorbs the impact when the elastic member 241 hits another object.

In the present embodiment, the length in the circumferential direction (in other words, the length in the longitudinal direction while not being held by the base portion 242) of the cover portion 244 is shorter than the core 243. Therefore, as shown in FIG. 20, portions of the bar-shaped core 243 near the opposite ends thereof are not covered by the cover portion 244 and are exposed.

In the present embodiment, the core 243 runs through the inside of the tubular cover portion 244 and is secured to the base portion 242 at the opposite ends of the core 243. Thus, the cover portion 244 is prevented from slipping off the core 243. Note that in the present embodiment, the cover portion 244 is not fixed to the core 243. Therefore, in the present embodiment, when the elastic member 241 is deformed by an operation of the user, an unnecessary force, which would be applied if the core 243 were fixed to the cover portion 244, is not applied, thus improving the durability of the cover portion 244.

As shown in FIG. 18 to FIG. 20, the base portion 242 has a tubular shape. In the present embodiment, the base portion 242 has a flat shape as viewed from outside, and includes an outer plate portion 251 and an inner plate portion 252 that are flat plate-shaped (strictly speaking, they are bent so as to be a part of the circumference of the ring-shaped portion 201) (see FIG. 18 and FIG. 19). The outer plate portion 251 is one of the flat plate-shaped portions of the base portion 242 that is arranged farther away from the center of the ring formed by the ring-shaped portion 201. The inner plate portion 252 is one of the flat plate-shaped portions of the base portion 242 that is arranged closer to the center of the ring formed by the ring-shaped portion 201. The base portion 242 includes two side plate portions 253 that are provided on both sides of the front-rear direction and connect together the outer plate portion 251 and the inner plate portion 252. As described above, the base portion 242 is formed in a tubular shape including the outer plate portion 251, the inner plate portion 252 and the side plate portions 253. Thus, the "tubular shape", as used herein, refers to a shape having a side surface that extends completely around in the circumferential direction with the inside of the side surface being hollow. Note that although the base portion 242 of the present embodiment has slits 258 as shown in FIG. 18, it can be said that the base portion 242 has a tubular shape because it partly has a surface (a surface that includes the outer plate portion, the side plate portions and the inner plate portion as will be described below) that extends one complete round in the circumferential direction. The phrase "an object has a tubular shape" does not impose a limitation that the cross section along the circumferential direction of the object has a circular ring shape, but there is no limitation on the shape of the cross section.

Note that the dotted lines shown in FIG. 18 and FIG. 19 are drawn for ease of understanding of the positions of the outer plate portion 251, the inner plate portion 252 and the side plate portions 253 of the base portion 242, and the dotted lines are not actually drawn on the base portion 242.

As shown in FIG. 18 to FIG. 20, the tubular base portion 242 has a left opening 254 and a right opening 255. The openings 254 and 255 are shaped and sized so that the core 243 can be inserted therethrough. The elastic member 241 is held by the base portion 242 with the first end portion (specifically, the end portion of the core 243 on one side) inserted through the left opening 254, and the second end portion (specifically, the end portion of the core 243 on the other side) inserted through the right opening 255. Then, the tip of the elastic member 241 is located near the center of the base portion 242 in the left-right direction and is in contact with the tube inner side surface of the outer plate portion 251 (see FIG. 20). Although the details will be described later, as the tubular base portion 242 holds the elastic member 241 in such a state as described above, it is possible to diffuse the force received by the base portion 242 from the elastic member 241.

Note that in the present embodiment, the cover portion 244 is not inserted through the openings 254 and 255 of the base portion 242. That is, in the present embodiment, portions of the core 243 are exposed from the cover portion 244 at the first end portion and the second end portion, and the base portion 242 holds the portions of the core 243 that are exposed at the first end portion and the second end portion (see FIG. 20). Then, it is possible to reduce the possibility that the cover portion 244, which is softer than the core 243, contacts the base portion 242 and gets damaged.

In the present embodiment, the elastic member 241 (more specifically, the core 243) is fastened to the base portion 242 using rivets. Specifically, as shown in FIG. 20, a portion of the core 243 near the end portion thereof on one side that is inserted through the left opening 254 is fastened to the base portion 242 using rivets 261 and 262. More specifically, the core 243 includes holes that are made at two locations near the end portion on that side, the outer plate portion 251 of the base portion 242 includes holes that are made at two locations near the left opening 254, and the inner plate portion 252 of the base portion 242 includes holes that are made at two locations near the left opening 254. Then, the rivets 261 and 262 are fastened through the holes in the outer plate portion 251, the holes in the core 243 and the holes in the inner plate portion 252 (see FIG. 20). The core 243 is fastened to the base portion 242 using rivets 263 and 264 near the end portion on the other side that is inserted through the right opening 255. The core 243 is fastened to the base portion 242 using rivets also at the right opening 255 in a manner similar to the left opening 254. As described above, in the present embodiment, in the state where the base portion 242 holds the elastic member 241, the ring shape formed by the elastic member 241 and the base portion 242 is maintained, and the elastic member 241 is prevented from coming off the base portion 242.

As described above, in the present embodiment, the base portion 242 includes an inner portion (specifically, the inner plate portion 252) that is provided on the side closer to the center of the ring formed by the base portion 242 and the elastic member 241, and an outer portion (specifically, the outer plate portion 251) that is provided so as to oppose the inner portion and is provided on the side away from the center of the ring. The elastic member 241 is held by the base portion 242 with the first end portion and the second end portion of the elastic member 241 sandwiched between the outer portion and the inner portion. Note that in the present embodiment, the first end portion of the elastic member 241 is sandwiched between the outer portion and the inner portion at the end portion of the base portion 242 on one side in the left-right direction, and the second end portion of the elastic member 241 is sandwiched between the outer portion and the inner portion at the end portion of the base portion 242 on the other side in the left-right direction.

Now consider a configuration where the base portion 242 has a single plate shape (without the outer portion and the inner portion), and the elastic member 241 is fastened to the base portion 242 using rivets. With such a configuration, the stress of the elastic member 241 is applied to the rivets, and the rivets may be under a great load, thereby damaging the rivets. A force will be localized at one point of the elastic member 241 where the elastic member 241 is secured using the rivets, and the elastic member 241 may also be damaged.

In contrast, in the present embodiment, the base portion 242 includes the outer portion and the inner portion, and the base portion 242 holds the elastic member 241 with the elastic member 241 inserted between the outer portion and the inner portion. Then, since the stress of the elastic member 241 is applied primarily to the outer portion and the inner portion of the base portion 242 (see FIG. 21), it is possible to reduce the load to be applied to the rivets. Therefore, it is possible to reduce the possibility that the rivets may be damaged.

In the present embodiment, since the elastic member 241 and the outer portion and the inner portion of the base portion 242 contact each other, the force to be received by the elastic member 241 and the base portion 242 from each other is more evenly distributed. Specifically, each tip portion of the elastic member 241 applies a pressing force to a surface of the outer portion that opposes the inner portion, while a portion of each end portion of the elastic member 241 that is different from the tip portion applies a pressing force to the opposite ends in the left-right direction of a surface of the inner portion that opposes the outer portion (i.e., the inner edge of the opening of the base portion 242 to be described below) (see FIG. 21). Thus, it is possible to reduce the load applied to one location of the elastic member 241, and it is possible to reduce the possibility of damaging the elastic member 241. Moreover, in the present embodiment, since the elastic member 241 and the outer portion and the inner portion of the base portion 242 contact each other along a line, it is possible to reduce the possibility that the load is localized at one point of the elastic member 241. Therefore, it is possible to further reduce the possibility of damaging the elastic member 241.

Note that in the present embodiment, the base portion 242 is in a tubular shape having openings 254 and 255, wherein the end portion of the outer portion and the end portion of the inner portion are parts of the edge of each of the openings. The two end portions of the elastic member 241 are inserted into the openings 254 and 255. In other embodiments, the base portion 242 may be configured so that the openings are not formed (see FIG. 23 and FIG. 24). Specifically, the base portion 242 may be in a shape that is obtained by bending a single plate into a tube-like shape (note however that this shape is not a "tubular shape" as used in the present embodiment because this shape does not have a side surface that is continuous for one complete round in the circumferential direction). Even with such a configuration, it is possible to realize the effect described above (i.e., the effect of reducing the possibility of damaging the rivets and the elastic member) by employing a configuration where the base portion includes the outer portion and the inner portion, with the elastic member 241 inserted between the outer portion and the inner portion. Note that with the base portion 242 being in a tubular shape (e.g., as compared with a shape shown in FIG. 23), it is easier to produce the base portion 242.

Note that in other embodiments, there is no limitation on the shape of the base portion 242, which may be a single plate shape as described above, for example.

As described above, in the present embodiment, the elastic member 241 is secured to the base portion 242 at least two locations on the side of the first end portion (specifically, the end portion on the one side of the core 243), and is secured to the base portion 242 at least two locations on the side of the second end portion (specifically, the end portion on the other side of the core 243). Then, the elastic member 241 is secured to the base portion 242 so that the elastic member 241 cannot pivot about an axis along the up-down direction (i.e., the Y-axis direction shown in the figures). Therefore, for example, while using the ring-shaped extension apparatus 5, it is possible to reduce the possibility that the elastic member 241 pivots in the direction described above to contact the opening of the base portion 242, and it is possible to reduce the possibility that the elastic member 241 contacts the base portion 242 and gets damaged.

Note that there is no limitation on the method for securing together the elastic member 241 and the base portion 242. For example, the elastic member 241 may be fastened to the base portion 242 using penetrating parts such as rivets, screws and/or bolts, etc. Thus, the elastic member 241 can be firmly fastened (or secured) to the base portion 242.

As shown in FIG. 19 and FIG. 20, the ring-shaped extension apparatus 5 includes a left protection member 256 and a right protection member 257, as an example of protection members. Protection members are provided to reduce the possibility that the elastic member 241 gets damaged by contacting the base portion 242, which is harder than the elastic member 241, while the user is using the ring-shaped extension apparatus 5. The details of the protection members will now be described.

As shown in FIG. 19 and FIG. 20, the left protection member 256 is provided on the inner edge of the left opening 254 of the base portion 242. The right protection member 257 is provided on the inner edge of the right opening 255 of the base portion 242. As shown in FIG. 19, each of the protection members 256 and 257 is provided on a portion of the inner edge of the opening of the base portion 242 that is close to the center of the ring formed by the ring-shaped portion 201. That is, each of the protection members 256 and 257 is provided on the tube inner side surface of the inner plate portion 252 of the base portion 242. Note that the left protection member 256 and the right protection member 257 each generally have a plate shape.

Thus, in the present embodiment, the protection members 256 and 257 prevent the inner plate portion 252 and the elastic member 241 from directly contacting each other. Note that there is no limitation on the shape of the protection members 256 and 257, which may be any shape such that the protection member can be arranged between the inner plate portion 252 and the elastic member 241.

The protection members 256 and 257 are made of a material that is softer than the base portion 242. In the present embodiment, the protection members 256 and 257 are made of POM (polyoxymethylene). Note that the protection members 256 and 257 may be made of the same material as the core 243 (e.g., an FRP). The protection members 256 and 257 may be of a material that is harder than the core 243 or a material that is softer than the core 243.

Each of the protection members 256 and 257 has a corner that is to be in contact with the elastic member 241 (more specifically, the core 243 in the present embodiment) is more rounded than the corner of the inner edge of the openings 254 and 255 of the base portion 242 (see FIG. 20). As shown in FIG. 20, the left protection member 256 is provided so as to extend from the space upward of the tube inner side surface of the inner plate portion 252 of the base portion 242 to the space leftward of the left end of the inner plate portion 252. That is, the left protection member 256 is provided so as to protrude from the inside of the tube of the base portion 242 to the outside thereof through the left opening 254. The portion of the left protection member 256 that is protruding from the left opening 254 hangs down along the edge of the left opening 254. With such a hanging shape, the left protection member 256 forms a corner in the upper left portion. The corner is more rounded than the corner of the inner edge of the left opening 254. In the present embodiment, there is a lower possibility of damaging the elastic member 241 as compared with a case where the corner of the inner edge of the base portion 242 contacts the elastic member 241 because it contacts the left protection member 256 configured as described above. Although not shown in FIG. 20, the right protection member 257 also has a similar shape to that of the left protection member 256.

Note that in the present embodiment, the protection members 256 and 257 are provided protruding from the inner plate portion 252 to the outside in the left-right direction. In contrast, in other embodiments, the protection member may not be provided protruding from the inner plate portion 252 to the outside in the left-right direction, but may be provided only in the space upward of the inner plate portion 252. Then, as the portion of the protection member that is to be in contact with the elastic member 241 (e.g., the corner when the protection member is plate-shaped) is more rounded than the corner of the inner edge of the openings 254 and 255, it is possible to reduce the possibility of damaging.

There is no limitation on the method for securing the protection members 256 and 257 to the base portion 242. In the present embodiment, the protection members 256 and 257 are fastened to the base portion 242 using the rivets 261 to 264. That is, the protection members 256 and 257 each have two holes therein. Then, the rivets 261 and 262 are fastened to the base portion 242 so as to pass through the holes in the left protection member 256. The rivets 263 and 264 are fastened to the base portion 242 so as to pass through the holes in the right protection member 257. Thus, in the present embodiment, the protection members 256 and 257 are fastened, together with the elastic member 241, to the base portion 242 using the rivets 261 to 264.

Note that in the present embodiment, two holes 283 are provided in the inner plate portion 252 of the base portion 242 (see FIG. 19). The left protection member 256 is fastened to the base portion with a projection 285 thereof inserted into one hole 283 (see FIG. 25 to be discussed below). The right protection member 257 is fastened to the base portion 242 with a projection (not shown) thereof inserted into the other hole 283. Therefore, the protection members 256 and 257 are fastened to the base portion 242 while being positioned by means of the projections and the holes 283.

As described above, in the present embodiment, the ring-shaped extension apparatus 5 includes the left protection member 256 that is sandwiched between the end portion of the inner plate portion 252 on one side (specifically, the left side) and the elastic member 241 and the right protection member 257 that is sandwiched between the end portion of the inner plate portion 252 on the other side and the elastic member 241. The left protection member 256 has a corner that is more rounded than the corner of the inner plate portion 252 that is to be in contact with the left protection member 256 (see FIG. 20). The right protection member 257 has a corner that is more rounded than the corner of the inner plate portion 252 to be in contact with the right protection member 257. Although the details will be described later, the corner portion of the inner plate portion 252 described above is a portion to which a great force is applied when the user performs an operation of deforming the elastic member 241 while using the ring-shaped extension apparatus 5 (see FIG. 21). Therefore, it is possible to efficiently protect the elastic member 241 by providing protection members in such portions as described above so as to prevent the elastic member 241 (more specifically, the core 243) from directly contacting the base portion 242. Note that the elastic member 241 may be in contact with the corners of the protection members 256 and 257 only in the steady state, or may be in contact with the corners only in the deformed state, or may be in contact with the corners in both of the states.

Note that when the protection members 256 and 257 are of a material that is softer than the base portion 242, the possibility of damaging the elastic member 241 is lower than that in cases where the protection members 256 and 257 are absent or than that in cases where the protection members 256 and 257 are of a material that is harder than the base portion 242. Therefore, in such a case as described above, the protection members 256 and 257 do not need to be shaped so that the portions thereof to be in contact with the elastic member 241 are more rounded than the corner of the inner edge of the opening of the base portion 242.

In other embodiments, the two protection members 256 and 257 may be integral together (i.e., may be a single component).

In other embodiments, of the inner edge of the opening of the base portion 242, the protection member may be provided on the tube inner side surface of the outer plate portion 251 in addition to (or instead of) on the tube inner side surface of the inner plate portion 252. Thus, it is possible to reduce the possibility that the elastic member 241 directly contacts the base portion 242.

As shown in FIG. 18, the ring-shaped extension apparatus 5 includes a strain gauge 245. The strain gauge 245 is provided on the base portion 242 for detecting the strain of the base portion 242. That is, in the present embodiment, the base portion 242 functions as the strain body. Although the details will be described later, when the elastic member 241 deforms as the user operates the ring-shaped extension apparatus 5, the base portion 242 is strained by the force from the elastic member 241. In the present embodiment, the strain generated on the base portion 242 is detected by the strain gauge 245 so as to calculate the orientation of deformation and the degree of deformation of the elastic member 241 based on the detection result.

In the present embodiment, the base portion 242 is provided inside the housing 212 of the main portion 202 (see FIG. 14). That is, the strain gauge 245 is provided in the housing 212. Thus, the strain gauge 245 can be protected by the housing 212.

In the present embodiment, the strain gauge 245 is provided on a portion of the ring-shaped portion 201 other than the grip portions. Thus, it is possible to reduce the possibility that the strain gauge 245 detects an unnecessary strain as the user holds at the position of the strain gauge 245, and it is possible to precisely detect the strain due to the deformation of the elastic member 241.

As shown in FIG. 18, in the present embodiment, the strain gauge 245 is provided on the outer plate portion 251 of the base portion 242. More specifically, the strain gauge 245 is provided on the outer side surface (i.e., a surface that faces the outer side of the ring formed by the ring-shaped portion 201) of the outer plate portion 251. The strain gauge 245 is provided substantially at the center of the base portion 242 for the left-right direction (i.e., the X-axis direction shown in the figures). The strain gauge 245 is provided substantially at the center of the base portion 242 for the front-rear direction (i.e., the Z-axis direction shown in the figures).

In the present embodiment, the strain gauge 245 detects the strain of the base portion 242 for the left-right direction (i.e., the X-axis direction shown in the figures), and the strain of the base portion 242 for the front-rear direction (i.e., the Z-axis direction shown in the figures). That is, the strain gauge 245 includes a sensor that detects the strain for the left-right direction and a sensor that detects the strain for the front-rear direction. Although the details will be described later, in the present embodiment, the strain gauge 245 performs temperature compensation by detecting the strain for the two directions described above.

Figure 21:
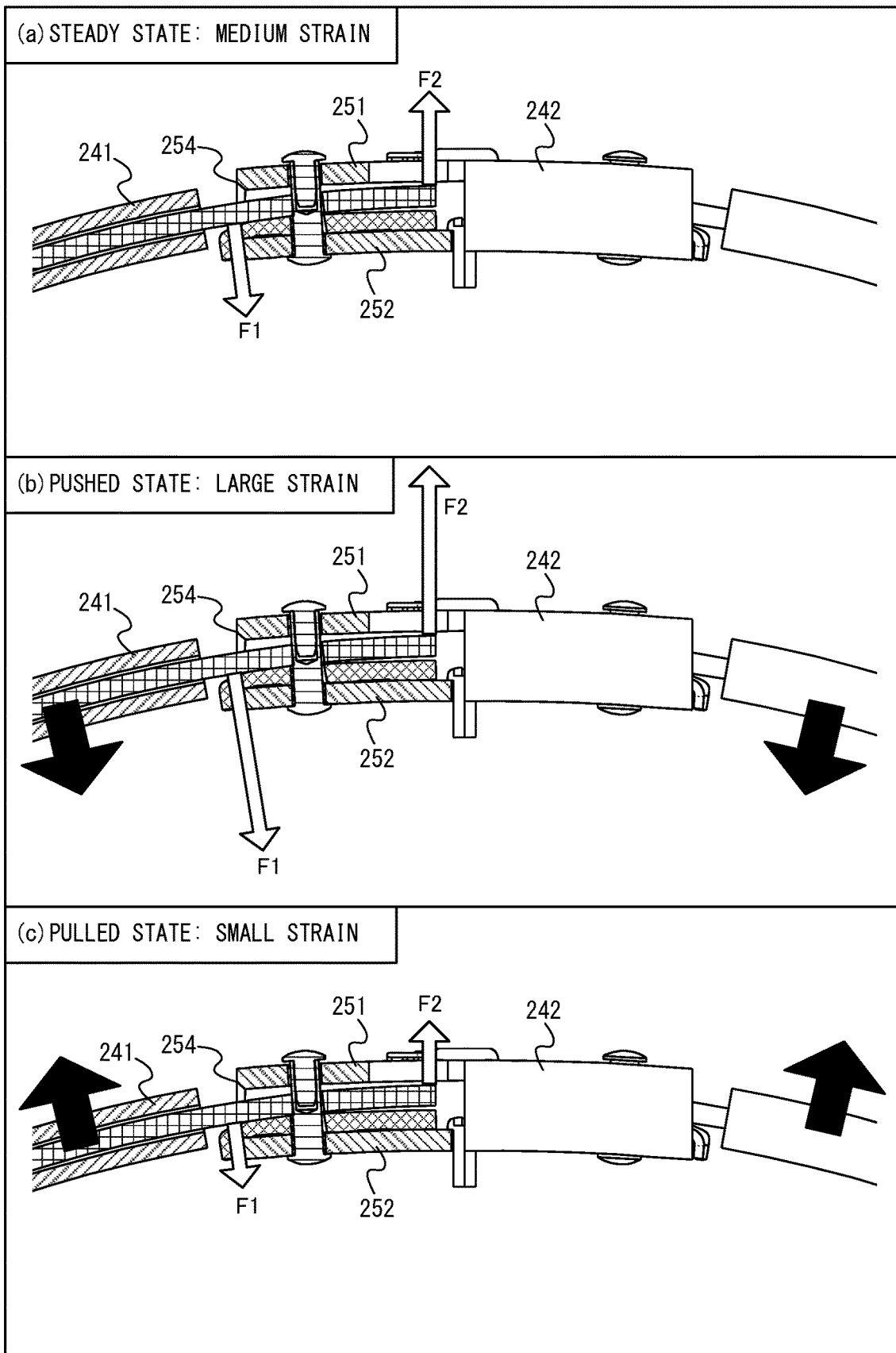
FIG. 21 is a diagram showing an example of a relationship between deformation of an elastic member and a force that is applied by the deformation to a base portion.

FIG. 21 is a diagram showing an example of a relationship between deformation of the elastic member 241 and a force that is applied by the deformation to the base portion 242. FIG. 21(a) shows a state (referred to as the "steady state") in which the ring-shaped extension apparatus 5 is not being operated (i.e., the elastic member 241 is not being deformed). FIG. 21(b) shows a state (referred to as the "pushed state") in which the grip portions of the ring-shaped extension apparatus 5 are being pushed toward each other (i.e., toward the center of the ring). FIG. 21(c) shows a state (referred to as the "pulled state") in which the grip portions of the ring-shaped extension apparatus 5 are being pulled away from each other.

In the steady state shown in FIG. 21(a), the elastic member 241 is not being deformed by the operation of the user. Note however that in the present embodiment, since the elastic member 241 is deformed into a circular shape as the elastic member 241 is held by the base portion 242, the elastic member 241 is under a stress due to the deformation. Therefore, the base portion 242 receives, from the elastic member 241, a force due to the stress (i.e., the force with which the elastic member 241 presses the base portion 242). Specifically, as shown in FIG. 21, the inner plate portion 252 of the base portion 242 receives a force F1, oriented toward the center of the ring formed by the ring-shaped portion 201, from the elastic member 241 (via the protection members) near the left opening 254. The outer plate portion 251 of the base portion 242 receives a force F2, oriented the outer side of the ring formed by the ring-shaped portion 201, from the elastic member 241 near the center in the left-right direction. Note that although FIG. 21 only shows a force that is applied from the elastic member 241 on the left side relative to the center of the base portion 242, a force similar to the force on the left side is applied also on the right side relative to the center of the base portion 242. Due to these forces F1 and F2, etc., the outer plate portion 251 of the base portion 242 receives the tensile strain for the left-right direction (i.e., the strain in the direction in which the outer plate portion 251 extends for the left-right direction).

In the pushed state shown in FIG. 21(b), portions of the elastic member 241 near the openings 254 and 255 of the base portion 242 deform toward the inside of the ring formed by the ring-shaped portion 201 as compared with the steady state (see black arrows). Therefore, the forces F1 and F2, etc., received by the base portion 242 from the elastic member 241 are larger than those in the steady state (see FIG. 21(b)). Therefore, the amount of strain of the outer plate portion 251 of the base portion 242 for the left-right direction is greater than that in the steady state. Note that in the pushed state, the amount of tensile strain of the outer plate portion 251 increases as the amount by which the elastic member 241 is deformed in the pushing direction.

In the pulled state shown in FIG. 21(c), portions of the elastic member 241 near the openings 254 and 255 of the base portion 242 deform toward the outside of the ring formed by the ring-shaped portion 201 as compared with the steady state (see black arrows). Therefore, the forces F1 and F2, etc., received by the base portion 242 from the elastic member 241 are smaller than those in the steady state (see FIG. 21(c)). Therefore, the amount of strain of the outer plate portion 251 of the base portion 242 for the left-right direction is smaller than that in the steady state. Note that in the pulled state, the amount of tensile strain of the outer plate portion 251 decreases as the amount by which the elastic member 241 is deformed in the pulling direction.

Note that in the pulled state, when the amount by which the elastic member 241 is deformed exceeds a certain level, as opposed to the state shown in FIG. 21, the elastic member 241 pushes the outer plate portion 251 upward near the openings, and pushes the inner plate portion 252 (via the protection members) downward near the center of the base portion 242. The elastic member 241 may be deformable to such a degree that this state is achieved. In such a case as described above, the outer plate portion 251 is under a compressive strain for the left-right direction (i.e., a strain in the direction in which the outer plate portion 251 shrinks for the left-right direction). In other words, in such a case as described above, the tensile strain of the outer plate portion 251 is a negative strain.

As described above, by detecting the strain (specifically, the tensile strain) in the left-right direction of the base portion 242, it is possible to calculate the direction of deformation and the amount of deformation of the elastic member 241, and it is possible to know the content of the operation performed using the ring-shaped extension apparatus 5. That is, based on the detection result of the strain gauge 245 provided on the base portion 242, it is possible to identify the content of the operation performed using the ring-shaped extension apparatus 5 (specifically, the direction and the magnitude of the operation of pushing or pulling the grip portions). Note that in the present embodiment, the process of identifying the content of the operation performed using the ring-shaped extension apparatus 5 is executed by the main body apparatus 2.

Note that while the elastic member 241 is under a stress and therefore the base portion 242 is under a tensile strain in the steady state in the present embodiment, the elastic member 241 may be in such a shape that the elastic member 241 is under no stress in the steady state (i.e., a shape that forms a part of a circular ring with no force applied thereto) in other embodiments. Even when the elastic member 241 has such a shape as described above, by detecting the direction of the change of strain of the base portion 242 (i.e., whether it is a tensile strain or a compressive strain) and the amount of change thereof as compared with the steady state, it is possible to calculate the direction of deformation of the elastic member 241 and the amount of deformation thereof, and to know the content of the operation performed using the ring-shaped extension apparatus 5.

As described above, the present embodiment employs a configuration where the strain gauge 245 is put on the base portion 242 so as to detect the strain of the base portion 242, which functions as a strain body. That is, in the present embodiment, by providing the strain gauge 245 on the base portion 242, which deforms less than the elastic member 241, rather than on the elastic member 241, which deforms more than the base portion 242, it is possible to reduce the possibility of damaging the strain gauge 245 due to deformation.

As described above, in the present embodiment, the strain gauge 245 also detects the strain in the front-rear direction as well as the strain in the left-right direction. This is for performing temperature compensation. That is, based on the difference between the output from a sensor that detects the strain in the left-right direction and the output from a sensor that detects the strain in the front-rear direction, the strain gauge 245 outputs a detection result (i.e., a value representing the strain in the left-right direction), wherein the influence due to temperature-based changes in the sensor characteristics is suppressed. In the present embodiment, temperature compensation is performed by a bridge circuit that is provided together with the strain gauge 245. Note that there is no limitation on the method for performing temperature compensation based on strains for two directions, and those similar to conventional methods may be used.

As described above, in the present embodiment, the strain in the front-rear direction is detected so as to perform temperature compensation. In the present embodiment, the slits 258 are provided in the base portion 242, forward and rearward of the strain gauge 245 (see FIG. 18). The slits 258 are an example of holes, and generally have a shape with the width direction and the longitudinal direction. Note that in the present embodiment, the slits 258 are holes that are different from those through which rivets are passed as described above. The reason for the provision of the slits 258 will now be described.

First, consider a case where no slits are provided in the base portion. It has been found that in such a case, when the force shown in FIG. 21 is applied by the elastic member to the base portion, the outer plate portion of the base portion is not only under a tensile strain in the left-right direction but also under a tensile strain in the front-rear direction. It is believed that this is because the base portion 242 has such a shape that the outer plate portion and the inner plate portion are continuous with each other with the side plate portions therebetween, and therefore when a force is applied that bends down the left and right end portions of the outer plate portion, the deformation of the inner plate portion and the side plate portions, which occurs at the same time with the deformation of the outer plate portion, generates a force on the outer plate portion such that the outer plate portion is pulled by the side plate portions. Where a strain in the front-rear direction does not occur when a strain in the left-right direction occurs, by determining the difference between the detection results from the strain gauge for these two directions, variations in the output value for the left-right direction due to temperature changes can be canceled out by variations in the output value for the front-rear direction due to temperature changes, and it is possible to obtain a strain value while taking temperature compensation into consideration. On the other hand, when a tensile strain occurs both in the left-right direction and in the front-rear direction, the difference between the detection result for the left-right direction and the detection result for the front-rear direction is decreased (or substantially eliminated), and therefore it may be impossible to obtain an accurate value for the strain value in the left-right direction while taking temperature compensation into consideration.

In contrast, in the present embodiment, with the provision of the slits 258 in the base portion 242, it is possible to reduce the tensile strain in the front-rear direction occurring at the position where the strain gauge 245 is provided. Specifically, the portion where the strain gauge 245 is provided and the side plate portions 253 are separated from each other by the slits 258. Therefore, when a force is applied to the outer plate portion 251 that bends down the left and right end portions of the outer plate portion 251, the portion where the strain gauge 245 is provided is unlikely to receive a force by which it is pulled by the side plate portions 253 on the outer side, thereby reducing the tensile strain in the front-rear direction. In the present embodiment, it is possible with the slits 258 to make the tensile strain in the front-rear direction substantially zero. Therefore, there is a difference between the detection result for the left-right direction and the detection result for the front-rear direction, and it is possible to obtain an accurate value for the strain value in the left-right direction while taking temperature compensation into consideration. Note that even if the tensile strain in the front-rear direction is made substantially zero by the slits 258, there still remain variations in the strain value in the front-rear direction due to temperature changes, and it is therefore possible to perform temperature compensation based on such a difference as described above. Needless to say, there is no limitation on the method for temperature compensation, and any correction may be made as necessary, in addition to a method of simply obtaining the difference.

As described above, in the present embodiment, the strain gauge 245 detects the strain of the base portion 242 for the left-right direction from the left opening 254 to the right opening 255, and the strain of the base portion 242 for the front-rear direction, which is perpendicular to the left-right direction. The base portion 242 has the slits 258, provided forward and rearward of the strain gauge 245 (see FIG. 18). Thus, it is possible to perform temperature compensation based on the difference between the strains for the two directions, and it is possible to accurately detect the amount of strain.

In the present embodiment, the length of each slit 258 for the left-right direction is longer than the length of the strain gauge 245 for the left-right direction (see FIG. 18). The opposite ends of the slit 258 in the left-right direction are located on the outer side in the left-right direction relative to the opposite ends of the strain gauge 245 in the left-right direction. That is, for the left-right direction, the length from the center of the strain gauge 245 to the left end of the slit 258 is longer than the length from the center to the left end of the strain gauge 245, and the length from the center of the strain gauge 245 to the right end of the slit 258 is longer than the length from the center to the right end of the strain gauge 245. Then, it is possible to sufficiently reduce the influence of a portion of the base portion 242 where the strain gauge 245 is provided being pulled by other portions in the front-rear direction, and it is possible to detect an accurate amount of strain based on temperature compensation.

In the present embodiment, the slits 258 are provided on the outer plate portion 251, where the strain gauge 245 is provided, on opposite sides of the strain gauge 245 for the front-rear direction. Therefore, when a force is applied to the outer plate portion 251 in the direction of bending up the outer plate portion 251, it is possible to effectively suppress the force by which the portion where the strain gauge 245 is provided is pulled by the side plate portions 253. Thus, it is possible to reduce the influence of the strain in the front-rear direction, and to accurately detect the amount of strain. Note that on the side plate portions 253, in addition to (or instead of) on the outer plate portion 251, slits 258 may be provided on opposite sides of the strain gauge 245 in the front-rear direction. Then, it is possible to reduce the influence of the strain in the front-rear direction as in the present embodiment.

Note that although the slits 258, which are an example of holes, are provided in the base portion 242 in the present embodiment, notches instead of holes may be provided in the base portion 242 in other embodiments. Note that as used herein, a space that is surrounded by a plate-shaped member (e.g., the outer plate portion) over the entire circumference is referred to as a "hole", whereas a space that is not surrounded by such a member over the entire circumference (i.e., the structure is open in one direction along the circumference) is referred to as a "notch". In other embodiments, notches may be provided so as to extend from one end of the outer plate portion in the left-right direction to positions forward and rearward of the strain gauge 245. Then, even when the outer plate portion 251 is bent, the portion where the strain gauge 245 is provided is less likely to receive a force by which it is pulled by the side plate portions 253 on the outer side. Thus, as in the present embodiment, it is possible to reduce the influence of the strain in the front-rear direction, and it is possible to accurately detect the amount of strain.

Note that there is no limitation on the position and the size of the notches and/or holes provided forward and rearward of the strain gauge 245. For example, in other embodiments, the notches and/or holes may be provided in the side plate portions 253 of the base portion 242, or may be provided in the inner plate portion 252. Even with such a configuration, it is possible to reduce the tensile strain in the front-rear direction generated on the portion where the strain gauge 245 is provided. It is believed that this is because such a configuration reduces the influence of the deformation of the inner plate portion 252 and the side plate portions 253, which occurs at the same time with the deformation of the outer plate portion 251, on the outer plate portion 251 when a force is applied to the outer plate portion 251 that bends down the left and right end portions of the outer plate portion 251.

Figure 22:
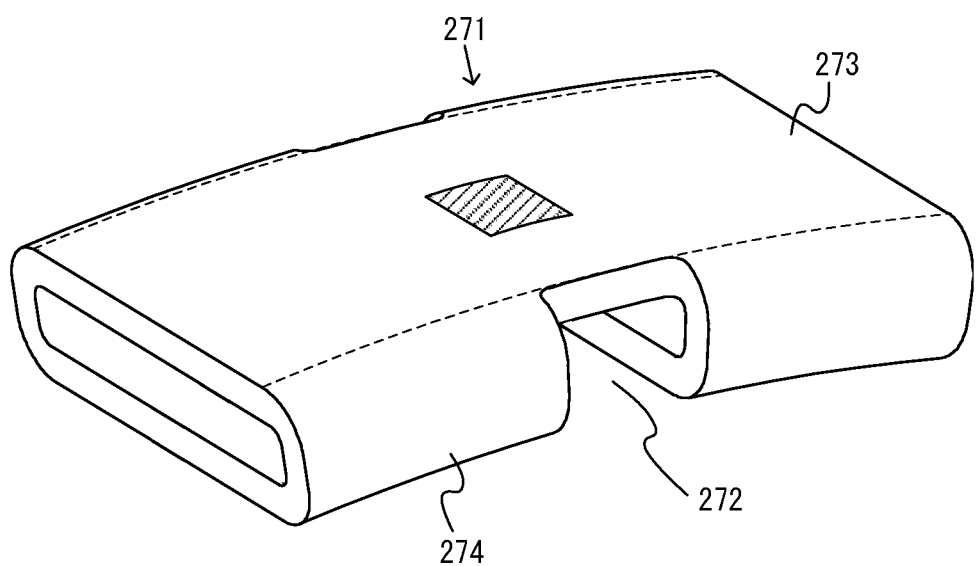
FIG. 22 is a diagram showing an example of a base portion according to a first variation of the present embodiment.
Figure 23:
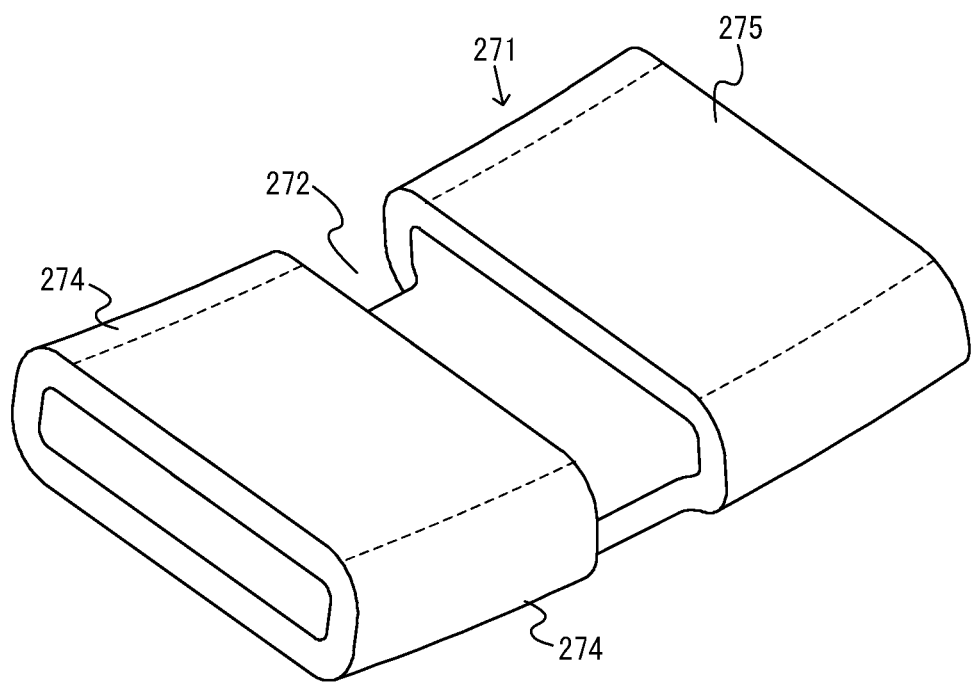
FIG. 23 is a diagram showing an example of a base portion according to a first variation of the present embodiment.

FIG. 22 and FIG. 23 are each a diagram showing an example of the base portion according to the first variation of the present embodiment. FIG. 22 is a perspective view of a base portion 271 according to the first variation as viewed from above, and FIG. 23 is a perspective view of the base portion 271 as viewed from below. Note that the hatched area shown in FIG. 22 denotes the position where the strain gauge 245 is provided. The dotted lines shown in FIG. 22 and FIG. 23 (this similarly applies also to FIG. 24 to be discussed below) are drawn for ease of understanding of the positions of an outer plate portion 273, side plate portions 274 and an inner plate portion 275 of the base portion 271, and the dotted lines are not actually drawn on the base portion 271. FIG. 22 and FIG. 23 (this similarly applies also to FIG. 24 to be discussed below) do not show holes through which rivets are passed, and screw holes for fastening the base portion 271 to the housing. Note that as does the base portion 242 of the present embodiment, the base portion 271 of the first variation has a side surface that is continuous for one complete round in the circumferential direction with the inside of the side surface being hollow, and it can also be said to be a tubular shape. As does the base portion 242 of the present embodiment, the base portion 271 of the first variation also includes two side plate portions 274 that connect together the inner plate portion 275 and the outer plate portion 273 on opposite sides in the front-rear direction, and two end portions of the elastic member 241 are surrounded by the inner plate portion 275, the outer plate portion 273 and the side plate portions 274. Therefore, as in the present embodiment, it is possible to realize the effect of reducing the possibility of damaging the rivets and the elastic member. As the base portion 242 surrounds the end portions of the elastic member 241, it is possible to reduce the possibility that the elastic member 241 may slip down the base portion 242 or come off the base portion 242.

As shown in FIG. 22 and FIG. 23, the tubular base portion 271 includes a notch 272, instead of the slits 258 of the present embodiment. As are the slits 258 of the present embodiment, the notch 272 is provided to extend forward and rearward of the position where the strain gauge 245 is provided. That is, the notch 272 is provided at the same position as the strain gauge 245 for the left-right direction. In other words, the notch 272 is provided in the central portion of the base portion 271 in the left-right direction so as to extend across the side plate portions 274 and the inner plate portion 275. In this variation, when a force is applied that bends down the left and right end portions of the outer plate portion 273, the portion where the strain gauge 245 is provided is less likely to receive the influence of the deformation of the inner plate portion 275 and the side plate portions 274 because the side plate portions 274 and the inner plate portion 275 are absent (notched) in the central portion of the base portion 271. Therefore, also in the first variation, as in the embodiment described above, it is possible to reduce the tensile strain generated in the front-rear direction at the position where the strain gauge 245 is provided, and it is possible to realize a similar effect to that of the present embodiment.

Figure 24:
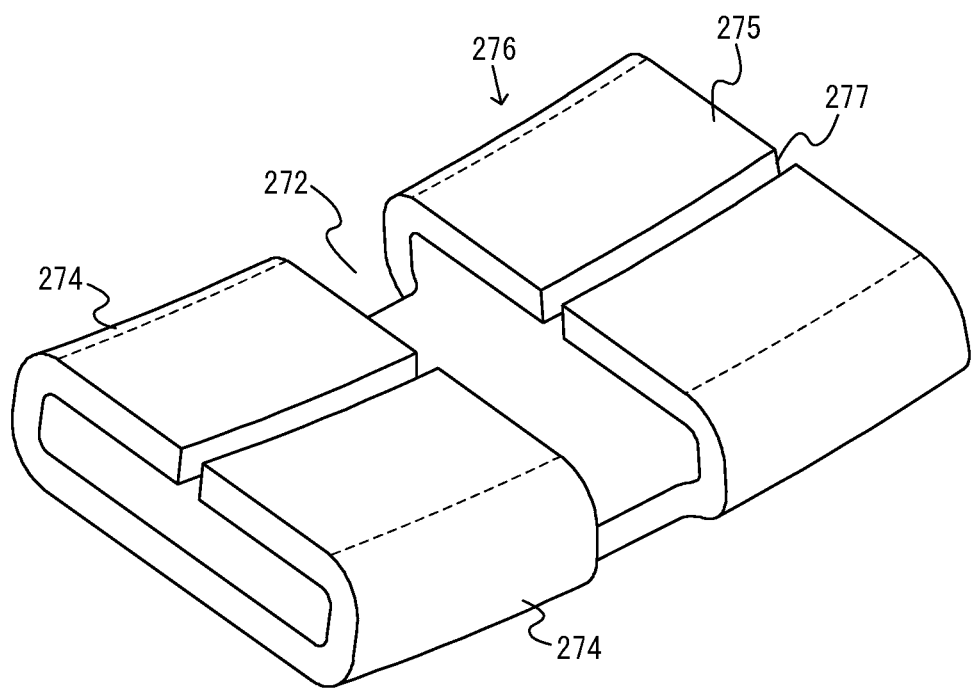
FIG. 24 is a diagram showing an example of a base portion according to a second variation of the present embodiment.

FIG. 24 is a diagram showing an example of a base portion according to a second variation of the present embodiment. FIG. 24 is a perspective view of a base portion 276 according to the second variation as viewed from below. As shown in FIG. 24, the base portion 276 of the second variation is different from the base portion 271 of the first variation in that the inner plate portion 275 has a gap 277 that extends in the left-right direction. Thus, the base portion 276 is in such a shape that it can be produced by bending a single metal plate (note however that the base portion 276 is not limited to what can be produced through a bending process). Note that even if the gap 277 is absent, it is possible with the provision of the notch 272 to reduce the tensile strain in the front-rear direction generated on the portion where the strain gauge 245 is provided.

Note that in other embodiments, no holes or notches may be provided in the base portion. For example, when the base portion is in a single plate shape, it is believed that no tensile strain occurs in the front-rear direction even if a force is applied that bends down the left and right end portions of the base portion. Therefore, holes or notches may be absent in the base portion. For example, when temperature compensation by detecting the strain in the left-right direction and the strain in the front-rear direction is not performed (i.e., when the strain gauge detects only the strain in the left-right direction), holes or notches may be absent in the base portion.

Figure 25:
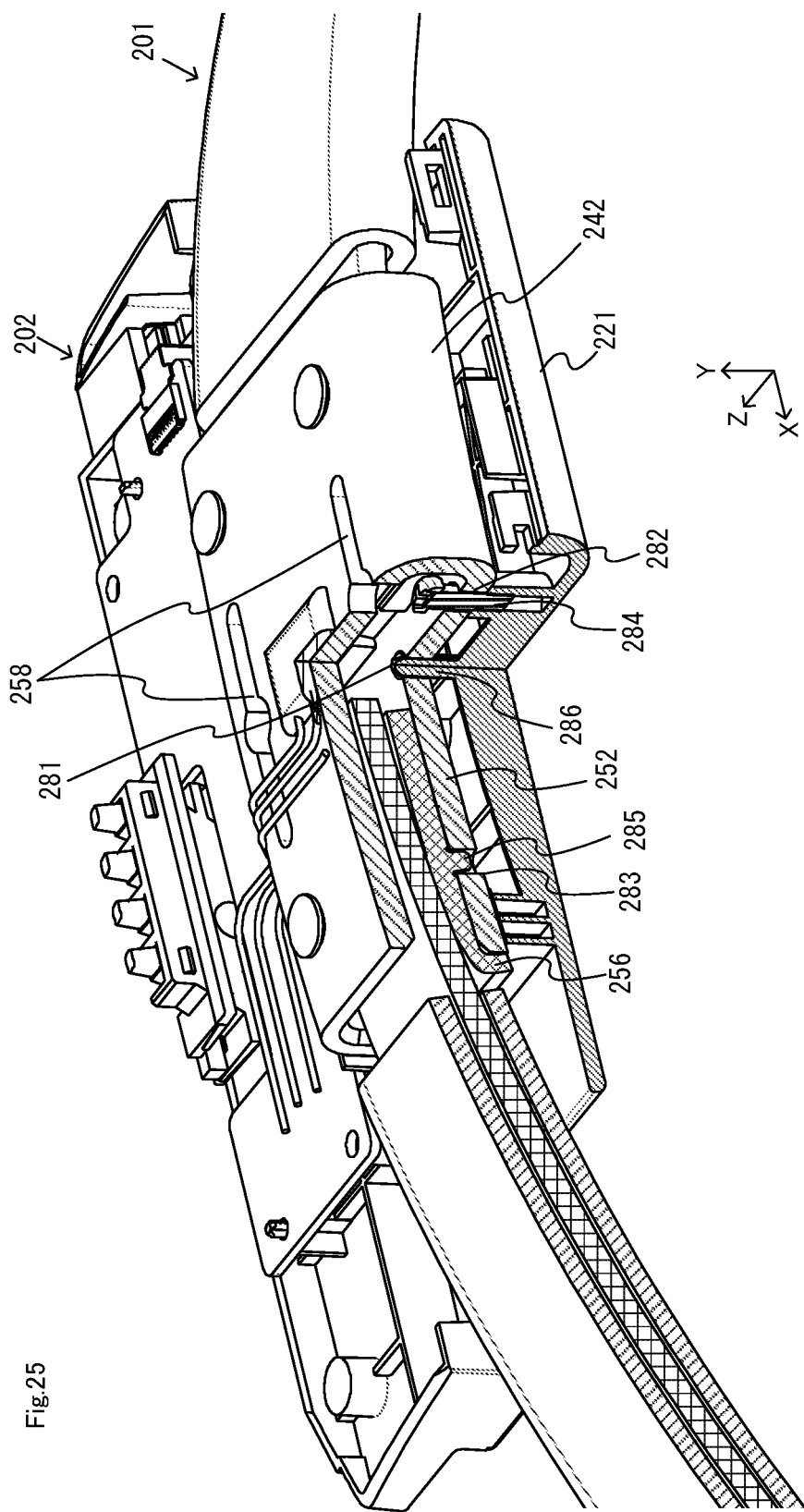
FIG. 25 is a partially cut-away cross-sectional view of a ring-shaped portion and a main portion of a non-limiting ring-shaped extension apparatus.

FIG. 25 is a partially cut-away cross-sectional view of the ring-shaped portion 201 and the main portion 202 of the ring-shaped extension apparatus 5. FIG. 25 shows the ring-shaped extension apparatus 5 with the outer housing 222 of the main portion 202 removed. FIG. 25 shows the ring-shaped portion 201 and the main portion 202 partially cut away along, instead of the cross section that extends along half line AB of FIG. 18 and is perpendicular to the Z axis, a cross section that is parallel to the cross section and that passes through the center of the base portion 242 in the Z-axis direction.

As shown in FIG. 25, the ring-shaped portion 201 and the main portion 202 are secured to each other by fastening together the base portion 242 of the ring-shaped portion 201 and the inner housing 221 of the main portion 202. Specifically, the base portion 242 and the main portion 202 are fastened together by screwing screws 284 into screw holes of the inner housing 221 while passing through holes 282 (see FIG. 19) provided in the inner plate portion 252 of the base portion 242. Note that in the present embodiment, the holes 282 are provided at two locations, forward and rearward of the inner plate portion 252 (see FIG. 19), and the base portion 242 and the main portion 202 are fastened together using screws at the two locations.

As shown in FIG. 25, the base portion 242 and the main portion 202 are fastened together with a projection 286 of the inner housing 221 inserted in a hole 281 provided in the inner plate portion 252 (see FIG. 19). Thus, the base portion 242 and the main portion 202 are fastened together while being positioned by the projection 286 and the hole 281.

In the present embodiment, the holes 282 provided in the inner plate portion 252 of the base portion 242 are located so as to oppose the slits 258 provided in the outer plate portion 251 of the base portion 242. A portion of each slit 258 that opposes the hole 282 is slightly enlarged so that the screw 284 can pass therethrough. Therefore, when fastening together the base portion 242 and the inner housing 221 using the screws 284, it is possible to screw the screws 284 through the slits 258. Thus, the inner housing 221 can be easily put on the base portion 242.

As described above, in the present embodiment, the strain gauge 245 is provided on the outer plate portion 251. The housing 212 is secured to the inner plate portion 252 and at least covers the strain gauge 245. Thus, in the present embodiment, the position on the base portion 242 where the strain gauge 245 is provided and the position at which the base portion 242 is secured to the housing are arranged apart from each other (e.g., on opposing surfaces of the base portion 242 having a tubular shape). As the base portion 242 is secured (e.g., fastened using screws) to another member, the base portion 242 is under a stress, and the strain gauge 245 may detect, as noise, a strain occurring due to the stress. Therefore, if the base portion 242 and another member are secured to each other at a position near the strain gauge 245, noise to be detected by the strain gauge 245 will increase, and the precision of detecting a strain due to deformation of the elastic member 241 may possibly lower. In contrast, according to the present embodiment, as the base portion 242 and the housing are secured together, the strain gauge 245 is less likely to detect a strain (noise) generated on the base portion 242, and it is therefore possible to improve the precision with which the strain gauge 245 detects a strain due to deformation of the elastic member 241.

In the present embodiment, as shown in FIG. 25, the position at which the base portion 242 and the main portion 202 are secured to each other is substantially at the center of the base portion 242 for the left-right direction. For example, when the position at which the base portion 242 and the main portion 202 are secured to each other is lopsided in the left-right direction, the strain generated due to the securing will not be in symmetry for the left-right direction. Then, when the strain is detected by the strain gauge 245, the precision of detecting a strain due to deformation of the elastic member 241 may possibly lower. In contrast, in the present embodiment, it is possible to reduce the possibility that a strain is generated that is asymmetrical for the left-right direction, and it is therefore possible to improve the precision with which the strain gauge 245 detects a strain due to deformation of the elastic member 241.

[1-2-4. Electrical Configuration]

Figure 26:
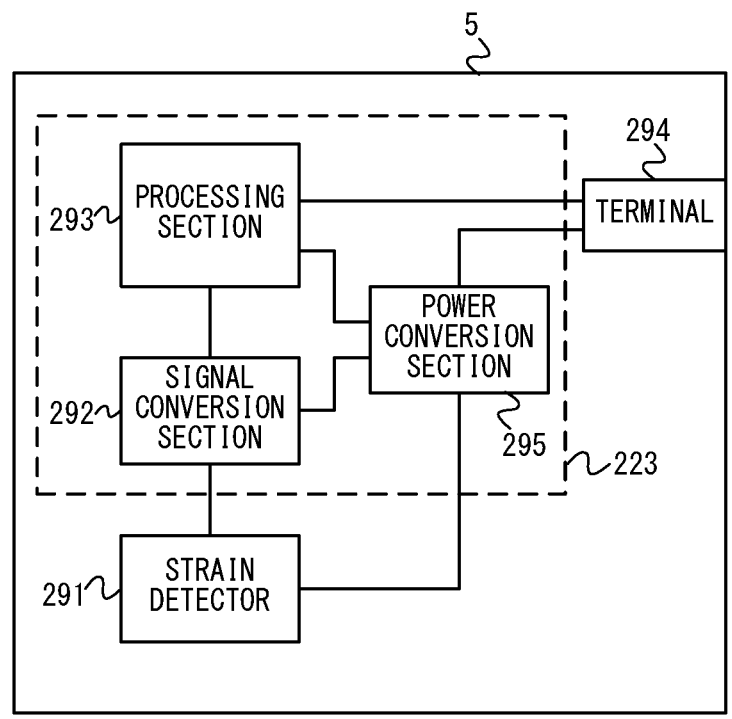
FIG. 26 is a block diagram showing an electrical connection relationship between components of a non-limiting ring-shaped extension apparatus.

FIG. 26 is a block diagram showing an electrical connection relationship between components of the ring-shaped extension apparatus 5. As shown in FIG. 26, the ring-shaped extension apparatus 5 includes a strain detector 291. The strain detector 291 is an example of a detector that detects deformation of the ring-shaped portion 201. In the present embodiment, the strain detector 291 includes the strain gauge 245 described above and a bridge circuit. The strain detector 291 outputs a signal representing the strain of the base portion 242 in accordance with the deformation of the elastic member 241 (in other words, a signal representing the magnitude of deformation and the direction of deformation of the elastic member 241). Note that in the present embodiment, the output signal from the strain detector 291 represents a strain value that has been temperature-compensated by the bridge circuit.

The ring-shaped extension apparatus 5 includes a signal conversion section 292. In the present embodiment, the signal conversion section 292 includes an amplifier and an AD converter. The signal conversion section 292 is electrically connected to the strain detector 291 so as to amplify the output signal from the strain detector 291 through the amplifier and performs an AD conversion through the AD converter. The signal conversion section 292 outputs a digital signal representing the strain value. Note that in other embodiments, the signal conversion section 292 may not include an AD converter, and a processing section 293 to be described below may include an AD converter.

The ring-shaped extension apparatus 5 includes the processing section 293. The processing section 293 is a processing circuit including a processor and a memory, and is an MCU (Micro Controller Unit), for example. The processing section 293 is electrically connected to the signal conversion section 292, and the output signal from the signal conversion section 292 is input to the processing section 293. The ring-shaped extension apparatus 5 includes the terminal 294. The terminal 294 is electrically connected to the processing section 293. When the right controller 4 is attached to the ring-shaped extension apparatus 5, the processing section 293 sends information representing the strain value that is represented by the output signal from the signal conversion section 292 (in other words, the ring operation data) to the right controller 4 through the terminal 294. Note that a "terminal", as used herein, means to encompass a terminal having one pin (i.e., a single-pin terminal) and a terminal having a plurality of pins (i.e., a multi-pin terminal).

The processing section 293 may execute a process in accordance with the operation performed using the ring-shaped extension apparatus 5. For example, the processing section 293 may count and store the number of times an operation is performed using the ring-shaped extension apparatus 5. The processing section 293 may execute a process in accordance with an instruction transmitted from an external device (e.g., the main body apparatus 2 or the right controller 4) through the terminal 294.

The ring-shaped extension apparatus 5 includes a power conversion section 295. The power conversion section 295 is electrically connected to the sections 291 to 294. The power conversion section 295 supplies power, which is supplied from the outside (i.e., the right controller 4) through the terminal 294, to the sections 291 to 294. The power conversion section 295 may supply the supplied power to the sections 291 to 294 after voltage adjustment, etc.

As described above, in the present embodiment, the ring-shaped extension apparatus 5 operates by using the power supplied from the right controller 4. That is, the strain detector 291 operates by using the power supplied from the right controller 4 attached to the ring-shaped extension apparatus 5 through the terminal 294. The processing section 293, e.g., a transmitter, is configured to transmit data regarding the detection result of the strain detector 291 (i.e., the ring operation data) to the right controller 4 operates by using the power supplied from the right controller 4 attached to the ring-shaped extension apparatus 5 through the terminal 294. Thus, the ring-shaped extension apparatus 5 does not itself need to include a power supply, and it is possible to reduce the weight of the ring-shaped extension apparatus 5.

Note that the "data regarding the detection result of the strain detector" that is transmitted by the ring-shaped extension apparatus 5 to another device may be data representing the detection result (in the present embodiment, the output signal from the strain detector 291 representing the strain of the base portion 242) itself, or may be data that is obtained by performing some processes on the detection result (e.g., data format conversion and/or an arithmetic process on the strain value, etc.). For example, the processing section 293 may perform a process of calculating the amount of deformation of the elastic member 241 based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

[1-3. Belt-Shaped Extension Apparatus]

Figure 27:
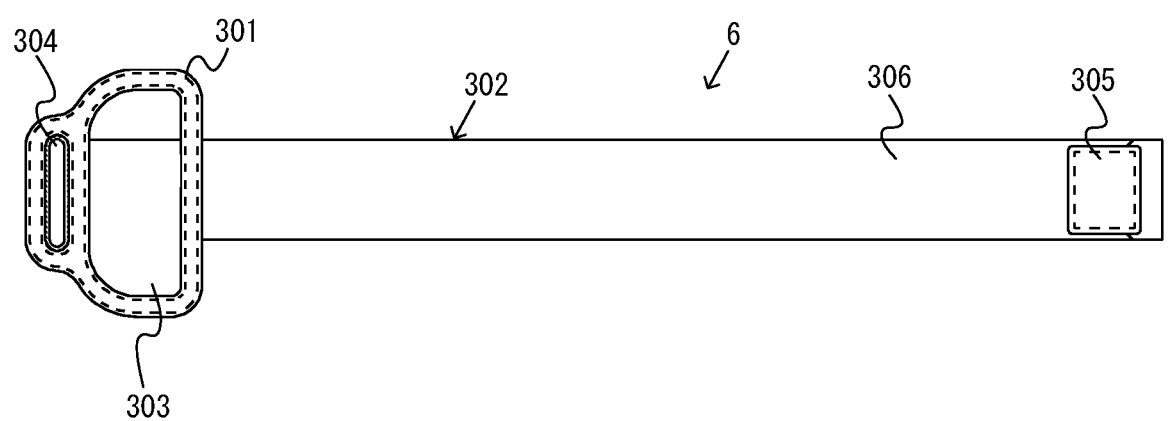
FIG. 27 is a diagram showing an example of a non-limiting belt-shaped extension apparatus.

Next, a configuration of the belt-shaped extension apparatus 6 will be described. FIG. 27 is a diagram showing an example of a belt-shaped extension apparatus. The belt-shaped extension apparatus 6 is fastened to a leg of the user with the left controller 3 accommodated therein (see FIG. 15). In the present embodiment, the belt-shaped extension apparatus 6 is made of a fabric and has a flat shape.

As shown in FIG. 27, the belt-shaped extension apparatus 6 includes an accommodating portion 301 and a belt portion 302. The accommodating portion 301 has a flat shape and is capable of accommodating the left controller 3 therein. Specifically, the accommodating portion 301 includes a pocket portion 303. The pocket portion 303 is formed in a bag shape that is sized so that the left controller 3 can be accommodated therein. Note that the pocket portion 303 does not need to be capable of accommodating the entirety of the left controller 3 but may only be capable of accommodating a part of the left controller 3 (may be capable of accommodating the entirety of the left controller 3). The pocket portion 303 has an opening on the upper side, and the left controller 3 can be inserted from the upper side, thereby accommodating the left controller 3 therein. Thus, in the present embodiment, as the left controller 3 is accommodated in the accommodating portion 301, the left controller 3 is attached to the belt-shaped extension apparatus 6. Note that in other embodiments, there is no limitation on the configuration for attaching the left controller 3 to the belt-shaped extension apparatus 6. In other embodiments, the belt-shaped extension apparatus 6 may include a similar rail portion to that of the ring-shaped extension apparatus 5, and the left controller 3 may be attached to the belt-shaped extension apparatus 6 by means of the rail portion.

As shown in FIG. 27, the accommodating portion 301 includes a through hole 304 on one side of the pocket portion 303 (specifically, on the left side of in FIG. 27). Although the details will be described later, the through hole 304 is a hole that allows the belt portion 302 to be passed therethrough when fastening the belt-shaped extension apparatus 6 to a leg of the user.

The belt portion 302 is provided on one side (specifically, on the right side) of the pocket portion 303 of the accommodating portion 301, i.e., on the opposite side from the through hole 304 with respect to the pocket portion 303. The belt portion 302 has a band shape, and one end thereof is secured to the accommodating portion 301. In the present embodiment, the belt portion 302 is made of a flexible material (e.g., a woven rubber).

As shown in FIG. 27, a first touch fastener 305 and a second touch fastener 306 are provided on the surface of the belt portion 302 on the same side as the pocket portion 303 is provided on the accommodating portion 301. The first touch fastener 305 is provided near the end portion of the belt portion 302 that is on the opposite side from the other end portion that is secured to the accommodating portion 301. The second touch fastener 306 is provided on the same surface as the first touch fastener 305 and on the side that is closer to the accommodating portion 301 than the first touch fastener 305. In the present embodiment, the second touch fastener 306 is provided in the region between the first touch fastener 305 and the end portion of the belt portion 302 that is secured to the accommodating portion 301.

The first touch fastener 305 and the second touch fastener 306 can be attached to and detached from each other. For example, the first touch fastener 305 may be a hook-surface touch fastener, and the second touch fastener 306 is a loop-surface touch fastener.

Figure 28:
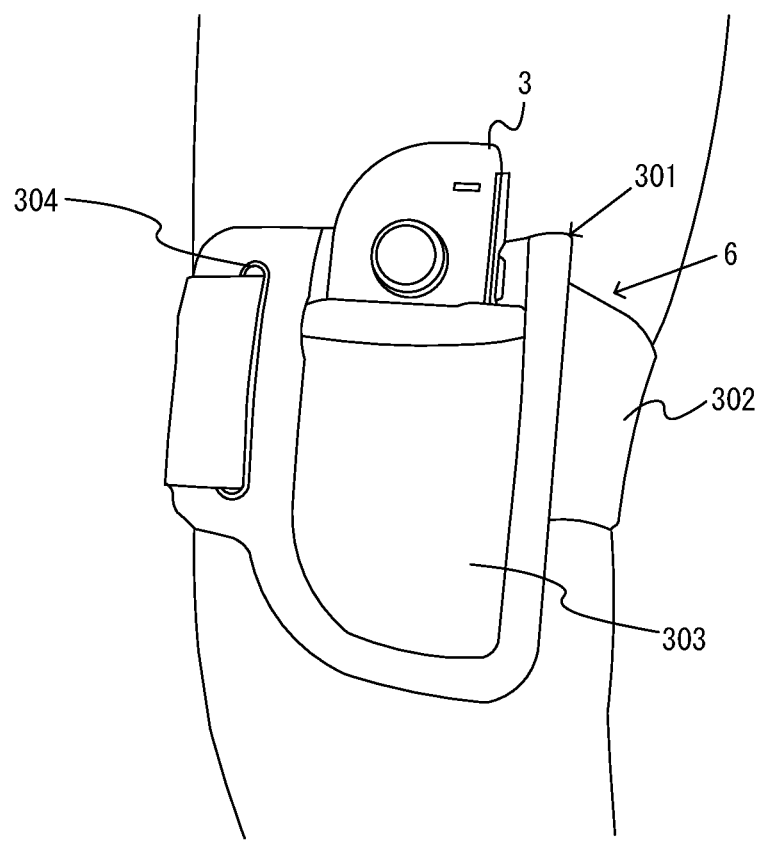
FIG. 28 is a diagram showing an example of a non-limiting belt-shaped extension apparatus fastened around a leg of a user.

FIG. 28 is a diagram showing an example of the belt-shaped extension apparatus fastened to a leg of the user. When fastening the belt-shaped extension apparatus 6, the user passes the belt portion 302 through the through hole 304 with the belt portion 302 wound around a leg, and the user fastens together the first touch fastener 305 and the second touch fastener 306. Note that the user may accommodate the left controller 3 in the belt-shaped extension apparatus 6 and then fasten the belt-shaped extension apparatus 6, with the left controller 3 accommodated therein, to a leg, or the user may fasten the belt-shaped extension apparatus 6 to a leg and then accommodate the left controller 3 in the belt-shaped extension apparatus 6. Thus, the user can fasten the belt-shaped extension apparatus 6, with the left controller 3 accommodated therein, to a leg, as shown in FIG. 28.

2. Example Operation and Use

Next, an example operation and use of a game system using two extension apparatuses 5 and 6 will be described. In the present embodiment, the user can play a game using two extension apparatuses 5 and 6 in addition to a game apparatus (e.g., the main body apparatus 2 and the controllers 3 and 4). For example, the user can use the ring-shaped extension apparatus 5 and the belt-shaped extension apparatus 6 as a set.

For example, as shown in FIG. 15, the user holds the ring-shaped extension apparatus 5 with the right controller 4 attached thereto with both hands, and fastens the belt-shaped extension apparatus 6 with the left controller 3 accommodated therein to a leg. The user can play a game by performing an operation using the ring-shaped extension apparatus 5 (e.g., an operation of bending the ring-shaped extension apparatus 5 and an operation of moving the ring-shaped extension apparatus 5), and performing an operation of moving the leg to which the belt-shaped extension apparatus 6 is fastened.

Where the game process is executed on the main body apparatus 2, the right controller 4 receives the ring operation data from the ring-shaped extension apparatus 5. The ring operation data includes information that represents the strain value. Specifically, the processing section 293 of the ring-shaped extension apparatus 5 transmits the ring operation data to the right controller 4 through the terminal 294. For example, the processing section 293 repeatedly transmits the ring operation data at the rate of once per a predetermined amount of time. Thus, in the present embodiment, even when the ring-shaped extension apparatus 5 is not deformed, the ring operation data is transmitted from the right controller 4 to the main body apparatus 2. That is, when the ring-shaped extension apparatus 5 is not deformed, the ring operation data including information representing a strain value that represents no deformation is transmitted from the right controller 4 to the main body apparatus 2.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that in such a case, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

As described above, the main body apparatus 2 can obtain data that represents the operation performed using the ring-shaped extension apparatus 5, and can execute the game process based on the data. That is, based on the information representing the strain value included in the ring operation data, the main body apparatus 2 can identify the operation of bending the ring-shaped extension apparatus 5 (specifically, the operation of pushing the grip portions of the ring-shaped extension apparatus 5 toward each other and the operation of pulling the grip portions away from each other).

Since the right controller 4 is attached to the ring-shaped extension apparatus 5, the acceleration sensor 114 of the right controller 4 can detect the acceleration of the ring-shaped extension apparatus 5, and the angular velocity sensor 115 of the right controller 4 can detect the angular velocity of the ring-shaped extension apparatus 5. Therefore, based on the right controller operation data including information that represents the detection results of the sensors 114 and 115, the main body apparatus 2 can identify the operation of moving the ring-shaped extension apparatus 5. Note that the "operation of moving the ring-shaped extension apparatus 5" means to include the operation of placing the ring-shaped extension apparatus 5 in a particular position and/or a particular attitude and the operation of changing the position and/or the attitude of the ring-shaped extension apparatus 5.

The main body apparatus 2 may execute the game process based on inputs on the buttons 113 and/or the analog stick 52 of the right controller 4 attached to the ring-shaped extension apparatus 5. As described above, in the present embodiment, the right controller 4 is arranged upward of the grip portions while the user is holding the right grip portion 207 with the right hand and the left grip portion 206 with the left hand (see FIG. 15). Therefore, it is easy for the user to operate the right controller 4 by taking one hand off the grip portion from the state where the user holds the grip portion with both hands.

The right controller 4 may be configured so that the image captured by the infrared imaging section 123 is included in the right controller operation data. For example, in the state where the user has a finger on a window portion 68, it is possible to calculate the heart rate of the user based on the image captured by the infrared imaging section 123. For example, where the user performs a fitness exercise operation as the game operation using the ring-shaped extension apparatus 5 (and the belt-shaped extension apparatus 6), the main body apparatus 2 may calculate the heart rate before and after the fitness exercise operation based on the right controller operation data.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. In such a case, the communication from the right controller 4 to the main body apparatus 2 is done by wireless communication.

Since the left controller 3 is fastened to a leg of the user by means of the belt-shaped extension apparatus 6, the acceleration sensor 104 of the left controller 3 can detect the acceleration of the leg of the user, and the angular velocity sensor 105 of the left controller 3 can detect the angular velocity of the leg of the user. Thus, the main body apparatus 2 can identify the operation of moving the leg of the user based on the left controller operation data including information that represents the detection results of the sensors 104 and 105. Note that "the operation of moving the leg of the user" means to include the operation of placing the leg of the user in a particular position and/or a particular attitude (e.g., the operation of striking a particular pose) and the operation of changing the position and/or the attitude of the leg of the user (e.g., the operation of marching in place).

When the game process is executed, the main body apparatus 2 accepts, as game operations, the operation of moving the ring-shaped extension apparatus 5, the operation using the right controller 4 attached to the ring-shaped extension apparatus 5, and the operation of moving the leg of the user, and executes the game process based on these operations. Specifically, the main body apparatus 2 executes the game process based on the operation data (e.g., the ring operation data, the right controller operation data and the left controller operation data) received from the controllers 3 and 4. Note that there is no limitation on the content of the game process. For example, the main body apparatus 2 generates a game image that represents the result of the game process, and displays the game image on the display device.

Figure 29:
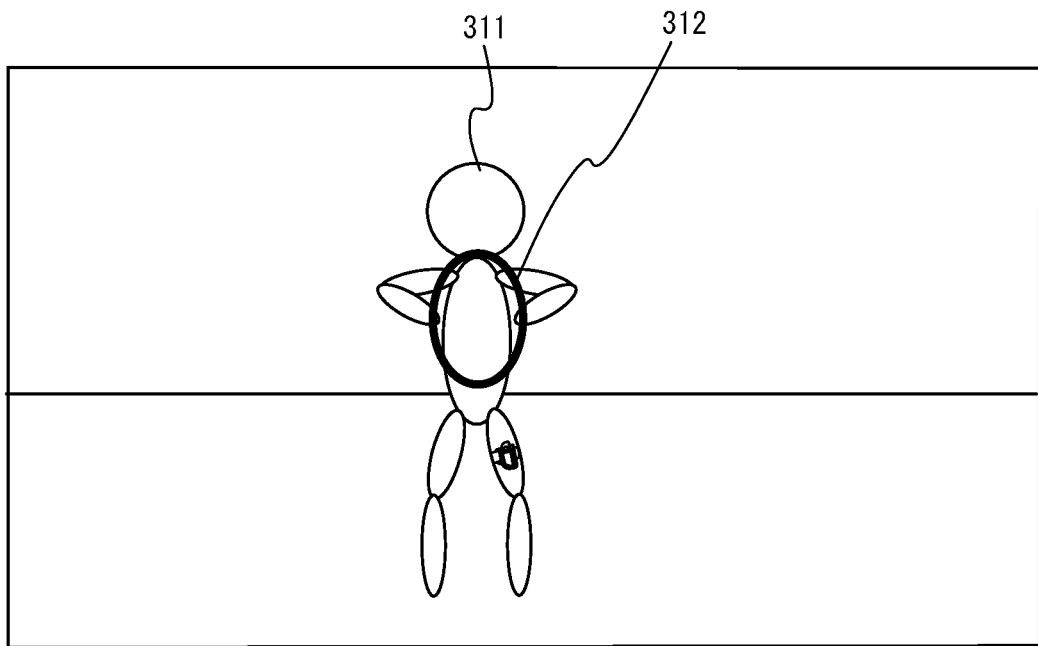
FIG. 29 is a diagram showing an example of a game image displayed during a game process performed on a non-limiting main body apparatus.

FIG. 29 is a diagram showing an example of the game image displayed during the game process performed on the main body apparatus 2. In FIG. 29, a game image representing a virtual space including a player character 311 controlled by the user is displayed on the display device. The player character 311 is holding a ring object 312 that represents the ring-shaped extension apparatus 5. Note that the display device displaying the game image may be the display 12 described above or may be an external display device connected to the main body apparatus 2.

In the game process, the main body apparatus 2 controls the action of the player character 311 in response to the operation of deforming the ring-shaped extension apparatus 5. For example, based on the information that represents the strain value included in the ring operation data, the main body apparatus 2 calculates the direction and the amount of deformation of the ring-shaped extension apparatus 5. Then, the main body apparatus 2 controls the action of the player character 311 so that the player character 311 deforms the ring object 312 in sync with the deformation of the ring-shaped extension apparatus 5.

The main body apparatus 2 controls the action of the player character 311 in response to the operation of moving the ring-shaped extension apparatus 5. For example, based on the detection results from the sensors 114 and 115 included in the right controller operation data, the main body apparatus 2 calculates the attitude of the ring-shaped extension apparatus 5. Then, the main body apparatus 2 controls the action of the player character 311 moving the ring object 312 so that the ring object 312 in the virtual space assumes an attitude that corresponds to the attitude of the ring-shaped extension apparatus 5 in the real space.

The main body apparatus 2 controls the action of the player character 311 in response to the operation of moving the leg of the user. For example, based on information representing the detection results from the sensors 114 and 115 included in the left controller operation data, the main body apparatus 2 calculates the inclination of the leg of the user. Then, the main body apparatus 2 controls the action of the player character 311 so that the inclination of the leg of the player character 311 coincides with the calculated inclination of the leg of the user.

According to the game process described above, in response to the user performing a fitness exercise operation such as bending the ring-shaped extension apparatus 5 or squatting, the main body apparatus 2 can control the player character 311 so that the player character 311 performs the same fitness exercise operation as the user.

While the description above has been directed to an example embodiment where the user holds the ring-shaped extension apparatus 5 with both hands, the ring-shaped extension apparatus 5 may be used in other ways. For example, the user can have one of the two grip covers 206 and 207 pressed against the belly while holding the other grip cover with both hands, and perform the operation of bending the ring-shaped extension apparatus 5 so as to bring the two grip covers 206 and 207 toward each other. Through such an operation, the user can perform, as a game operation, a fitness exercise operation of training arm muscles and abdominal muscles. For example, the user can use the ring-shaped extension apparatus 5 while holding the ring-shaped extension apparatus 5 between the legs with the two grip covers 206 and 207 pressed against the left and right inner thighs. Then, the user performs the operation of bending the ring-shaped extension apparatus 5 so as to bring the two grip covers 206 and 207 toward each other by squeezing the legs. Through such an operation, the user can perform, as a game operation, a fitness exercise operation of training leg muscles. Thus, the ring-shaped extension apparatus 5 can be used to perform fitness exercise operations for training various muscles across the whole body of the user.

There is no limitation on the content of the game to be executed through the game process performed on the main body apparatus 2. For example, the game to be executed may be a game in which the user performs a fitness exercise operation so as to display an evaluation result for the fitness exercise operation (e.g., the number of times a fitness exercise operation is performed, the amount of time over which a fitness exercise operation is performed, whether the user made a move close to the reference move, and/or the calories burned, etc.). For example, the game to be executed may be a game in which the user can inflict a damage on an enemy character or obtain an item depending on the evaluation result for the fitness exercise operation.

As described above, with the present game system 1, the user can perform a fitness exercise operation in the game, wherein the fitness exercise operation can be used as the game operation.

Note that only one or both of the two extension apparatuses 5 and 6 may be used in the game operation. For example, in a game, the ring-shaped extension apparatus 5 and the belt-shaped extension apparatus 6 may both be used at the same time for a game operation. For example, the ring-shaped extension apparatus 5 may be used for a game operation in a game, and the belt-shaped extension apparatus 6 may be used for a game operation in a different game. For example, the ring-shaped extension apparatus 5 may be used for a game operation in a scene (e.g., a battle scene) of a game, and the belt-shaped extension apparatus 6 may be used for a game operation in a different scene (e.g., while moving around on a map) of the same game.

In the game process, the main body apparatus 2 may give an output instruction to the controllers 3 and 4. That is, the main body apparatus 2 may cause a vibrator 107 or 117 of the controller to vibrate or cause the controller to output a sound by the vibration of the vibrator 107 or 117.

The extension apparatuses 5 and 6 may be usable during a period in which the game process is not being executed by the main body apparatus 2. For example, during such a period, when the right controller 4 is attached to the ring-shaped extension apparatus 5, the ring-shaped extension apparatus 5 may detect an operation of deforming the ring-shaped extension apparatus 5 based on the information representing the strain value, and store information that represents the content of the operation (e.g., the number of times the operation of deforming the ring-shaped extension apparatus 5 is performed, or the amount of time over which the operation is performed, etc.). Note that the information may be stored in the ring-shaped extension apparatus 5 or may be stored in the right controller 4. In response to the operation of deforming the ring-shaped extension apparatus 5, the right controller 4 may generate a vibration using the vibrator 117 or may output a sound.

When information representing the content of the operation is stored as described above, in the game process to be executed later, the main body apparatus 2 may obtain the information to execute the game process based on the information. For example, the main body apparatus 2 may allow the game to progress based on the information (e.g., by allowing the user to play the next game level or by allowing the player character to grow), or the main body apparatus 2 may give the user an award in the game.

3. Functions/Effects and Variations of Present Embodiment

According to the embodiment described above, the ring-shaped extension apparatus 5 includes the following elements:
a ring-shaped portion 201 at least a part of which is elastically deformable;
a detector (e.g., the strain gauge 245) that detects deformation of the ring-shaped portion 201; and
a main portion 202 secured to the ring-shaped portion 201.

The main portion 202 includes the following elements:
an attachment portion (e.g., the rail portion 211) to which a game controller (e.g., the right controller 4) can be attached;
a terminal (e.g., the terminal 294) for electrical connection with the game controller; and
a transmitter (e.g., of the processing section 293) that transmits data regarding a detection result from the detector to the game controller through the terminal.

With the configuration described above, the deformation of the ring-shaped portion by the operation of the user is transmitted to the game controller attached to the apparatus as data regarding a detection result from the detector. Therefore, using the game system 1, the operation of deforming the ring-shaped portion 201 of the ring-shaped extension apparatus 5 can be used as the game operation, and the user can therefore perform a novel operation of deforming the extension apparatus by using the game controller attached to the extension apparatus.

According to the embodiment described above, the ring-shaped extension apparatus 5 can be said to be an input apparatus including the following elements:
a ring-shaped portion 201 that is ring-shaped and at least a part of which is elastically deformable;
a detector (e.g., the strain gauge 245) that detects deformation of the ring-shaped portion 201;
a grip portion that is provided on the ring-shaped portion 201 and held by the user; and
a transmitter that transmits data regarding a detection result from the detector to another apparatus (e.g., the right controller 4).

Also with the configuration described above, using the game system 1, the operation of deforming the ring-shaped portion 201 of the ring-shaped extension apparatus 5 can be used as the game operation, and the user can therefore perform a novel operation of deforming the extension apparatus by using the game controller attached to the extension apparatus.

Note that the transmitter of the input apparatus may transmit data to the right controller 4 or may transmit data to the main body apparatus 2. For example, in other embodiments, the ring-shaped extension apparatus 5 may directly communicate with the main body apparatus 2 without using the right controller 4 therebetween. The transmitter of the input apparatus may transmit data to another apparatus in a wired connection or in a wireless connection.

The input apparatus may include no attachment portion (e.g., the rail portion 211) used for the attachment of the game controller thereto. In other embodiments, an input apparatus that includes no attachment portion may be used instead of the ring-shaped extension apparatus 5 and the right controller 4 of the embodiment described above. In such a case, the transmitter may be a transmitter that transmits the data to the main body apparatus 2.

According to the embodiment described above, the ring-shaped extension apparatus 5 can be said to be an input apparatus including the following elements:
an elastic member 241 that includes a first end portion and a second end portion and at least a part of which is elastically deformable;
a base portion 242 that holds both of the first end portion and the second end portion of the elastic member 241 so that the base portion 242 and the elastic member 241 together form a ring; and
a strain gauge 245 that is provided on the base portion 242 and that detects a strain generated on the base portion 242 upon deformation of the elastic member 241 in response to an input from the user.

With the configuration described above, a strain generated on the base portion 242 due to deformation of the elastic member 241 is detected in response to the user deforming the elastic member 241 of the input apparatus. Thus, using the game system 1, the operation of deforming the elastic member 241 of the input apparatus can be used as the game operation, and the user can therefore perform a novel operation of deforming the input apparatus. With the configuration described above, since the strain gauge 245 is provided on the base portion 242, it is possible to reduce the possibility of damaging the strain gauge 245 due to deformation of the elastic member 241.

(Variation Regarding Shape of Ring-Shaped Portion)

In the embodiment described above, the portion that can be bent by the operation of the user is the ring-shaped portion 201. Herein, the shape of the portion that can be bent by the operation of the user is not limited to a ring shape but may be any other shape. For example, according to a variation of the embodiment described above, the extension apparatus that can be bent by the user may be configured as follows.

Figure 30:
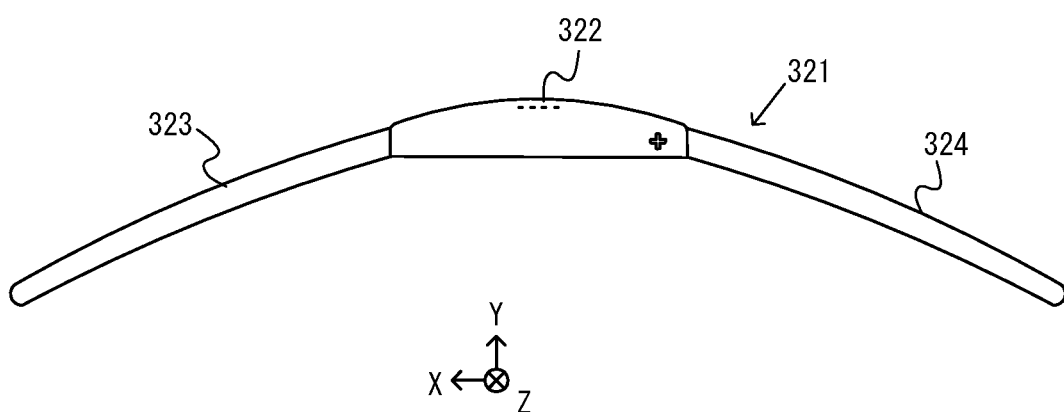
FIG. 30 is a diagram showing an example of a non-limiting extension apparatus according to a variation of the present embodiment.

FIG. 30 is a diagram showing an example of an extension apparatus according to a variation of the present embodiment. As shown in FIG. 30, an extension apparatus 321 of the variation does not have a ring shape as a whole. The extension apparatus 321 includes a main portion 322, a first elastic member 323 and a second elastic member 324.

The configuration of the main portion 322 of this variation is the same as that of the main portion 202 of the embodiment described above. Also in this variation, a base portion is provided in the main portion 322 as in the embodiment described above. The base portion holds the elastic members

323 and 324. The configuration of the base portion of this variation is the same as that of the main portion 202 of the embodiment described above.

The elastic members 323 and 324 each have a plate shape (which can also be said to be a bar shape) similar to that of the embodiment described above. The elastic members 323 and 324 are each made of an elastically deformable material (e.g., an FRP as described above). The first elastic member 323 is held by the base portion while inserted into the left opening of the base portion. The second elastic member 324 is held by the base portion while inserted into the right opening of the base portion. Note that the manner in which the base portion holds the elastic members 323 and 324 in this variation is the same as that of the embodiment described above.

As described above, the extension apparatus 321 of this variation is different from the embodiment described above in terms of the shape of the elastic member. Also with the extension apparatus 321 of this variation, the user can perform an operation of bending the elastic member as in the embodiment described above. With the extension apparatus 321, the strain generated on the base portion by the bending operation can be detected by the strain gauge provided on base portion. Therefore, the main body apparatus 2 can receive the information representing the strain value detected by the extension apparatus 321 via the right controller 4 attached to the extension apparatus 321, and identify the bending operation based on the strain value.

Note that the extension apparatus 321 may further include grip covers provided on the elastic members 323 and 324. That is, each of the elastic members 323 and 324 may include a grip cover at an end portion of the elastic member that is opposite to the side on which the elastic member is held by the base portion. Also with this variation, as in the embodiment described above, the grip covers may be attachable to and detachable from the elastic members, or may be bonded to the elastic members in such a manner that they cannot be detached therefrom.

Thus, the extension apparatus 321 of the variation described above can be said to be an input apparatus including the following elements:
  a strain gauge;
  a base portion on which the strain gauge is put;
  a first elastic member 323 held by one hand of a user; and
  a second elastic member 324, separate from the first elastic member 323, held by the other hand of the user.

The base portion includes a first portion (the outer plate portion 251 in the embodiment described above), and a second portion (the inner plate portion 252 in the embodiment described above) provided so as to oppose the first portion. The base portion holds the first elastic member and the second elastic member with one end of the first elastic member and one end of the second elastic member sandwiched between the first portion and the second portion.

Also with the configuration described above, as in the embodiment described above, the user can perform a novel operation of deforming the extension apparatus by using the game controller attached to the extension apparatus.

According to the variation described above, a portion of the first elastic member 323 that is sandwiched between the end portion of the first portion and the end portion of the second portion of the first elastic member 323 is elastically deformable in the direction toward the first portion (i.e., upward) and in the direction toward the second portion (i.e., downward). A portion of the second elastic member 324 that is sandwiched between the end portion of the first portion and the end portion of the second portion is elastically deformable in the direction toward the first portion and in the direction toward the second portion. Therefore, also with the variation, as in the embodiment described above, the force that the base portion receives from the elastic members when the elastic members 323 and 324 deform can be more evenly distributed between the first portion and the second portion.

Note that in the variation described above, the two elastic members 323 and 324 are bar-shaped, and are provided so as to extend from the base portion slightly below the horizontal direction (i.e., the X-axis direction). In other embodiments, there is no limitation on the shape of the elastic members. For example, in other embodiments, the two elastic members may be provided so as to extend in a single line, or the two elastic members and the main portion may together form a U-letter shape. The two elastic members 323 and 324 may be connected to each other at their end portions opposite to the side they are held by the main portion 322 so that the extension apparatus as a whole may be bow-shaped. Then, the user may perform an operation of pulling the member that connects together the two elastic members 323 and 324 (which may be of the same material as the elastic members 323 and 324 or may be of a different material) as if it were a string on a bow. In another variation, elastic members may extend in two directions, i.e., upward and downward, from the left end and the main portion 322 and elastic members may extend in two directions, i.e., upward and downward, from the right end of the main portion 322 so that the extension apparatus as a whole is formed in an H-letter shape. Then, the user can perform a deformation operation by holding any of the elastic members extending in four directions.

In other embodiments, according to the variation described above, the two elastic members 323 and 324 may be configured as an integral member. That is, the extension apparatus 321 may be an input apparatus including the following elements:
  an elastic member at least a part of which is elastically deformable;
  a base portion that holds the elastic member so that the elastic member extends from one end of the base portion and the elastic member extends from the other end of the base portion; and
  a strain gauge provided on the base portion that detects a strain generated on the base portion due to deformation of the elastic member in response to an input from the user.

Also with the configuration described above, as in the embodiment described above, the user can perform a novel operation of deforming the extension apparatus by using the game controller attached to the extension apparatus.

The extension apparatus 321 of the variation described above can be said to be an apparatus including the following elements:
  a first holder that is held by one hand of a user (e.g., a portion of the elastic member 323 that is held by the left hand of the user);
  a second holder that is held by the other hand of the user (e.g., a portion of the elastic member 324 that is held by the right hand of the user);
  a deformable portion that is deformed by a force applied to the first holder and the second holder (e.g., portions of the elastic members 323 and 324 other than the first holder and the second holder);
  a detector (e.g., a strain gauge) that detects deformation of the deformable portion; and a main portion 322 that is provided between the first holder and second holder, wherein the main portion 322 includes the following elements:

an attachment portion (e.g., the rail portion 211) to which a game controller (e.g., the right controller 4) can be attached;

a terminal (e.g., the terminal 294) for electrical connection with the game controller; and a transmitter (e.g., of the processing section 293) that transmits data regarding a detection result of the detector to the game controller through the terminal.

Moreover, the main portion 322 includes a protruding portion that protrudes on one side or the other side in the front view direction relative to the first holder and the second holder as the extension apparatus is viewed from the front side, and the attachment portion is provided on the protruding portion.

Also with the configuration described above, as in the embodiment described above, the user can perform a novel operation of deforming the apparatus using the game controller attached to the apparatus. According to the configuration described above, it is less likely that the deformable portion contacts the attachment portion when the deformable portion is deformed, and it is possible to reduce the possibility that the game controller comes off the apparatus as the deformable portion contacts the attachment portion.

Note that the "front view direction", as used in the configuration described above, refers to a direction (e.g., the Z-axis direction shown in FIG. 30) that is perpendicular to a plane including the direction in which the deformable portion is deformed. Note that where the deformable portion can be deformed in any direction, as opposed to being limited to a particular direction and its opposite direction, the "direction in which the deformable portion is deformed" refers to, for example, the direction in which the amount of deformation is maximum in the presence of a certain force applied to the deformable portion, from among all the directions in which the deformable portion can be deformed. Alternatively, the "direction in which the deformable portion is deformed" can be said to be the most natural direction of deformation when the user deforms the extension apparatus by applying a force thereto while holding the extension apparatus.

With the configuration described above, as in the embodiment described above, the main portion includes a housing with holes formed therein and is formed so that the housing covers at least portions of the first holder and the second holder with the first holder and the second holder passing through the holes. The attachment portion is provided on one side or the other side in the front view direction relative to the holes as the apparatus is viewed from the front side. Therefore, it is possible to further reduce the possibility that the deformable portion contacts the attachment portion.

(Variation Regarding Method for Attaching Game Controller to Extension Apparatus)

In the embodiment described above and the variations thereof, the right controller 4 is attached to the extension apparatus with the slide portions (e.g., the rail portion or the slider) of the extension apparatus and the right controller 4 slidably engaging with each other. In other embodiments, there is no limitation on the configuration (in other words, the method) for attaching the right controller 4 to the extension apparatus. For example, in other embodiments, the extension apparatus may include a claw so that the right controller 4 can be removably attached to the extension apparatus by hooking the claw on the right controller 4.

Then, it can be said that the claw that is hooked on the right controller 4 is the attachment portion described above. For example, in other embodiments, the main portion may include a clamp portion that clamps the primary surface and the reverse surface of the right controller 4. Then, it can be said that the clamp portion that clamps the right controller 4 is the attachment portion described above. In other embodiments, the right controller 4 may be attached to the extension apparatus by means of a bayonet connection, a magnetic connection, insertion, pivot/twist, etc.

(Variation Regarding Communication Between Game Controller and Extension Apparatus)

In the embodiment described above and the variations thereof, the extension apparatus transmits information to the right controller 4 through the terminal (i.e., in a wired connection). In other embodiments, the extension apparatus may include a wireless communication section that wirelessly communicates with the right controller 4 so that the information is transmitted to the right controller 4 by the wireless communication section.

(Variation Regarding Method for Detecting Bending Operation)

In the embodiment described above and the variations thereof, the game system 1 uses a strain sensor as the detector that detects deformation of the ring-shaped portion (in other words, the elastic members). In other embodiments, there is no limitation on the configuration of the detector, and any other type of a sensor may be used. For example, the extension apparatus may include a pressure sensor and/or a bend sensor as the detector. For example, the pressure sensor detects the pressure that the base portion receives from the elastic member. Then, it is possible to calculate the amount by which the elastic member is bent based on the detected pressure value. The bend sensor is provided on the elastic member and detects the amount by which the elastic member is bent. As described above, the detector for detecting deformation of the ring-shaped portion may be a detector that detects the amount of deformation or may be a detector that detects other physical quantities (e.g., the amount of strain or the pressure) caused by deformation.

The embodiment described above is applicable to an input apparatus to which a game controller can be attached, for example, with the aim of providing an input apparatus including a strain gauge provided at an appropriate position, etc.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An input apparatus comprising:
    an elastic member at least a part of which is elastically deformable by a user, wherein the elastic member has a first end portion and a second end portion;
    a base portion holding both end portions of the elastic member so that a ring is formed by the base portion and the elastic member, wherein the base portion is made of a material harder than a material of an elastically deformable portion of the elastic member; and
    a strain gauge, on the base portion, configured to detect a strain generated on the base portion due to deformation of the elastic member in response to an input from the user, wherein the base portion includes:
  an inner portion on a side closer to a center of the ring formed by the base portion and the elastic member; and
  an outer portion opposing the inner portion on a side farther away from the center of the ring,
wherein the elastic member is held by the base portion with the first end portion and the second end portion sandwiched between the outer portion and the inner portion.

2. The input apparatus according to claim 1, wherein:
the first end portion of the elastic member is sandwiched between the outer portion and the inner portion at an end portion of the base portion on a first side in a first direction; and
the second end portion of the elastic member is sandwiched between the outer portion and the inner portion at an end portion of the base portion on a second side in the first direction.

3. The input apparatus according to claim 2, wherein the base portion holds the elastic member so that a tip portion of the first end portion and a tip portion of the second end portion each apply a pressing force to a surface of the outer portion that opposes the inner portion, while a portion of the first end portion that is different from the tip portion and a portion of the second end portion that is different from the tip portion apply a pressing force to opposite ends in the first direction of a surface of the inner portion that opposes the outer portion.

4. The input apparatus according to claim 2, further comprising:
a first protection member sandwiched between an end portion on the first side of the inner portion and the elastic member; and
a second protection member sandwiched between an end portion on the second side of the inner portion and the elastic member, wherein:
the first protection member has a corner that is more rounded than a corner of the inner portion that is to be in contact with the first protection member, and the corner is to be in contact with the elastic member in a steady state and/or a deformed state; and
the second protection member has a corner that is more rounded than a corner of the inner portion that is to be in contact with the second protection member, and the corner is to be in contact with the elastic member in the steady state and/or the deformed state.

5. The input apparatus according to claim 2, further comprising:
a first protection member sandwiched between an end portion on the first side of the inner portion and the elastic member; and
a second protection member sandwiched between an end portion on the second side of the inner portion and the elastic member,
wherein the first protection member and the second protection member are made of a material that is softer than the base portion.

6. The input apparatus according to claim 2, wherein:
the base portion further includes two side surface portions that connect together the inner portion and the outer portion respectively on one side and on the other side in a second direction that is perpendicular to the first direction; and
the first end portion and the second end portion of the elastic member are surrounded by the inner portion, the outer portion and the two side surface portions.

7. The input apparatus according to claim 6, wherein:
the base portion is in a tubular shape having a first opening and a second opening, wherein an end portion on the first side in the first direction of the outer portion and an end portion on the first side of the inner portion are parts of an edge of the first opening, and an end portion on the second side in the first direction of the outer portion and an end portion on the second side of the inner portion are parts of an edge of the second opening; and
the elastic member is held by the base portion with the first end portion inserted through the first opening and the second end portion inserted through the second opening.

8. The input apparatus according to claim 6, wherein:
the strain gauge is configured to detect a strain on the base portion for the first direction and a strain on the base portion for the second direction; and
the base portion has a notch or a hole located in the second direction from the strain gauge.

9. The input apparatus according to claim 8, wherein:
a length of the notch or the hole for the first direction is longer than a length of the strain gauge for the first direction; and
opposite ends of the notch or the hole in the first direction are located on an outer side for the first direction relative to opposite ends of the strain gauge in the first direction.

10. The input apparatus according to claim 8, wherein the notch or the hole is formed on opposite sides of the strain gauge for the second direction in one of the outer portion and the inner portion where the strain gauge is provided and/or in the side surface portions.

11. The input apparatus according to claim 1, wherein:
the strain gauge is on the outer portion or the inner portion; and
the input apparatus further comprises a housing secured to one of the outer portion and the inner portion where the strain gauge is absent, wherein the housing at least covers the strain gauge.

12. The input apparatus according to claim 1, wherein:
the base portion is in a tubular shape having an opening at an end portion on a first side and at an end portion on a second side; and
the elastic member is held by the base portion with the first end portion inserted through the opening on the first side and the second end portion inserted through the opening on the second side.

13. The input apparatus according to claim 12, wherein the strain gauge is on one of outer surfaces of the base portion that is farther away from a center of the ring.

14. The input apparatus according to claim 1, wherein:
the elastic member includes:
  a core; and
  a cover portion covering the core and that is softer than the core, wherein:
portions of the core are exposed at the first end portion and the second end portion; and
the base portion holds the portions of the core that are exposed at the first end portion and the second end portion.

15. The input apparatus according to claim 1, wherein:
the base portion holds the elastic member under stress while the input apparatus is in a steady state before the user applies a force.

16. An input apparatus comprising:
an elastic member at least a part of which is elastically deformable by a user, wherein the elastic member has a first end portion and a second end portion;
a base portion holding both end portions of the elastic member so that a ring is formed by the base portion and the elastic member, wherein the base portion is made of a material harder than a material of an elastically deformable portion of the elastic member; and
a strain gauge, on the base portion, configured to detect a strain generated on the base portion due to deformation of the elastic member in response to an input from the user, wherein the elastic member is secured to the base portion at least two locations on a side of the first end portion and is secured to the base portion at least two locations on a side of the second end portion.

17. The input apparatus according to claim 16, wherein the elastic member is secured to the base portion using a rivet, a screw and/or a bolt.

18. An input apparatus comprising:
a strain gauge;
a base portion on which the strain gauge is located;
a first elastic member held by one hand of a user; and
a second elastic member, separate from the first elastic member, held by the other hand of the user, the base portion being made of a material harder than a material of elastically deformable portions of the first and second elastic members, wherein:
the base portion includes a first portion and a second portion that opposes the first portion; and
the base portion holds the first elastic member and the second elastic member with one end of the first elastic member and one end of the second elastic member sandwiched between the first portion and the second portion.

19. The input apparatus according to claim 18, wherein:
a portion of the first elastic member that is sandwiched between an end portion of the first portion and an end portion of the second portion is elastically deformable in a direction toward the first portion and in a direction toward the second portion; and
a portion of the second elastic member that is sandwiched between an end portion of the first portion and an end portion of the second portion is elastically deformable in a direction toward the first portion and in a direction toward the second portion.

20. The input apparatus according to claim 19, wherein:
one end portion of the first elastic member is sandwiched between the first portion and the second portion at an end portion of the base portion on a first side in a first direction; and
one end portion of the second elastic member is sandwiched between the first portion and the second portion at an end portion of the base portion on a second side in the first direction.

21. The input apparatus according to claim 20, wherein:
the base portion further includes two side surface portions that connect together the first portion and the second portion respectively on one side and on the other side in a second direction that is perpendicular to the first direction; and
the end portion of the first elastic member and the end portion of the second elastic member are surrounded by the first portion, the second portion and the two side surface portions.

22. The input apparatus according to claim 18, wherein:
the base portion is in a tubular shape having an opening at an end portion on a first side and at an end portion on a second side; and
the first elastic member and the second elastic member are held by the base portion with the end portion of the first elastic member inserted through the opening on the first side and the end portion of the second elastic member inserted through the opening on the second side.

23. A method for making an input apparatus, the method comprising:
providing an elastic member at least a part of which is elastically deformable by a user, wherein the elastic member has a first end portion and a second end portion;
holding both end portions of the elastic member with a base portion so that a ring is formed by the base portion and the elastic member, wherein the base portion is made of a material harder than a material of an elastically deformable portion of the elastic member; and
attaching a strain gauge on the base portion, the strain gauge being configured to detect a strain generated on the base portion due to deformation of the elastic member in response to input from the user,
wherein the base portion includes an inner portion on a side closer to a center of the ring formed by the base portion and the elastic member; and an outer portion opposing the inner portion on a side farther away from the center of the ring, and
wherein the method further comprises holding the elastic member by the base portion with the first end portion and the second end portion sandwiched between the outer portion and the inner portion.

24. A game processing method for use with an input apparatus comprising a strain gauge, an elastic member at least a part of which is elastically deformable by a user, the elastic member having a first end portion and a second end portion; a base portion holding both end portions of the elastic member so that a ring is formed by the base portion and the elastic member, the base portion being made of a material harder than a material of an elastically deformable portion of the elastic member, wherein the base portion includes an inner portion on a side closer to a center of the ring formed by the base portion and the elastic member; and an outer portion opposing the inner portion on a side farther away from the center of the ring, and the elastic member is held by the base portion with the first end portion and the second end portion sandwiched between the outer portion and the inner portion,
the strain gauge being provided on the base portion, the method comprising:
receiving data from the strain gauge indicative of a detected strain generated on the base portion due to deformation of the elastic member in response to an input from the user; and
executing a game process based on the received data.

* * * * *